(12) United States Patent
Ebrahimi et al.

(10) Patent No.: US 11,206,133 B2
(45) Date of Patent: Dec. 21, 2021

(54) METHODS AND SYSTEMS FOR RECOVERING DATA USING DYNAMIC PASSWORDS

(71) Applicant: Ping Identity Corporation, Denver, CO (US)

(72) Inventors: Armin Ebrahimi, Cupertino, CA (US); Gaurav Khot, Cupertino, CA (US)

(73) Assignee: Ping Identity Corporation, Denver, CO (US)

( * ) Notice: Subject to any disclaimer, the term of this patent is extended or adjusted under 35 U.S.C. 154(b) by 182 days.

(21) Appl. No.: 16/214,029

(22) Filed: Dec. 7, 2018

(65) Prior Publication Data

US 2019/0182042 A1    Jun. 13, 2019

Related U.S. Application Data

(60) Provisional application No. 62/747,020, filed on Oct. 17, 2018, provisional application No. 62/596,434, filed on Dec. 8, 2017.

(51) Int. Cl.
*H04L 9/08* (2006.01)
*H04L 9/06* (2006.01)
(Continued)

(52) U.S. Cl.
CPC .......... *H04L 9/0894* (2013.01); *H04L 9/0643* (2013.01); *H04L 9/0863* (2013.01);
(Continued)

(58) Field of Classification Search
None
See application file for complete search history.

(56) References Cited

U.S. PATENT DOCUMENTS 5,005,200 A    4/1991 Fisher
5,901,229 A    5/1999 Fujisaki et al.
(Continued)

FOREIGN PATENT DOCUMENTS

JP    2005-260490 A    9/2005
JP    2006-179016 A    7/2006
(Continued)

OTHER PUBLICATIONS

ISR, PCT/US18/64623, dated May 14, 2019, 2 pages.
(Continued)

*Primary Examiner* — Benjamin E Lanier

(57) ABSTRACT

A method for recovering data. The method including collecting identity factors at a user device, wherein hashes of the identity factors are configured to be stored at a server. The method including generating at the user device a dynamic password based on the identity factors and a Salt configured to be generated by the server and configured to be delivered to the user device. The method including generating at the user device a data key and encrypting the data key using the dynamic password to generate an encrypted data key configured to be stored at the server. The method including encrypting at the user device data items using the data key to generate encrypted data items configured to be stored at the server. As such, the data items are recoverable by presenting the identity factors to the server.

23 Claims, 24 Drawing Sheets

(51) Int. Cl.
*H04L 9/32* (2006.01)
*H04L 29/06* (2006.01)

(52) U.S. Cl.
CPC .......... *H04L 9/0866* (2013.01); *H04L 9/0869* (2013.01); *H04L 9/3231* (2013.01); *H04L 9/3236* (2013.01); *H04L 63/083* (2013.01)

(56) References Cited

U.S. PATENT DOCUMENTS

| | | |
|---|---|---|
| 5,923,763 A | 7/1999 | Walker |
| 5,996,076 A | 11/1999 | Rowney |
| 6,088,717 A | 7/2000 | Reed et al. |
| 6,310,966 B1 | 10/2001 | Dulude et al. |
| 6,785,815 B1 | 8/2004 | Serret-Avila |
| 6,792,536 B1 | 9/2004 | Teppler |
| 7,043,635 B1 * | 5/2006 | Keech .................. G07F 7/1025 713/168 |
| 7,225,161 B2 * | 5/2007 | Lam .................... G06Q 20/367 705/50 |
| 7,451,116 B2 | 11/2008 | Parmelee et al. |
| 7,502,467 B2 | 3/2009 | Brainard et al. |
| 7,873,573 B2 | 1/2011 | Realini |
| 8,056,822 B2 | 11/2011 | Bourrieres |
| 8,078,880 B2 | 12/2011 | Nanda et al. |
| 8,249,965 B2 | 8/2012 | Tumminaro |
| 8,502,060 B2 | 8/2013 | Ribner |
| 8,607,358 B1 | 12/2013 | Shankar et al. |
| 8,744,076 B2 | 6/2014 | Youn |
| 8,832,807 B1 | 9/2014 | Kuo et al. |
| 8,966,276 B2 | 2/2015 | Nanopoulos et al. |
| 9,059,858 B1 | 6/2015 | Giardina et al. |
| 9,135,787 B1 | 9/2015 | Russell et al. |
| 9,172,699 B1 | 10/2015 | Vazquez et al. |
| 9,189,788 B1 | 11/2015 | Robinson et al. |
| 9,240,058 B1 | 1/2016 | Amacker |
| 9,288,047 B2 | 3/2016 | Brouwer et al. |
| 9,331,856 B1 | 5/2016 | Song |
| 9,397,985 B1 | 7/2016 | Seger et al. |
| 9,608,822 B2 | 3/2017 | Lochmatter et al. |
| 9,646,150 B2 | 5/2017 | Toth |
| 9,679,276 B1 | 6/2017 | Cuende |
| 9,722,790 B2 | 8/2017 | Ebrahimi |
| 9,876,646 B2 | 1/2018 | Ebrahimi et al. |
| 9,887,975 B1 | 2/2018 | Gifford et al. |
| 9,948,467 B2 | 4/2018 | King |
| 10,007,826 B2 | 6/2018 | Ebrahimi et al. |
| 10,007,913 B2 | 6/2018 | Ebrahimi |
| 10,163,105 B1 | 12/2018 | Ziraknejad et al. |
| 10,255,419 B1 | 4/2019 | Kragh |
| 10,257,179 B1 | 4/2019 | Saylor et al. |
| 10,341,091 B2 | 7/2019 | Keranen et al. |
| 10,341,123 B2 | 7/2019 | Ebrahimi et al. |
| 10,417,219 B1 | 9/2019 | Yang et al. |
| 10,498,541 B2 | 12/2019 | Ebrahimi et al. |
| 10,498,542 B2 | 12/2019 | Ebrahimi et al. |
| 10,509,932 B2 | 12/2019 | Ebrahimi et al. |
| 10,587,609 B2 | 3/2020 | Ebrahimi et al. |
| 10,657,532 B2 | 5/2020 | Ebrahimi |
| 10,740,584 B2 | 8/2020 | Ebrahimi et al. |
| 10,805,085 B1 | 10/2020 | Liang |
| 10,979,227 B2 | 4/2021 | Ebrahimi |
| 2001/0011350 A1 | 8/2001 | Zabetian |
| 2002/0016913 A1 | 2/2002 | Wheeler et al. |
| 2002/0071565 A1 | 6/2002 | Kurn et al. |
| 2002/0138735 A1 | 9/2002 | Felt et al. |
| 2002/0141593 A1 | 10/2002 | Kurn et al. |
| 2002/0170966 A1 | 11/2002 | Hannigan |
| 2003/0014372 A1 | 1/2003 | Wheeler et al. |
| 2003/0046159 A1 | 3/2003 | Ebrahimi |
| 2003/0070075 A1 | 4/2003 | Deguillaume et al. |
| 2003/0172273 A1 | 9/2003 | Hans |
| 2004/0064693 A1 | 4/2004 | Pabla et al. |
| 2005/0039040 A1 | 2/2005 | Ransom et al. |
| 2005/0091495 A1 | 4/2005 | Cameron et al. |
| 2005/0114447 A1 | 5/2005 | Cameron et al. |
| 2006/0041756 A1 * | 2/2006 | Ashok .................... G06F 21/31 713/183 |
| 2006/0071077 A1 | 4/2006 | Suomela |
| 2006/0075255 A1 | 4/2006 | Duffy et al. |
| 2006/0256961 A1 | 11/2006 | Brainard et al. |
| 2007/0016785 A1 | 1/2007 | Guay et al. |
| 2007/0017996 A1 | 1/2007 | Xia et al. |
| 2007/0033150 A1 | 2/2007 | Nwosu |
| 2007/0118479 A1 | 5/2007 | Halsema et al. |
| 2007/0277013 A1 | 11/2007 | Rexha et al. |
| 2007/0294538 A1 | 12/2007 | Lim et al. |
| 2008/0078836 A1 | 4/2008 | Tomita |
| 2008/0116277 A1 | 5/2008 | Tomita |
| 2008/0155253 A1 | 6/2008 | Liu |
| 2008/0178008 A1 | 7/2008 | Takahashi et al. |
| 2008/0235772 A1 | 9/2008 | Janzen |
| 2008/0267511 A1 | 10/2008 | Bourrieres |
| 2009/0066478 A1 | 3/2009 | Colella |
| 2009/0232346 A1 | 9/2009 | Zilch |
| 2009/0266882 A1 | 10/2009 | Sajkowsky |
| 2010/0020970 A1 | 1/2010 | Liu |
| 2010/0023758 A1 | 1/2010 | Han |
| 2010/0052852 A1 | 3/2010 | Mohanty |
| 2010/0070759 A1 | 3/2010 | Cobos et al. |
| 2010/0088517 A1 | 4/2010 | Piersol |
| 2010/0191972 A1 | 7/2010 | Kiliccote |
| 2010/0228674 A1 | 9/2010 | Ogg et al. |
| 2010/0250939 A1 | 9/2010 | Adams et al. |
| 2010/0272193 A1 | 10/2010 | Khan et al. |
| 2011/0093249 A1 | 4/2011 | Holmes et al. |
| 2011/0121066 A1 | 5/2011 | Tian |
| 2011/0231913 A1 | 9/2011 | Feng et al. |
| 2011/0286595 A1 | 11/2011 | Resch et al. |
| 2011/0307703 A1 | 12/2011 | Ogg et al. |
| 2012/0061461 A1 | 3/2012 | Bourrieres et al. |
| 2012/0067943 A1 | 3/2012 | Saunders |
| 2012/0086971 A1 | 4/2012 | Bisbee |
| 2012/0125997 A1 | 5/2012 | Burra et al. |
| 2012/0137131 A1 | 5/2012 | Lu et al. |
| 2012/0185398 A1 | 7/2012 | Weis et al. |
| 2012/0211567 A1 | 8/2012 | Herzig |
| 2012/0297190 A1 | 11/2012 | Shen et al. |
| 2012/0297464 A1 | 11/2012 | Busch et al. |
| 2012/0308003 A1 | 12/2012 | Mukherjee |
| 2013/0010958 A1 | 1/2013 | Yao |
| 2013/0014152 A1 | 1/2013 | Maino et al. |
| 2013/0037607 A1 | 2/2013 | Bullwinkel |
| 2013/0065564 A1 | 3/2013 | Conner |
| 2013/0111208 A1 | 5/2013 | Sabin et al. |
| 2013/0145152 A1 | 6/2013 | Maino |
| 2013/0153666 A1 | 6/2013 | Edwards |
| 2013/0159021 A1 | 6/2013 | Felsher |
| 2013/0173915 A1 | 7/2013 | Haulund et al. |
| 2013/0198822 A1 | 8/2013 | Hitchcock et al. |
| 2013/0228624 A1 | 9/2013 | Byrd et al. |
| 2013/0246261 A1 | 9/2013 | Purves et al. |
| 2013/0262309 A1 | 10/2013 | Gadotti |
| 2013/0262857 A1 | 10/2013 | Neuman et al. |
| 2013/0290733 A1 | 10/2013 | Branton et al. |
| 2013/0305059 A1 | 11/2013 | Gormley et al. |
| 2013/0311768 A1 | 11/2013 | Fosmark et al. |
| 2013/0333009 A1 | 12/2013 | Mackler |
| 2014/0006247 A1 | 1/2014 | Chai et al. |
| 2014/0006806 A1 * | 1/2014 | Corella .................. G06F 21/62 713/193 |
| 2014/0032913 A1 | 1/2014 | Tenenboym |
| 2014/0061253 A1 | 1/2014 | Smith |
| 2014/0084067 A1 | 3/2014 | Vanderhulst |
| 2014/0093144 A1 | 4/2014 | Feekes |
| 2014/0208403 A1 | 7/2014 | Lu et al. |
| 2014/0223175 A1 | 8/2014 | Bhatnagar |
| 2014/0237565 A1 | 8/2014 | Fleysher |
| 2014/0254706 A1 | 9/2014 | Li et al. |
| 2014/0256423 A1 | 9/2014 | Williams |
| 2014/0282961 A1 | 9/2014 | Dorfman et al. |
| 2014/0289842 A1 | 9/2014 | Cornick et al. |
| 2014/0304517 A1 | 10/2014 | Chidambaram et al. |
| 2014/0344015 A1 | 11/2014 | Puertolas-Montanes et al. |

(56) References Cited

U.S. PATENT DOCUMENTS

| | | |
|---|---|---|
| 2015/0047000 A1 | 2/2015 | Spencer, III et al. |
| 2015/0081567 A1 | 3/2015 | Boyle et al. |
| 2015/0095352 A1 | 4/2015 | Lacey |
| 2015/0095999 A1 | 4/2015 | Toth |
| 2015/0104013 A1 | 4/2015 | Holman et al. |
| 2015/0106626 A1* | 4/2015 | Kremp ............... G06F 21/6209 713/189 |
| 2015/0178515 A1 | 6/2015 | Cooley et al. |
| 2015/0244690 A1 | 8/2015 | Mossbarger |
| 2015/0262138 A1 | 9/2015 | Hudson |
| 2015/0269389 A1 | 9/2015 | Lee |
| 2015/0269614 A1 | 9/2015 | Kramer |
| 2015/0278805 A1 | 10/2015 | Spencer, III et al. |
| 2015/0278820 A1 | 10/2015 | Meadows |
| 2015/0302401 A1 | 10/2015 | Metral |
| 2015/0332283 A1 | 11/2015 | Witchey |
| 2015/0356523 A1 | 12/2015 | Madden |
| 2015/0356555 A1 | 12/2015 | Pennanen |
| 2015/0365436 A1 | 12/2015 | Shenefiel et al. |
| 2016/0005032 A1 | 1/2016 | Yau et al. |
| 2016/0012465 A1 | 1/2016 | Sharp |
| 2016/0023452 A1 | 1/2016 | Chu et al. |
| 2016/0028552 A1 | 1/2016 | Spanos et al. |
| 2016/0072809 A1 | 3/2016 | Soon-Shiong et al. |
| 2016/0094348 A1 | 3/2016 | Takahashi |
| 2016/0098723 A1 | 4/2016 | Feeney |
| 2016/0098730 A1 | 4/2016 | Feeney |
| 2016/0125416 A1 | 5/2016 | Spencer et al. |
| 2016/0134593 A1 | 5/2016 | Gvili |
| 2016/0162897 A1 | 6/2016 | Feeney |
| 2016/0180338 A1 | 6/2016 | Androulaki et al. |
| 2016/0212146 A1 | 7/2016 | Wilson |
| 2016/0217356 A1 | 7/2016 | Wesby |
| 2016/0217436 A1 | 7/2016 | Brama |
| 2016/0233572 A1 | 7/2016 | McConaghy |
| 2016/0261411 A1 | 9/2016 | Yau et al. |
| 2016/0269403 A1 | 9/2016 | Koutenaei et al. |
| 2016/0283920 A1 | 9/2016 | Fisher et al. |
| 2016/0283939 A1 | 9/2016 | Finlow-Bates |
| 2016/0283941 A1 | 9/2016 | Andrade |
| 2016/0300234 A1 | 10/2016 | Moss-Pultz et al. |
| 2016/0314462 A1 | 10/2016 | Hong et al. |
| 2016/0328713 A1 | 11/2016 | Ebrahimi |
| 2016/0330027 A1 | 11/2016 | Ebrahimi |
| 2016/0330035 A1 | 11/2016 | Ebrahimi et al. |
| 2016/0337351 A1 | 11/2016 | Spencer et al. |
| 2016/0351080 A1 | 12/2016 | Bhatnagar et al. |
| 2016/0373449 A1 | 12/2016 | Mather et al. |
| 2017/0041296 A1 | 2/2017 | Ford |
| 2017/0048252 A1 | 2/2017 | Straub et al. |
| 2017/0085377 A1 | 3/2017 | Pogmore et al. |
| 2017/0103389 A1 | 4/2017 | Sorensen et al. |
| 2017/0109735 A1 | 4/2017 | Sheng et al. |
| 2017/0180128 A1 | 6/2017 | Lu |
| 2017/0200160 A1 | 7/2017 | Kumar |
| 2017/0228731 A1 | 8/2017 | Sheng et al. |
| 2017/0236121 A1 | 8/2017 | Lyons et al. |
| 2017/0255805 A1 | 9/2017 | Ebrahimi et al. |
| 2017/0257358 A1 | 9/2017 | Ebrahimi et al. |
| 2017/0279788 A1* | 9/2017 | Rosenblum ........... H04L 63/083 |
| 2017/0324711 A1 | 11/2017 | Feeney |
| 2017/0344987 A1 | 11/2017 | Davis |
| 2017/0344988 A1 | 11/2017 | Cusden et al. |
| 2017/0346851 A1 | 11/2017 | Drake |
| 2017/0357826 A1 | 12/2017 | Gouget et al. |
| 2017/0359723 A1 | 12/2017 | Pal et al. |
| 2017/0372300 A1 | 12/2017 | Dunlevy et al. |
| 2018/0068103 A1 | 3/2018 | Pitkanen et al. |
| 2018/0077144 A1 | 3/2018 | Gangawane et al. |
| 2018/0082050 A1 | 3/2018 | Flink et al. |
| 2018/0082256 A1 | 3/2018 | Tummuru et al. |
| 2018/0144153 A1 | 5/2018 | Pead |
| 2018/0173906 A1 | 6/2018 | Rodriguez et al. |
| 2018/0176017 A1 | 6/2018 | Rodriguez et al. |
| 2018/0205556 A1 | 7/2018 | Rieul |
| 2018/0240107 A1 | 8/2018 | Andrade |
| 2018/0308098 A1 | 10/2018 | Ebrahimi |
| 2019/0005470 A1 | 1/2019 | Uhr et al. |
| 2019/0149537 A1 | 5/2019 | Ebrahimi et al. |
| 2019/0163896 A1 | 5/2019 | Balaraman et al. |
| 2019/0228178 A1 | 7/2019 | Sharma et al. |
| 2019/0342096 A1 | 11/2019 | Staresielsky et al. |
| 2020/0127826 A1 | 4/2020 | Ebrahimi et al. |
| 2020/0127832 A1 | 4/2020 | Ebrahimi |
| 2020/0145219 A1 | 5/2020 | Sebastian et al. |
| 2020/0265202 A1 | 8/2020 | Ebrahimi et al. |
| 2020/0267003 A1 | 8/2020 | Ebrahimi et al. |

FOREIGN PATENT DOCUMENTS

| | | |
|---|---|---|
| JP | 2008-518335 A | 5/2008 |
| JP | 2012-114907 A | 6/2012 |
| KR | 10-2013-0055794 | 5/2013 |
| WO | WO 2016/179334 | 11/2016 |
| WO | WO 2017/152150 | 9/2017 |
| WO | WO 2018/145127 | 8/2018 |
| WO | WO 2019/113552 | 6/2019 |

OTHER PUBLICATIONS

Extended European Search Report for European Application No. 16790050.5, dated Apr. 26, 2018, 10 pages.
Office Action for European Application No. 16790050.5, dated Nov. 21, 2019, 7 pages.
Notice of Reasons for Refusal for Japanese Application No. 2018-510317, dated Sep. 1, 2020, 6 pages.
Office Action for U.S. Appl. No. 15/146,872, dated Sep. 27, 2016, 8 pages.
Office Action for U.S. Appl. No. 15/146,872, dated Jun. 15, 2017, 12 pages.
International Search Report and Written Opinion for International Application No. PCT/US2016/030863, dated Sep. 14, 2016, 9 pages.
Office Action for U.S. Appl. No. 16/018,773, dated Jul. 28, 2020, 34 pages.
Office Action for U.S. Appl. No. 15/146,881, dated Oct. 13, 2016, 8 pages.
Office Action for U.S. Appl. No. 15/640,795, dated May 24, 2019, 8 pages.
Office Action for U.S. Appl. No. 15/878,353, dated Aug. 8, 2018, 14 pages.
Office Action for U.S. Appl. No. 15/208,580, dated Oct. 25, 2017, 9 pages.
Office Action for U.S. Appl. No. 15/208,580, dated Mar. 21, 2017, 8 pages.
Office Action for U.S. Appl. No. 15/208,580, dated Jul. 7, 2017, 9 pages.
Office Action for U.S. Appl. No. 15/784,093, dated Nov. 29, 2018, 9 pages.
Office Action for U.S. Appl. No. 15/784,093, dated Apr. 15, 2019, 11 pages.
Office Action for U.S. Appl. No. 16/019,411, dated Apr. 12, 2019, 12 pages.
Office Action for U.S. Appl. No. 16/019,411, dated Sep. 16, 2019, 9 pages.
Office Action for U.S. Appl. No. 16/697,110, dated Aug. 4, 2020, 7 pages.
Office Action for U.S. Appl. No. 16/986,817, dated Apr. 6, 2021, 10 pages.
Extended European Search Report for European Application No. 17760964.1, dated Oct. 24, 2019, 11 pages.
Office Action for European Application No. 17760964.1, dated Oct. 20, 2020, 3 pages.
Office Action for U.S. Appl. No. 15/449,902, dated Jun. 19, 2019, 10 pages.
International Search Report and Written Opinion for International Application No. PCT/US2017/020829, dated Jul. 17, 2017, 12 pages.

(56) References Cited

OTHER PUBLICATIONS

Office Action for U.S. Appl. No. 16/227,632, dated Oct. 27, 2020, 9 pages.
International Search Report and Written Opinion for International Application No. PCT/US2018/017136, dated Apr. 26, 2018, 12 pages.
Office Action for U.S. Appl. No. 16/697,131, dated Oct. 16, 2020, 12 pages.
Office Action for U.S. Appl. No. 16/656,459, dated Sep. 24, 2020, 8 pages.
Ellis, C., "Create Your Own Blockchain ID", Bitnation, Oct. 24, 2014, 14 pages.
Drew-Cordell, "Developer Creates Blockchain Passport Technology Based on Bitcoin", Oct. 31, 2014, 16 pages.
Kirk, J., "Could the Bitcoin network be used as an ultrasecure notary service?", IDG News Service, Computerworld, Inc., May 23, 2013, 3 pages.
Biggs, J., "Your Next Passport Could Be on the Blockchain", Oct. 31, 2014, 6 pages.
Dillet, R., "Stampery Now Lets You Certify Documents Using the Blockchain and Your Real Identity," Nov. 20, 2015, 6 pages.
Gupta, V., "State in a Box—Identity Services Architecture," CheapID, 2006-2009, 42 pages.
Menezes, A. J. et al., Chapter 9: Handbook of Applied Cryptography, CRC Press, Boca Raton, FL, pp. 321-383 (Oct. 1996).
Nakamoto, S., "Bitcoin: A peer-to-peer electronic cash system," Retrieved from the Internet: <URL:http://www.bitcoin.org>, Jan. 2009, 9 pages.
Github, Inc., "World Citizenship, Creating Affordable Decentralised Passport Services Using Available Cryptographic Tools," (Oct. 2014), Retrieved from the Internet on Nov. 17, 2017, <URL: https://github.com/MrChrisJ/World-Citizenship>, 12 pages.
Extended European Search Report for European Application No. 18885688.4, dated Jul. 23, 2021, 5 pages.

\* cited by examiner

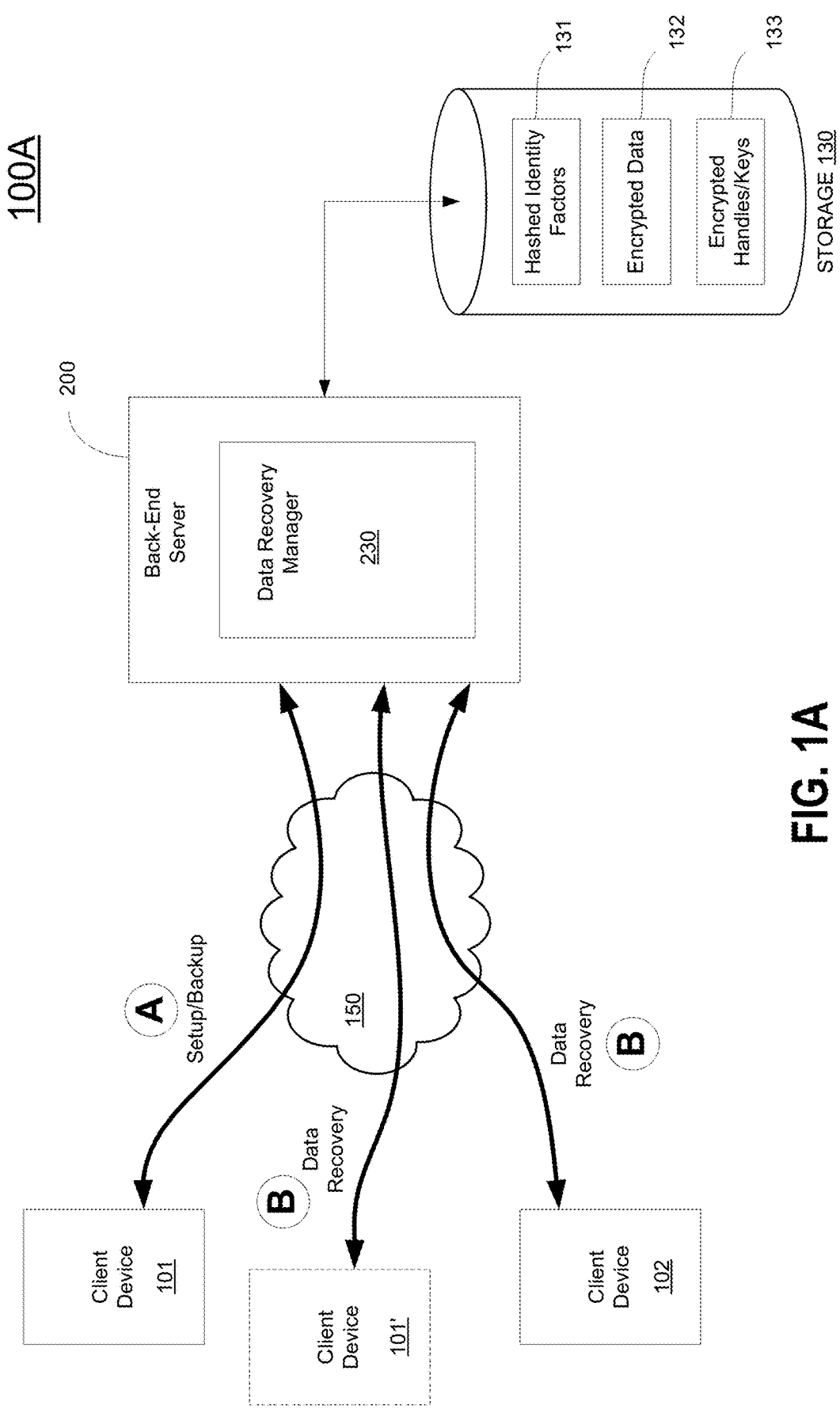

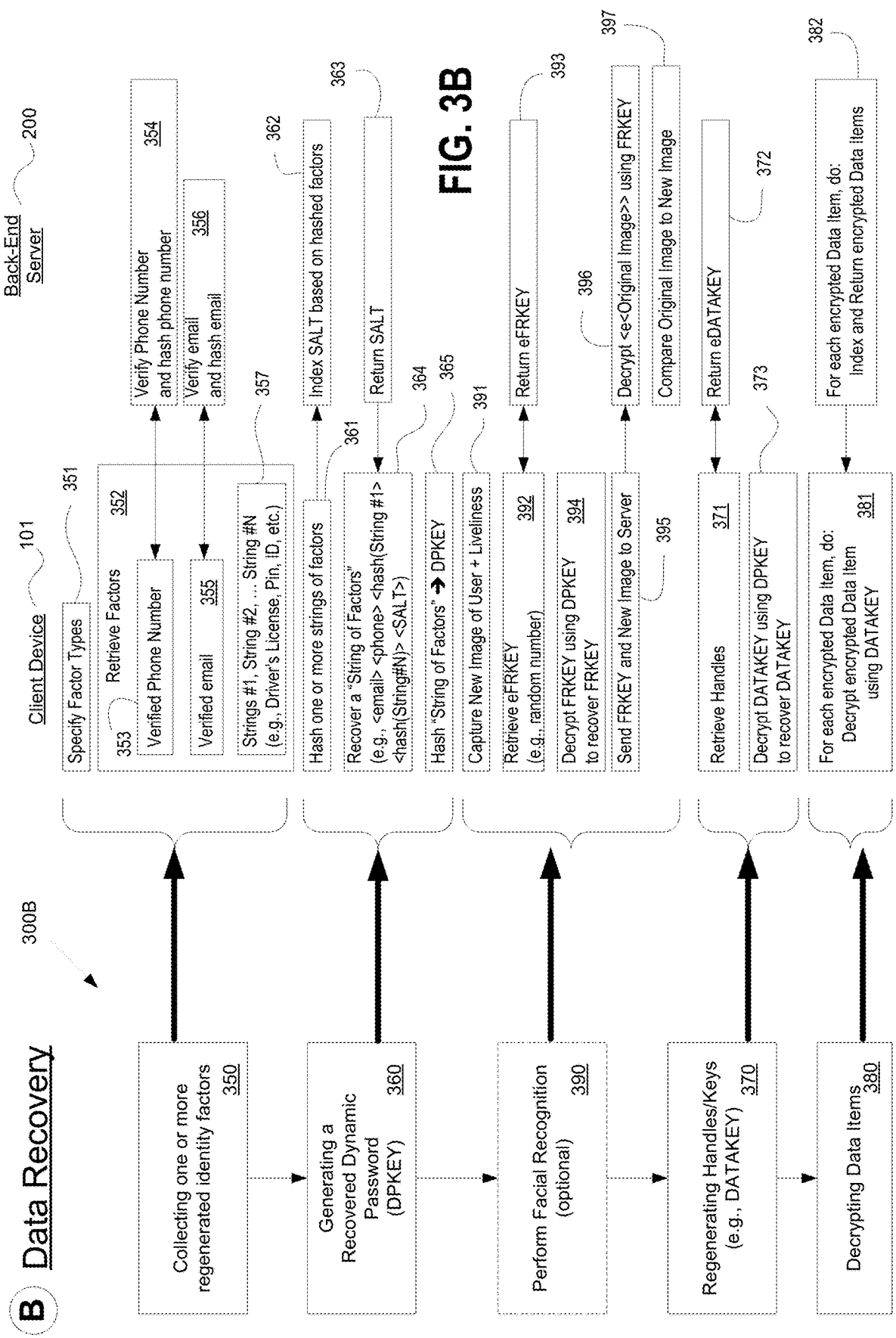

Simplified Bitcoin Block Chain

| | Consumer | User | Certifier | Verifier |
|---|---|---|---|---|
| Download App & perform initial setup | Receives incentive tokens | | | |
| Certification (e.g., KYC) | | Pays incentive tokens | Receives fee tokens from Certifier / Pays fee tokens to MSNP | |
| Certification by 3rd party | | Receives fee tokens from Certifier | Receives fee tokens from Verifier / Pays fee tokens to MSNP | Pays fee tokens to Certifier |
| Certifier verified by original certifier (fee charged per Time T of unused certifier fees) (modified / updated verifications) | | Receives fee from Certifier | Pays fee tokens to MSNP | |
| Recommend App to a friend | Receives incentive tokens | Pays incentive tokens | | |

FIG. 13

| | Credit Report (Sell) | KYC (Sell) | Credit Report (Get) | KYC (Get) |
|---|---|---|---|---|
| | $20 | $1 | $20 | $1 |
| | $0.50 | $0.50 | $2.00 | $2.00 |
| | 40 | 2 | 10 | 0.5 |
| | 40,000 | 2,000 | 10,000 | 500 |

FIG. 14

METHODS AND SYSTEMS FOR RECOVERING DATA USING DYNAMIC PASSWORDS

CLAIM OF PRIORITY

The present application claims priority to and the benefit of commonly owned U.S. Provisional Patent Application Ser. No. 62/747,020, filed on Oct. 17, 2018, entitled "Methods And Systems For Creating And Recovering Accounts Using Dynamic Passwords," which is herein incorporated by reference in its entirety. The present application claims priority to and the benefit of commonly owned U.S. Provisional Patent Application Ser. No. 62/596,434, filed on Dec. 8, 2017, entitled "Methods And Systems For Creating And Decrypting A Secure Envelope Whose Sender Can Be Verified On the Blockchain," which is herein incorporated by reference in its entirety.

TECHNICAL FIELD

The present embodiments relate to methods, systems, and programs for recovering data stored on a back-end server.

BACKGROUND

In a distributed identity environment, user data along with their private-key is stored on their mobile phone devices instead of a central database. This provides significant advantages for the user and can help in eliminating usernames and passwords. The private-key in effect becomes the password when paired with the corresponding public-key. However, unlike passwords, the private-key is never shared. However, if the phone device holding the private-key is lost or the App deleted, there is no way to reset that password or recover the data unless there is a backup. That is, if a user loses the private key, then the user would no longer be able to identify himself or herself or access records, such as those stored to a blockchain. If there is no backup, then it is nearly impossible to recovery the private-key and the data.

It is in this context that embodiments arise.

SUMMARY

The present embodiments relate to solving one or more problems found in the related art, and specifically to provide for the recovery of data using a dynamic password. The dynamic password is created as a split key including information generated at different devices, such as identity factors at a user device and a Salt generated at a server. In particular, data may be stored at the server and is recoverable when the dynamic password is recovered through presentation of the identity factors. Other methods and systems are presented for login without requiring a user to enter a username and password. Also, methods and systems are presented for authenticated login, registration and call center validation. Other methods and systems are presented for scanning a dynamic code on a browser screen to authorize user login. Still other methods and systems are presented for certified user generated data (e.g., biometrics). It should be appreciated that the present embodiments can be implemented in numerous ways, such as a method, an apparatus, a system, a device, or a computer program on a computer readable medium. Several embodiments are described below.

Embodiments of the present disclosure are described relating to methods and systems for recovering data. The method includes collecting one or more identity factors at a user device, wherein hashes of the one or more identity factors are configured to be stored at a server. The method includes generating at the user device a dynamic password based on the one or more identity factors and a Salt configured to be generated by the server and configured to be delivered to the user device. The method includes generating at the user device a data key and encrypting the data key using the dynamic password to generate an encrypted data key, wherein the encrypted data key is configured to be stored at the server. The method includes encrypting at the user device one or more data items using the data key to generate one or more encrypted data items, wherein the one or more encrypted data items are configured to be stored at the server. In that manner, one or more data items are recoverable by presenting the one or more identity factors to the server.

Other embodiments of the present disclosure are described relating to a non-transitory computer-readable medium storing a computer program for recovering data. The computer-readable medium including program instructions for collecting one or more identity factors at a user device, wherein hashes of the one or more identity factors are configured to be stored at a server. The computer-readable medium including program instructions for generating at the user device a dynamic password based on the one or more identity factors and a Salt configured to be generated by the server and configured to be delivered to the user device. The computer-readable medium including program instructions for generating at the user device a data key and encrypting the data key using the dynamic password to generate an encrypted data key, wherein the encrypted data key is configured to be stored at the server. The computer-readable medium including program instructions for encrypting at the user device one or more data items using the data key to generate one or more encrypted data items, wherein the one or more encrypted data items are configured to be stored at the server. In that manner, the one or more data items are recoverable by presenting the one or more identity factors to the server.

Still other embodiments of the present disclosure are described relating to a computer system including a processor and memory coupled to the processor and having stored therein instructions that, if executed by the computer system, cause the computer system to execute a method for recovering data. The method including collecting one or more identity factors at a user device, wherein hashes of the one or more identity factors are configured to be stored at a server. The method including generating at the user device a dynamic password based on the one or more identity factors and a Salt configured to be generated by the server and configured to be delivered to the user device. The method including generating at the user device a data key and encrypting the data key using the dynamic password to generate an encrypted data key, wherein the encrypted data key is configured to be stored at the server. The method including encrypting at the user device one or more data items using the data key to generate one or more encrypted data items, wherein the one or more encrypted data items are configured to be stored at the server. In that manner, one or more data items are recoverable by presenting the one or more identity factors to the server.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 1A is a system configured for secure data storage and recovery of the data, in accordance with one embodiment of the present disclosure.

FIG. 3B is a flow chart illustrating steps in a method for securely storing data and recovering that data during a data recovery stage, in accordance with one embodiment of the present disclosure.

FIG. 13 shows some examples of token exchanges, in accordance with one embodiment of the present disclosure.

FIG. 14 shows costs of digital credit reports, in accordance with one embodiment of the present disclosure.

DETAILED DESCRIPTION

Figure 1B:
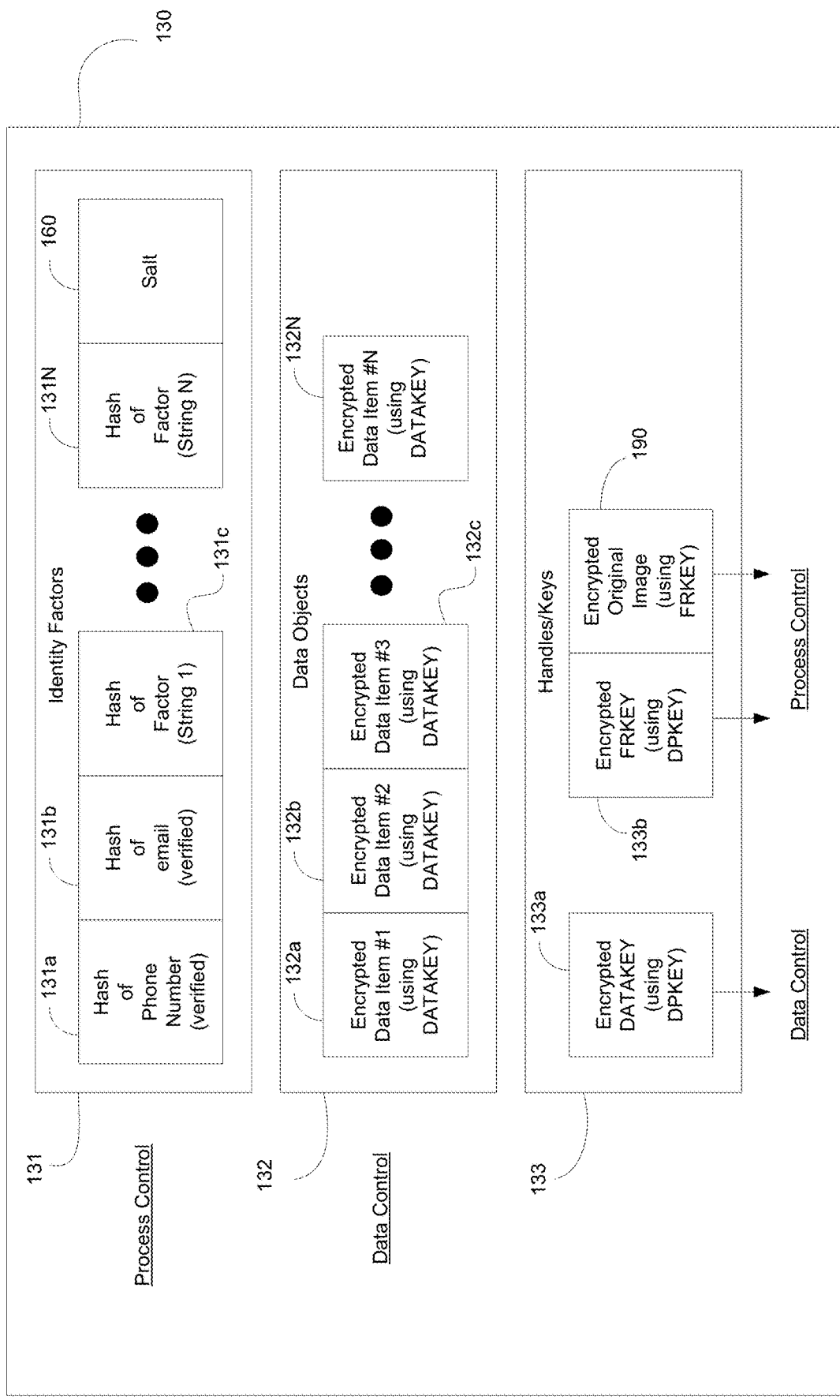
FIG. 1B illustrates information that is used for process control and data control when securely storing data and recovering the data, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods for encrypted data backup and recovery mechanisms that use a dynamic-password. The dynamic-password is a multi-factor, split-key that can be generated by the user during initial setup of the App and regenerated during recovery. In particular, embodiments of the present disclosure provide for the secure storage of data and for the recovery of that data after recovery of the split-key and/or other handles/keys. As an advantage, the data recovery process disclosed herein in embodiments is designed for user privacy so that the service provider can maintain the recoverable information but not read it or hijack it (in other words, maliciously reset it to access user data). In particular, embodiments of the present disclosure obfuscate the recoverable information in a way that only the true owner of the data is likely able to retrieve it. As a further advantage, the data recovery process does not require a password on top of other factors for recovery. Passwords can be hacked or forgotten. If the service provider is able to provide a forgot-password mechanism to reset the password, it would mean that the service provider then has the ability to maliciously reset the password on behalf of the user and access their data. Hence, while a password can be added to the recovery mechanism as an option in one embodiment, it is not required in other embodiments. However, when using a password as a factor, if the user does forget their password, data recovery may not be possible as knowledge of the password (as a factor) along with the other factors used to store data is necessary to recover the securely stored data.

With the above general understanding of the various embodiments, example details of the embodiments will now be described with reference to the various drawings.

Data Recovery Using a Split-Key Dynamic Password

FIG. 1A is a system 100A configured for secure data storage and recovery of the data, in accordance with one embodiment of the present disclosure. System 100A provides for encrypted data backup and recovery using a dynamic-password. In particular, system 100A provides for the secure storage of data, and for the recovery of that data after recovery of the dynamic password and/or other handles/keys, all of which are being used for securely storing the data and recovering the data. The dynamic password is a multi-factor, split-key that can be generated by the user during initial setup of the data recovery process (e.g., corresponding application) and regenerated during a recovery process, in one embodiment. Factors are used to generate the dynamic password. The factors can be configured by the user. The factors are maintained by and/or controlled by (e.g., visible to) the user, such that not even the service holding the encrypted data is able to decrypt it (e.g., the factors, data, handles/keys, etc.).

As shown, system 100A includes a client device 101 that is configured for performing a setup/backup process—A in cooperation with a back-end server 200 through network 150 (e.g., internet). In particular, the back-end server 200 includes a data recovery manager 230 that is configured for managing the secure storage of data and the information used for recovering the data. In particular, client device 101 is used to perform a setup/backup process, including defining identity factors used for generating a dynamic password. The dynamic password is a split key, wherein the client device 101 provides one part (e.g., the factors in some form), and the data recovery manager 230 provides another part (e.g., a Salt). After the factors are defined during the setup portion of the setup/backup process—A, additional handles and/or keys are generated that are used for securing the data and recovering the data.

During the backup portion of the setup/backup process—A, the data and other information is stored in data storage 130. In particular, the client device 101 encrypts the data using a handle, and sends the encrypted data to the data recovery manager 230 for storing at data storage 130. In addition to encrypted data 132, data storage 130 also stores hashed identity factors 131, encrypted handles/keys 133, and optionally an encrypted image of the corresponding user that is used during a facial recognition process.

The data may be recoverable by providing the identity factors through any device. For example, if client device 101 changes its configuration (e.g., resets itself to an initial state and losing all information previously stored on it) to become client device 101', then the client device 101' may be used to recover the data securely stored in storage 130 during a data recovery process—B. Also, if client device 101 is lost, then client device 102 may be used to recover the data securely stored in storage 130 during the data recovery process—B.

FIG. 1B illustrates information that is used for process control and data control when securely storing data and recovering the data, in accordance with one embodiment of the present disclosure. As shown, the information is stored in data storage 130. Because the information stored in the data storage 130 is encrypted in a manner undiscoverable by the data recovery manager 230, the encrypted data 132 cannot be revealed without knowledge of the identity factors, which are controlled by the user, and at least one of which is not passed to the back-end server 200 in a clear (e.g., unencrypted) manner.

The setup/backup and data recovery process may include a process control portion and a data control portion. For example, hashed identity factors 131 are stored in the storage 130 in the form of process control. In one embodiment, one or more factors may be verifiable, wherein a corresponding asset of the identity factor is verified. For instance, a phone number or email address/account may be verified assets, i.e., verifiable by the data recovery manager 230 at the back-end server 200. The phone number is verified and hashed by data recovery module 230, wherein the hashed phone number 131a is stored after verification. The email address is verified and hashed by the data recovery manager 230, wherein the hashed email 131b is stored after verification. Other factors may not be verified. In particular, client device 101 may define these additional factors (e.g., string 1 . . . string N), hash these additional factors for storing at the storage 130. For example, hash of factor string 1 (131c) . . . hash of factor string N (131N) are stored at data storage 130.

In addition, the data recovery manager 230 generates a Salt (e.g., random number) 160 after the identity factors are defined by the user. The Salt 160 is used as one portion of the split key (e.g., generated at different devices), and also stored at data storage 130. The Salt 160 is returned to the client device 101 for purposes of generating the dynamic password—the split key.

Further, for process control, an optional biometric recognition process may be performed, such as facial recognition. For purposes of illustration and clarity, the recognition process is described using facial recognition, but can involve any of one or more biometric factors (e.g., audio, fingerprint, facial features, smell, etc.). As such, encrypted handles and/or keys 133 used for facial recognition are stored in storage 130, including an encrypted facial recognition key (FRKEY) that is stored as eFRKEY 133b. In addition, for purposes of performing facial recognition, an encrypted original image 190 is also stored, wherein the original image is encrypted using the FRKEY by client device 101 and delivered to back-end server 200 for storing at storage 130.

Other encrypted handles and/or keys 133 are used for purposes of data control. In particular, client device 101 generates a data handle/key (e.g., DATAKEY) that is used to encrypt data. The DATAKEY may be a random number. The DATAKEY may be encrypted using the dynamic password (e.g., DPKEY). The client device 101 sends the encrypted DATAKEY (eDATAKEY 133a) to the back-end server 200 for storing at data storage 130.

Once all the handles/keys are generated, the data may be backed up and stored as encrypted data items 133. In particular, data items (e.g., piecemeal or combined into one or more data items) are encrypted using the DATAKEY. Once encrypted, each encrypted data item is then delivered to the back-end server 200 for storing at the data storage 130. In one embodiment, the data items are stored piece by piece, as illustrated in FIG. 1B. In other embodiments, the one or more data items are combined, and the combined data items are encrypted and stored. For purposes of illustration, data items are stored separately as is shown in FIG. 1B, and include encrypted data item #1 (132a), encrypted data item #2 (132b), encrypted data item #3 (132c) . . . encrypted data item #N (132N).

Figure 2B:
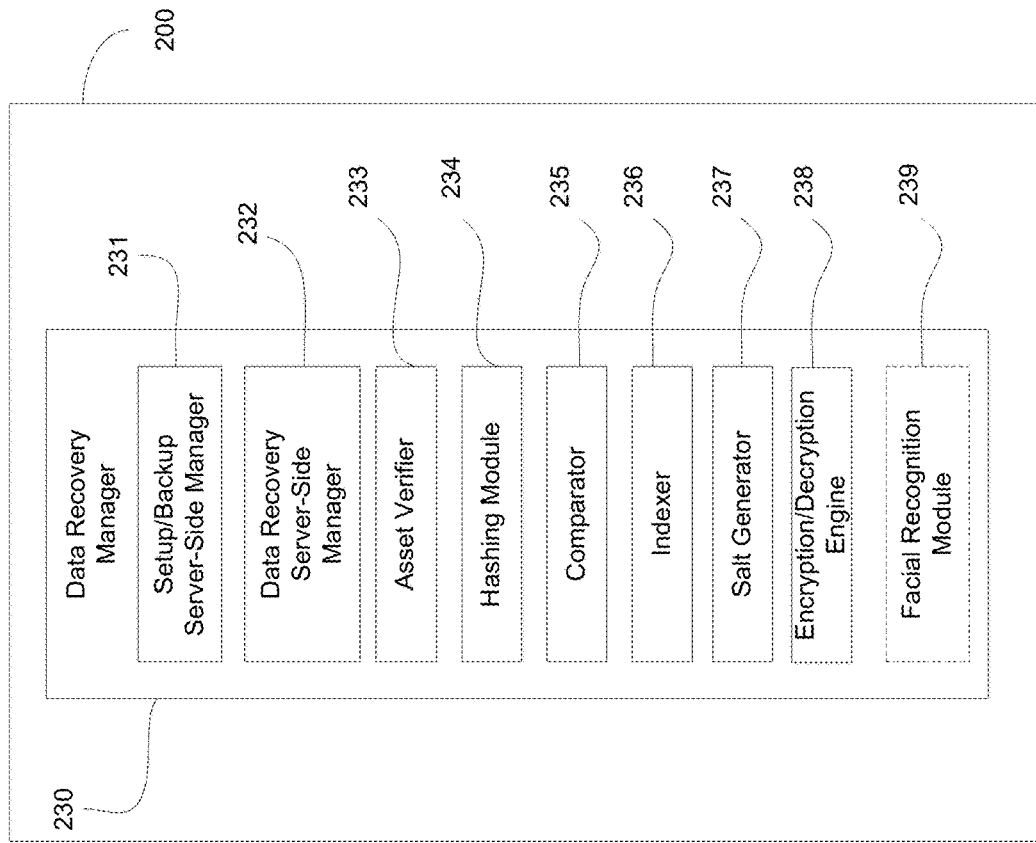
FIG. 2B is a block diagram of a server side data recovery manager used in the system of FIG. 1A that is configured for secure data storage and recovery of the data, in accordance with one embodiment of the present disclosure.
Figure 2A:
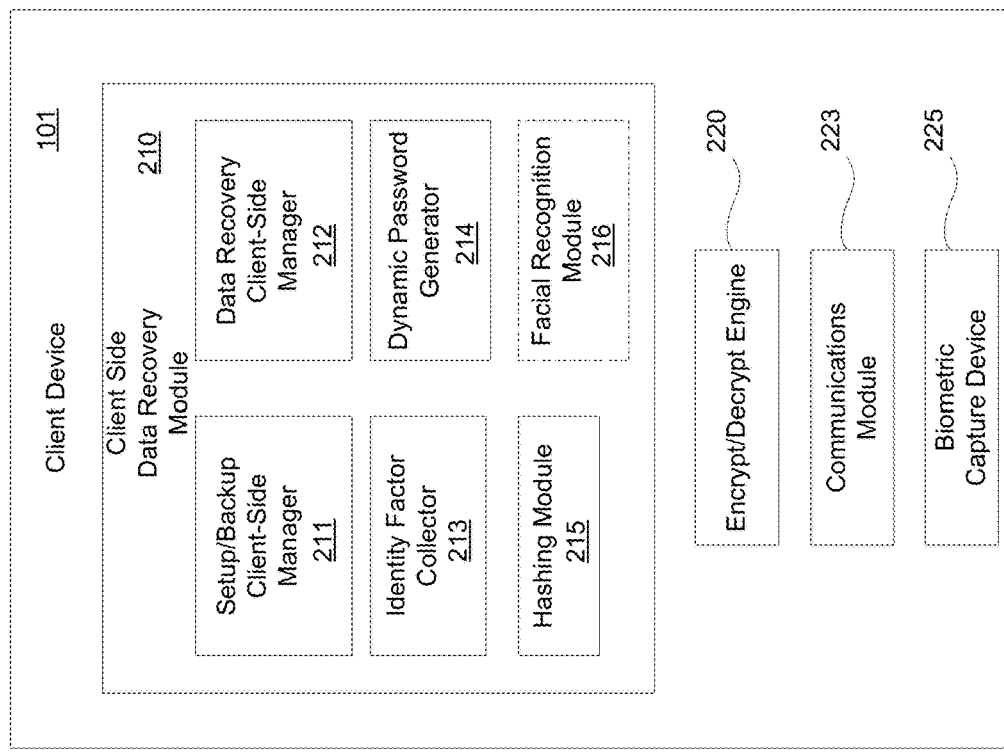
FIG. 2A is a block diagram of a client side data recovery module used in the system of FIG. 1A that is configured for secure data storage and recovery of the data, in accordance with one embodiment of the present disclosure.

FIG. 2A is a block diagram of a client side data recovery module 210 used in the system 100A of FIG. 1A that is configured for secure data storage and recovery of the data, in accordance with one embodiment of the present disclosure. Client side data recovery module 210 may be located within any client device, such as client device 101, client device 101', client device 102, etc. In particular, client side data recovery module 210 includes a setup/backup client side manager 211 configured to initiate the process by at least coordinating the defining of identity factors, generating dynamic password, and coordinating the storage of encrypted data, etc. The client side data recovery module 210 includes a data recovery client side manager 212 configured to recover data that is securely stored at a back-end server (e.g., encrypted data) by recovering the dynamic password and various handles/keys defined during the setup/backup process. In particular, the client side data recovery module 210 includes an identity factor collector 213 that is configured to collect one or more identity factors, each of which is user defined and controlled by the user. one or more identity factors may be associated with assets that are verifiable. Also, the client side data recovery module 210 includes a dynamic password generator 214 configured to be generated the split key dynamic password (DPKEY) that is based on a Salt generated by the data recovery manager 230 at the back-end server 200, and the identity factors. One or more of the identify factors may also be hashed when generating the DPKEY) using the hashing module 215. Optionally, the client side data recovery module 210 includes a facial recognition module 216 configured to perform biometric matching for authorizing the user.

In addition, the client side data recovery module 210 and/or client device 101 includes an encrypt/decrypt engine 220 configured to perform encryption and/or decryption using the proper keys. Also, the client side data recovery module 210 includes and/or client device 101 includes a communications module 223 that is configured to enable communications between devices over a network, wherein the communications includes texting, messaging, emailing, phoning, etc. The client side data recovery module 210 and/or client device 101 includes a biometric capture device 225 configured to capture biometrics of the user. For example, a facial image of the user may be captured.

FIG. 2B is a block diagram of a server side data recovery manager 230 used in the system of FIG. 1A that is configured for secure data storage and recovery of the data, in accordance with one embodiment of the present disclosure. The data recovery manager 230 may be located within back-end server 200. Server side data recovery manager 230 works in cooperation with the client side data recovery module 210 for secure storage of data and other information used for storing and/or recovering the data. The data recovery manager 230 includes a setup/backup server side manager 231 configured to coordinate the generation of the Salt portion of the split key dynamic password, as well as store encrypted versions of handles/keys, biometrics (e.g., original facial image), encrypted data, hashed identity factors, etc. The data recovery manager 230 includes a data recovery server side manager 232 that is configured to perform data recovery, such as verifying the presentation of the identity factors and delivering the encrypted data back to a requesting device. The data recovery manager 230 includes an asset verifier 233 that is configured to verify assets used as or associated with one or more identity factors, such as a phone number, email address, etc. The data recovery manager 230 includes a hashing module 234 configured to hash information, such as a verified asset. The data recovery manager 230 includes a comparator 235 configured to compare at least two pieces of information for purposes of determining whether identity factors presented for recovery match the identity factors used during setup/backup when securely storing the data and other information. The data recovery manager 230 includes an indexer 236 configured to index information based on other information. For example, hashed identity factors may be used to index the corresponding Salt, and also the corresponding encrypted data. The data recovery manager 230 includes a Salt generator 237 configured to generate the Salt value (e.g., random number) that is used as one portion of the split key, dynamic password (DPKEY). The data recovery manager 230 includes an encryption/decryption engine 238 configured to perform encryption and/or decryption using the proper keys. The data recovery manager 230 optionally includes a facial (e.g., biometric) recognition module 239 configured to perform biometric matching.

Figure 3A:
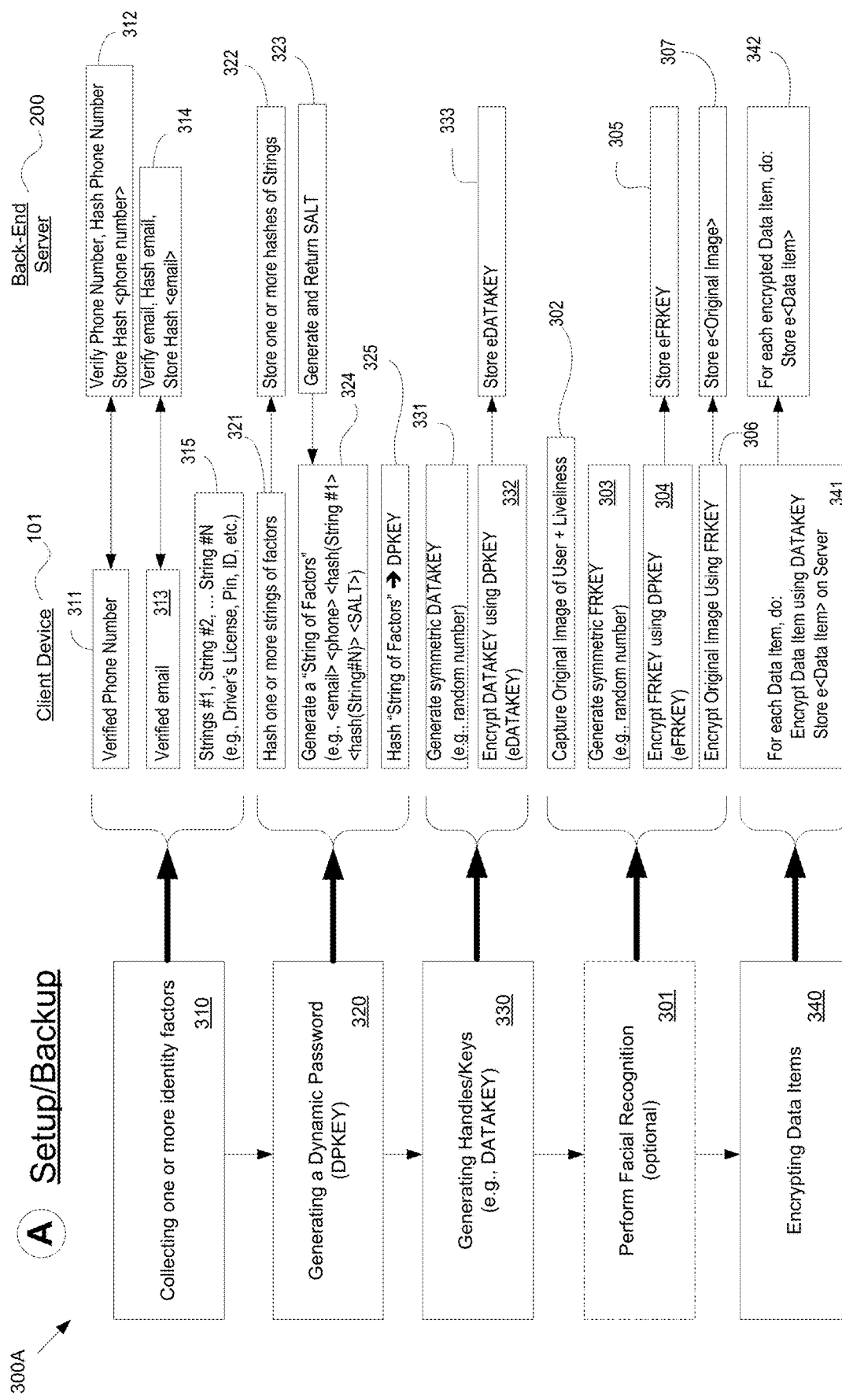
FIG. 3A is a flow chart illustrating steps in a method for securely storing data and recovering that data during a setup/backup stage, in accordance with one embodiment of the present disclosure.

FIG. 3A is a flow chart 300A illustrating steps in a method for securely storing data and recovering that data during a setup/backup stage, in accordance with one embodiment of the present disclosure. The method of flow chart 300A may be performed at the client device 101, and may involve information that is generated and/or processed at the back-end server 200 (e.g., using the data recovery manager 230). The method of flow chart 300A provides for encrypted backup of data using identity factors, a split key dynamic password, and one or more handles/keys, wherein the encrypted data may be recoverable with proper presentation of the identity factors. That is, the one or more data items are recoverable by presenting the one or more identity factors to the server. No particular ordering of the steps in the method shown in flow chart 300A is required, unless required for processing information.

In addition, the method of flow chart 300A may be implemented without the use of password that may be hacked or forgotten. Passwords may be discoverable by a malicious party, such as when the service provider provides a forgot-password mechanism that is compromised, such that the service provider maliciously resets the password and accesses the encrypted data without permission. In one embodiment, a password may be used as an identity factor, but is not solely used for data storage and recovery. That is, while a password can be added to the recovery mechanism as an option, it should not be required. But note that with this option, if the user does forget their password as a factor, account recovery may not be possible.

At 310, the method includes collecting one or more identity factors at a user device. The identity factors are defined by and controlled by the user. Hashes of the one or more identity factors are configured to be stored at a back-end server 200. In that manner, the server is unaware of the identity factors because they are un-reversibly hashed. As such, the identity factors can be represented at a later time, during a data recovery process.

For example, the identity factors can include a phone number, an email address, a form of identification (ID) (e.g., driver's license, password, PIN, military ID, government ID, passport, etc.). The identity factors are received as input into the client or user device. For example, the identity factors can be entered in manually, scanned in (e.g., front of driver's license, or code on driver's license), delivered from another device, or through any other delivery method.

In one embodiment, at least one identity factor is verifiable, wherein the verifiable identity factor is or is associated with an asset whose ownership is verifiable by the server. For purposes of illustration only, a phone number and email address are each verifiable, such as by the back-end server. Still other factors are verifiable.

Embodiments of the present disclosure provide for means to collect a verified phone number from the user. In particular, as shown in FIG. 3A, at 311 the user specifies the phone number as an identity factor, which is verifiable. At 312, the phone number is delivered to the back-end server 200 for verification. The phone number may also be hashed by the server 200, wherein the hashed phone number is stored. In addition, at 313, the user may specify an email as an identity factor, which is verifiable. At 314, the email is delivered to the back-end server 200 for verification. The email may also be hashed by the server 200, wherein the hashed email is stored.

During the verification process, in one embodiment the method includes sending from the user device to the server access information for accessing the asset, wherein the server delivers an authentication code (e.g., temporary pin #, or some multi-factor) to the asset (e.g., deliver a text message with the authentication code to the phone number). Because the user has access to the asset (e.g., the phone number), the user can access the authentication code, and deliver that authentication code from the client device back to the listening phone number of the data recovery service provider.

In another embodiment, during the verification process, proof of control of the asset may be shown by sending a message (e.g., text) from the asset to the server, wherein the message includes asset identifying information of the asset. That is, verification of the asset is performed by sending a text message by the client device. For example, the phone number can be registered with the data recovery service provider using a numbers of ways, such as using the phone's native messenger (e.g., iMessenger on iOS). During the setup/backup stage, the client device (e.g., mobile phone) may invoke its native messenger (e.g., iMessenger on an iOS device), which may prefill certain text fields (e.g., Recipient "To" Phone Number or Email, which corresponds to the data recovery service provider's listening phone # or email address). A text message is sent and identifies the request to register the user's phone number. The text message may include other identifying information, such as SIM card information, Hash (ID) and the user's registered ShoCardID. The system will listen for this text message using the pre-filled recipient's phone number or email address. Then the system decrypts the text message and verifies the ShoCardID.

At 315, one or more additional identity factors may be defined by the user, wherein these additional factors are not verified. For example, an identity factor may include a driver's license, wherein the license includes known fields of information that may be concatenated into a string in a predefined order (e.g., <name><age><height> <address><birthdate>, etc.). Other identity factors may include a PIN number, other forms of identification (e.g., military ID, government ID, passport, etc.) each of which includes known fields of information, password, etc. Still other identity factors may be unique to a user. For example, an identity factor may include a string of words (e.g., from a book, or generated by the user). Each of these additional identity factors are defined by a corresponding string, such as string #1, string #2, string #3, etc.

For purposes of illustration, an example is provided wherein the identity factors includes a verified phone number, a verified email, string #1 . . . string #N. The strings #1 through #N may include any additional identity factor, as previously described, such as driver's license, PIN, etc.

At 320, the method includes generating at the user device a dynamic password based on the one or more identity factors and a Salt configured to be generated by the server and configured to be delivered to the user device. In particular, at 321 the client device 101 is configured to hash the additional identity factors, previously described. Throughout the specification, any know hash algorithm may be used for hashing information. In one embodiment, the client device hashes each of the identity factors. In one embodiment, the client device hashes only the additional identity factors, as the server knows the clear form of the verified identity factors, and can therefore hash those verified identity factors. In one embodiment, each of the identity factors is hashed separately and stored separately. In other embodiments, factors may be combined, such that one or more combinations of identity factors, as well as individual factors, may be hashed and stored. As such, at 322, the hashed identity factors are delivered to the back-end server 200 for storage.

Once all of the identity factors are identified, hashed, and stored, the back-end server 200 generates the Salt. In one embodiment, the Salt is a random number. The Salt is one of the portions of the split key, dynamic password (DPKEY). At 323, the Salt is returned to the client device 101 for purposes of generating the dynamic password.

In particular, at 324 the client device generates a combined string of all the identity factors, which is the other portion of the split key, and the Salt. There is a predefined order to the identify factors and Salt in the combined string. That is, the combined string may include hashes of one or more identity factors, and the Salt. In one embodiment, the combined string includes clear forms of verified identity factors, such as email and phone number. One example of a combined string includes clear forms of verified identity factors, and hashed forms of additional identity factors. For example, the combined string may be defined as: "<email><phone number><hash-string #1><hash-string #2> . . . <hash-string #3><Salt>". Although the dynamic password is generated from one combined string of identity factors and Salt, other embodiments may generate the dynamic password using one or more strings of identity factors and/or Salt.

At 325, the client device 101 hashes the combined string of identity factors to generate the dynamic password (DPKEY). The dynamic password is used for recovering data without necessarily knowing the keys used to encrypt that data. In that manner, no form of the dynamic password is passed to the back-end server 200, so that the back-end server is unable to discover the dynamic password.

At 330, the method includes generating handles and or keys that are used during the setup/backup and data recovery stages. In particular, at 331 a DATAKEY is generated. In one embodiment, the DATAKEY is a symmetric key, such as a random number. In addition, at 332 the client device 101 encrypts the DATAKEY data key using the dynamic password (DPKEY) to generate an encrypted DATAKEY (e.g., eDATAKEY). Further, the encrypted DATAKEY is delivered to the back-end server 200 for storage at 333. In that manner, the DATAKEY is hidden from the server through encryption, and because the server does not have access to the DPKEY used to encrypt the DATAKEY, the DATAKEY remains hidden throughout the setup/backup and recovery processes.

At 340, encrypting at the user device one or more data items using the DATAKEY to generate one or more encrypted data items, wherein the one or more encrypted data items are configured to be stored at the server 200. In one embodiment, each of the data items or objects are stored separately. In another embodiment, data items may be combined for storage (e.g., in pairs, or any predefined number of items to include one or more combined items).

The individual data items may be any user defined item. For example, a data item may be a private key of a public/private key pair, sensitive personal information, banking information, identification documents, passport, driver's license, documents, etc. Identity factors may or may not be included as a data item.

At 341, for each data item, that data item is encrypted using the DATAKEY at the client device 101. Thereafter, at 342 the encrypted data item is delivered to the back-end storage for storing.

At 301, the method may optionally perform a biometric recognition process. For purposes of illustration, a facial recognition process is used as a representative biometric recognition process. In addition, one or more biometrics may be used for verification of the user. In particular, in addition to the identity factors described above, the data recovery service provider can incorporate server side facial recognition as an additional factor before granting recovery data to the user. This can be accomplished without the server maintaining a copy of the user's image in raw form in its services, as described below. This helps maintain anonymity of the user and protection against a data breach so that the user's data is not identified.

When an optional recovery field for facial recognition is selected during the setup/backup stage (e.g., in the Data Recovery initialization page or form), the user will be asked during registration to ensure that a selfie is taken within the app. That is, a biometric of the user is captured using a capture device, such as a facial image. In particular, at 302, the method includes capturing at the client device 101 an original image of a user. In one embodiment, a liveliness test is also conducted. The liveliness test may ensure that only live images of the user are captured, such as by ensuring consistency of background colors, instructing the user to move and/or make particular facial gestures, etc.

In addition, at 303, the method includes generating a facial recognition key (FRKEY) at the client device 101. In one embodiment, the facial recognition key comprises a random number that is used as a symmetric-key. At 304, the symmetric FRKEY is encrypted using the dynamic password (DPKEY). That is, the method includes generating at the client device an encrypted facial recognition key using the dynamic password, wherein the encrypted facial recognition key (eFRKEY) is configured to be stored at the server at 305. Further, at 306, the client device uses the FRKEY to encrypt the selfie (e.g., the original facial image). That is, the method includes encrypting at the client device the original image using the facial recognition key (FRKEY) to generate an encrypted original image, wherein the encrypted original image is configured to be stored at the server at 307. As such, the encrypted FRKEY (eFRKEY) and the encrypted original image are then stored with the recovery-server 200. In one embodiment, the objects are stored as a special pair of objects—the selfie-object, that are later used for facial recognition of the user during a recovery process, as will be described below in relation to FIG. 3B. That is, the user is authenticated for purposes of data recovery using a facial recognition process.

In one embodiment, one or more identity factors may be changed, wherein an updated dynamic password is created. Changing an identity factor does not affect the storage of the encrypted data, as the data is encrypted using the DATAKEY, and not the dynamic password. In particular, the method includes collecting a new set of one or more identity factors at the user device, wherein the new set includes an updated identity factor. Also, the new set of one or more identity factors replaces the one or more identity factors, previously used to create the original dynamic password. In addition, the method includes generating at the client/user device a new dynamic password based on the new set of one or more identity factors and the Salt. That is, the Salt is reused, and is known to the client device. The method includes encrypting at the client device the DATAKEY using the new dynamic password to generate a new and/or updated encrypted DATAKEY (new eDATAKEY), wherein the new encrypted data key replaces the encrypted data key (the original eDATAKEY) and is configured to be stored at the server. As such, the one or more data items are recoverable by presenting the new set of one or more identity factors to the server.

FIG. 3B is a flow chart illustrating steps in a method for securely storing data and recovering that data during a data recovery stage, in accordance with one embodiment of the present disclosure. The method of flow chart 300B may be performed at the client device 101, and may involve information that is generated and/or processed at the back-end server 200 (e.g., using the data recovery manager 230). The method of flow chart 300B provides for recovery of encrypted backup of data using newly presented identity factors, wherein the identity factors were originally used along with a split key dynamic password, and one or more handles/keys to encrypt the data. As such, the one or more data items are recoverable by presenting the one or more identity factors to the server. No particular ordering of the steps in the method shown in flow chart 300B is required, unless required for processing information.

At 350, collecting one or more regenerated identity factors. As previously described, the regenerated identity factors were used along with a split key dynamic password, and one or more handles/keys to encrypt the data. The regenerated identity factors may be collected at the client device 101, or any other client device (e.g., second client device, reconfigured client device 101', client device 102, etc.).

More particularly, during the collection step, at 351 the method includes having the user specify the identity factor types. In that manner, the identity factors can be arranged in the proper order when recovering various passwords and/or handles/keys, etc. Also, as the information is entered, the information may be classified according to its proper type.

At 352, the method includes retrieving the regenerated identity factors at the client device. For example, each of the one or more regenerated identity factors are received as input into the second user device (e.g., manual input, scan, etc.). The identity factors are regenerated by the user for the purpose of recovering handles/keys, dynamic password, and the encrypted data. For example, the dynamic password may have been lost when losing the original phone used to setup/backup and store the encrypted data.

The retrieving step includes one or more additional steps, for example. As previously described, the identity factors may include one or more verified identity factors. For purposes of illustration only, two verified identity factors are used and include a phone number and an email, as previously introduced. For example, when there is a verified identity factor, at 352 the method includes retrieving the verified identity factor, such as the verifiable phone number retrieved at 353. If the client device is a new device, the same phone number is used for the new device, in one implementation. At 354, the phone number is delivered to the back-end server 200, wherein the phone number is verified, as previously described during the setup/back stage. In addition, the phone number is hashed for purpose of matching. Also, if there are multiple verified identity factors, at 355 the method includes retrieving the verified identity factor, such as the verifiable email. At 356, the email is delivered to the back-end server 200, wherein the email is verified, as previously described during the setup/back stage. In addition, the email is hashed for purpose of matching.

Also, any additional regenerated identity factors are retrieved at 357, wherein these additional regenerated identity factors are not verified during the recovery stage. For example, these additional regenerated identity factors may include an ID (e.g., driver's license, military ID, government ID, password, PIN, etc.). For example, the regenerated identity factors are formed as strings (string #1, string #2 . . . string #N).

At 360, the method includes generating at the client device a recovered dynamic password based on the one or more regenerated identity factors and the Salt received from the server. In particular, at 361 the method includes hashing one or more strings of identity factors. That is, the identity factors are arranged and/or combined in a predefined manner. For example, identity factors may be separately hashed, or first combined in various combinations and then hashed. For purposes of illustration, the individual identity factors and their corresponding strings are individually hashed and delivered to the back-end server 200.

At 362, the method includes comparing the hashed strings of regenerated identity factors against hashed identity factors previously received and stored. That is, the method includes sending the one or more hashes of the one or more regenerated identity factors to the server for comparison against the one or more hashes of the one or more identity factors configured to be stored at the server. When a match occurs, the hashed regenerated identity factors can be used to index the corresponding Salt, previously introduced. That is, the Salt is configured to be delivered to the user device when the one or more hashes of the one or more regenerated identity factors closely match the one or more hashes of the one or more identity factors configured to be stored at the server. At 363, the Salt is returned to the client device 101.

At 364, the method includes recovering the combined string of identity factors, to include one or more regenerated identity factors, or one or more hashed regenerated identity factors, and/or the Salt. The recovered combined string of identity factors is aligned and matches the originally created combined string of identity factors. For example, the recovered combined string of identity factors may follow the previous example, and be defined as: "<email><phone number><hash-string #1><hash-string #2> . . . <hash-string #3><Salt>".

At 365, the method includes hashing the combined string of regenerated identity factors to generate the dynamic password (DPKEY), now recovered through proper presentation of the identity factors. The DPKEY can be used to recover handles and/or other keys.

At 390, the data recovery process optionally performs facial recognition or more generally, a biometric recognition process, which is a form of process control. As previously described, facial recognition is used as a representative example. In one embodiment, facial recognition is performed prior to receiving a handle and/or key that is used for data recovery, such as the encrypted DATAKEY (eDATAKEY). In that manner, if the facial recognition process fails (e.g., as performed by the back-end server 200), then the encrypted DATAKEY (eDATAKEY) is not passed from the server to the client device 101. On the other hand, if the facial recognition process is successful, then the data recovery process proceeds, such as passing the eDATAKEY to the client device 101. In addition, facial recognition can be performed at a different point in the data recovery stage, such as before the generation of the dynamic password at 360, or even before the collection of one or more regenerated identity factors 350. Failure of the facial recognition process halts the data recovery process, wherein a successful facial recognition process allows the data recovery process to continue.

In particular, at 391 the method includes capturing at the client device a new image of the user. Also, optionally a liveliness test may be performed when capturing the new image.

The method includes generating at the client device the facial recognition key by decrypting, using the recovered dynamic password, the encrypted facial recognition key received from the server. In particular, at 392, the method includes retrieving the encrypted facial recognition key (eFRKEY) by making a request to the server, and at 393, the server 200 returns the eFRKEY. In one embodiment, the server may automatically deliver the facial recognition key during the recovery process. At 394, the method includes decrypting the eFRKEY using the recovered dynamic password (DPKEY). In that manner, the clear form of the facial recognition key (FRKEY) is recovered.

Further, the method includes at 395 delivering from the client device the facial recognition key (FRKEY) and the new image to the server 200, wherein the server compares the new image to the original image that is accessed by decrypting the encrypted original image with the facial recognition key. In particular, at 396, the server decrypts using the received FRKEY the encrypted original image, which was previously stored and indexed (e.g., using the hashed regenerated identity factors), to obtain the clear form of the original image. The FRKEY may be temporarily stored at the server 200 for purposes of data recovery, but not permanently stored. The original image that is decrypted and the received new image are compared against each other to authenticate the user. When the two match, then the data recovery process continues, such as proceeding to 370, in part to regenerate handles/keys through the return of the encrypted DATAKEY (eDATAKEY). Otherwise, when no match occurs, then the data recovery process ends.

In particular, at 370, the method includes decrypting at the client device using the recovered dynamic password (DPKEY) the encrypted DATAKEY received from the server. In particular, at 371 and 372, the client device 101 retrieves the handles/keys that are stored on the server. In particular, the server returns the encrypted DATAKEY (eDATAKEY), which was previously encrypted using the dynamic password. As such, at 373, the method includes decrypting the encrypted DATAKEY (eDATAKEY) at the client device 101 using the recovered dynamic password (DPKEY). In that manner, the DATAKEY is recovered at the client device 101, and can be used to also recover the encrypted data.

At 380, the method includes decrypting at the user device the one or more data items using the recovered dynamic password, the one or more data items being received from the server. In particular, at 381 and 382 for each item of data that is stored on the server the items of data are indexed (e.g., using the matched hashes of regenerated identity factors) and returned to the client device 101. Also, for each of the encrypted data items received, the encrypted data item is decrypted using the recovered DATAKEY.

FIGS. 4A-4B, 5, and 6 provide an example of recovering data that may be stored and encrypted using a private key (e.g., of a user), in accordance with one embodiment of the present disclosure. In particular, in a distributed identity environment, user data along with their private-key may be stored on their mobile phone devices instead of a central database. This provides significant advantages for the user and can help in eliminating usernames and passwords. The private-key in effect becomes the password when paired with the corresponding public-key. However, unlike passwords, the private-key is never shared. However, if the phone device holding the private-key is lost or the application performing embodiments of the present disclosure (e.g., App) becomes deleted, there is no way to reset that password or recover the data without starting from scratch unless there is a backup. Embodiments of the present disclosure provide for encrypted backup and recovery mechanisms that use a dynamic-password, which is a multi-factor, split-key that can be generated by the user during initial setup of the App and regenerated during recovery. The factors can be configured by the user and maintain information controlled by (e.g., visible to) the user where not even the service holding the encrypted data is able to decrypt it. The process described in FIGS. 4A-4B, 5, and 6 may be implemented in portions of the process previously described for data storage and recovery of FIGS. 1A-1B, 2A-2B, and 3A-3B.

For all effective purposes, embodiments identify users with a unique pair of private/public keys on the user's device. If a user loses the private key, then that user would no longer be able to identify himself or access records that may be stored on a blockchain, for example. If the user has a backup of their App/phone, then they can likely restore their App and data and regain access to their private key and records on the blockchain. However, if the user doesn't have a backup, that user will need a means to recover his account via an Account Recovery process, as described below.

The data recovery process is designed for user privacy so that the data recovery service provider can maintain the recoverable information but not read it or hijack it (in other words, maliciously reset it to access user data). Embodiments of the present disclosure obfuscate the recoverable information in a way that only the true owner of the data is likely able to retrieve it. As previously described, the data recovery process does not require a password. However, a password may be included as an identity factor if desired by the user.

Embodiments provide the means to help users recover their data when they lose their private key, and it does this through the mechanism of Dynamic Passwords, a split-key mechanism requiring at least three factors for recovery, but no password. The split-key includes the information the user has on the device plus the Salt that is maintained on and retrieved from the server. Through this mechanism, embodiments allow the user to protect its data in an encrypted form. The encryption is done in a manner such that the server is unable to decrypt the information. Recovery is not knowledge based (e.g., use of a password alone). It requires the user to have access to multiple assets.

In order to create an account that can be recovered with dynamic passwords, the embodiment requires the user to have access to multiple assets and provide three pieces of proof, which stand for three specific factors that when combined increase the confidence that the real user is requesting the private key, in one embodiment. For example, the user has:

1. An Identification Card [such as a government ID (e.g., a Drivers' License, Passport, Military ID), a String, an Image, etc., or any combination thereof];
2. Access to his Email; and
3. Access to his Phone Number.

Both the email and the phone number can be verifiable, meaning the user is able to access his email and phone number in order to prove that he owns it. Simply knowing the email address or phone number is not sufficient as any hacker will easily be able to know them as well.

Embodiments provide the means to store and recover data using one or more dynamic passwords. It begins by requesting and hashing the three pieces of data (i.e., ID Card, Email, and Phone Number).

Further, embodiments provide a means to collect and hash the User's ID card information. For example, one embodiment collects the ID Card fields by enabling the user to take a picture of his or her ID. It then scans the document for data using Optical Character Recognition (OCR). The App separates each extracted field of the ID card into key=value pairs, resulting in ID card meta data.

For example, for a Drivers' License used as an ID, each of the following fields (as available in the state or country issued) could be extracted: First Name, Last Name, License Number, Gender, DOB, Street, City, State, Zip. For other forms of ID, for example a passport the fields may be: First Name, Last Name, Gender, ID Number, Expiration Date, Issuing Country, Birth Date. Whatever fields are provided on the ID will get extracted and separated into key=value pairs.

Figure 4A:
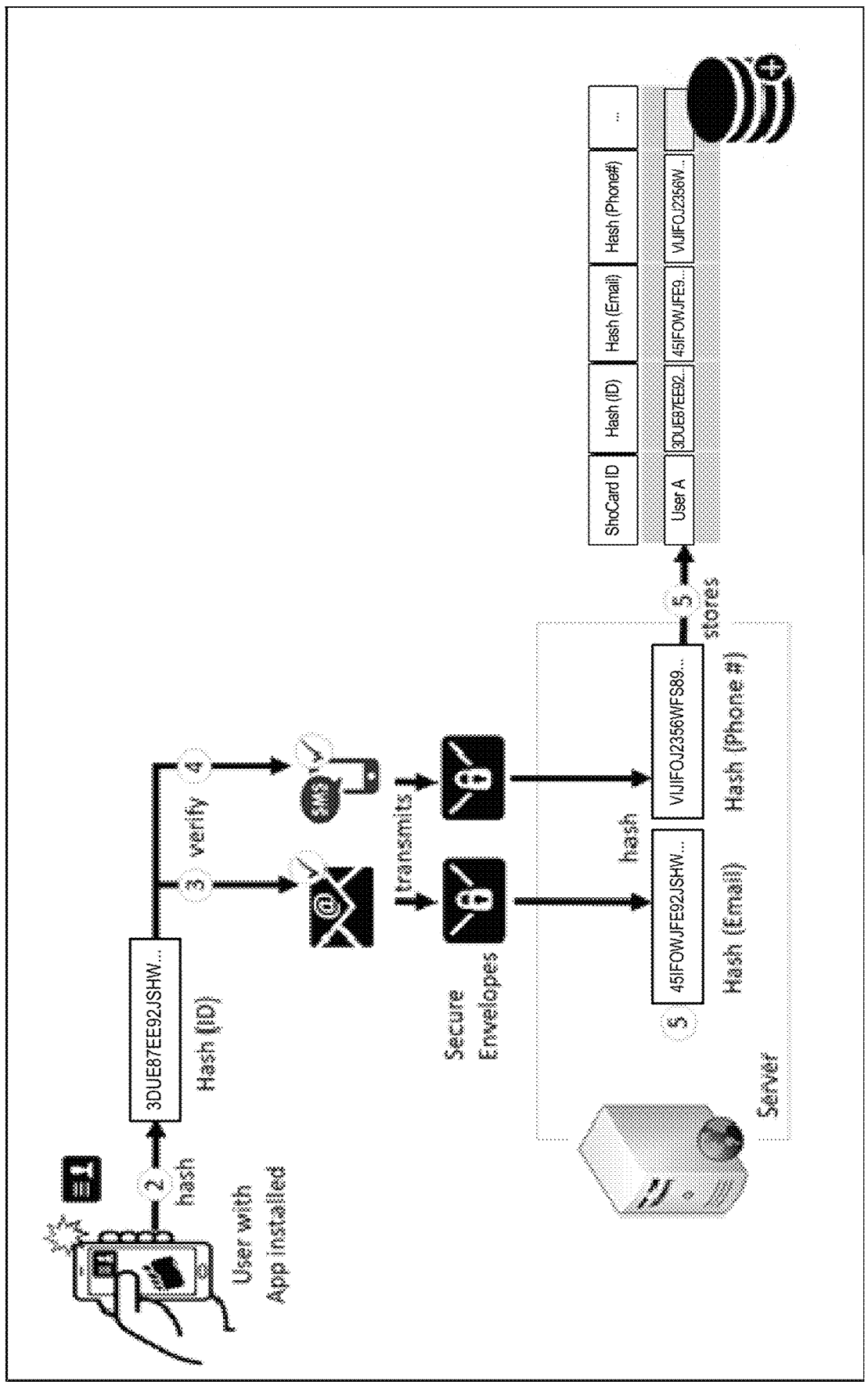
FIG. 4A shows a registration process using dynamic passwords, in accordance with one embodiment of the present disclosure.
Figure 4B:
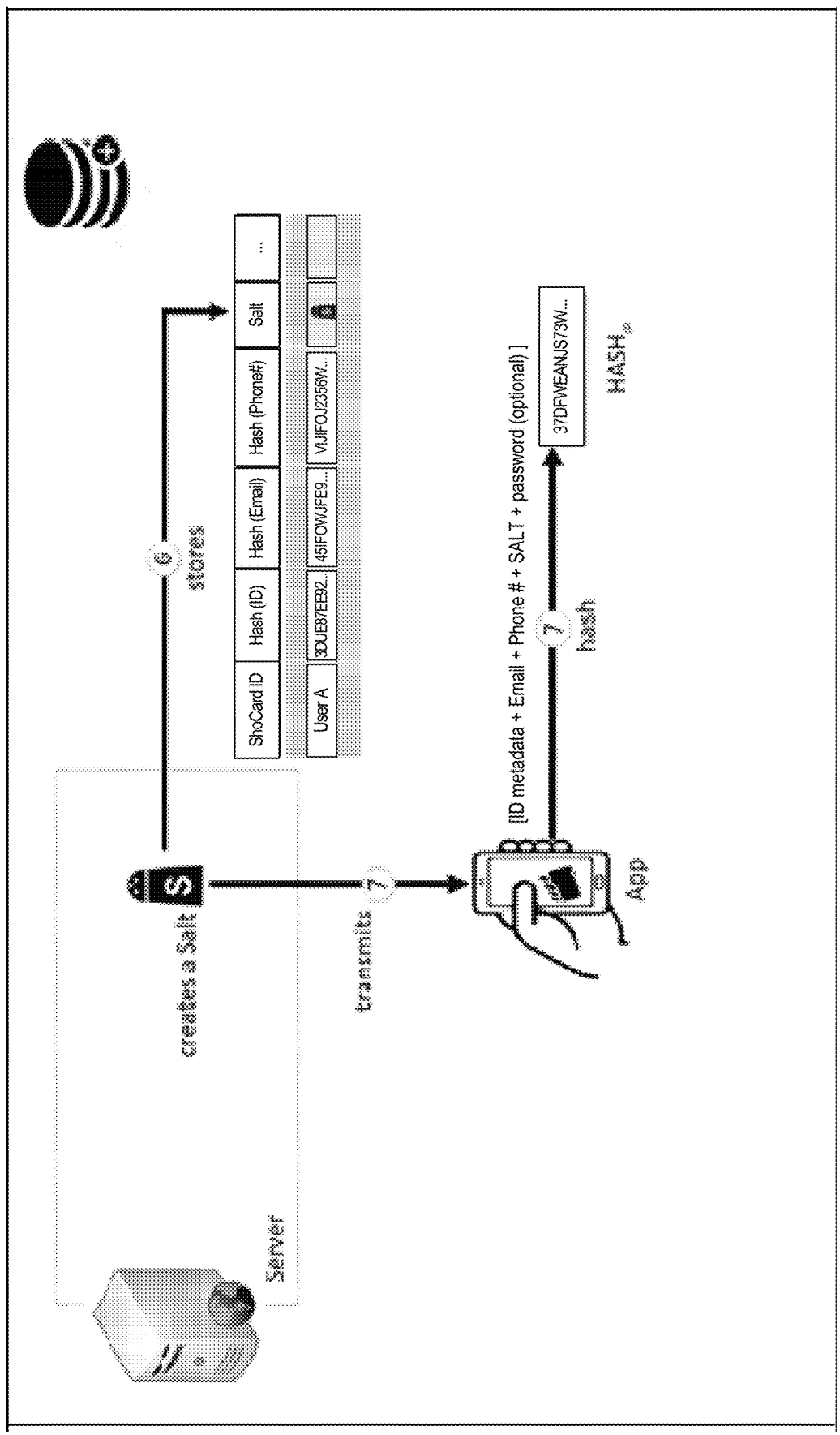
FIG. 4B shows a registration process using dynamic passwords, in accordance with one embodiment of the present disclosure.
Figure 5:
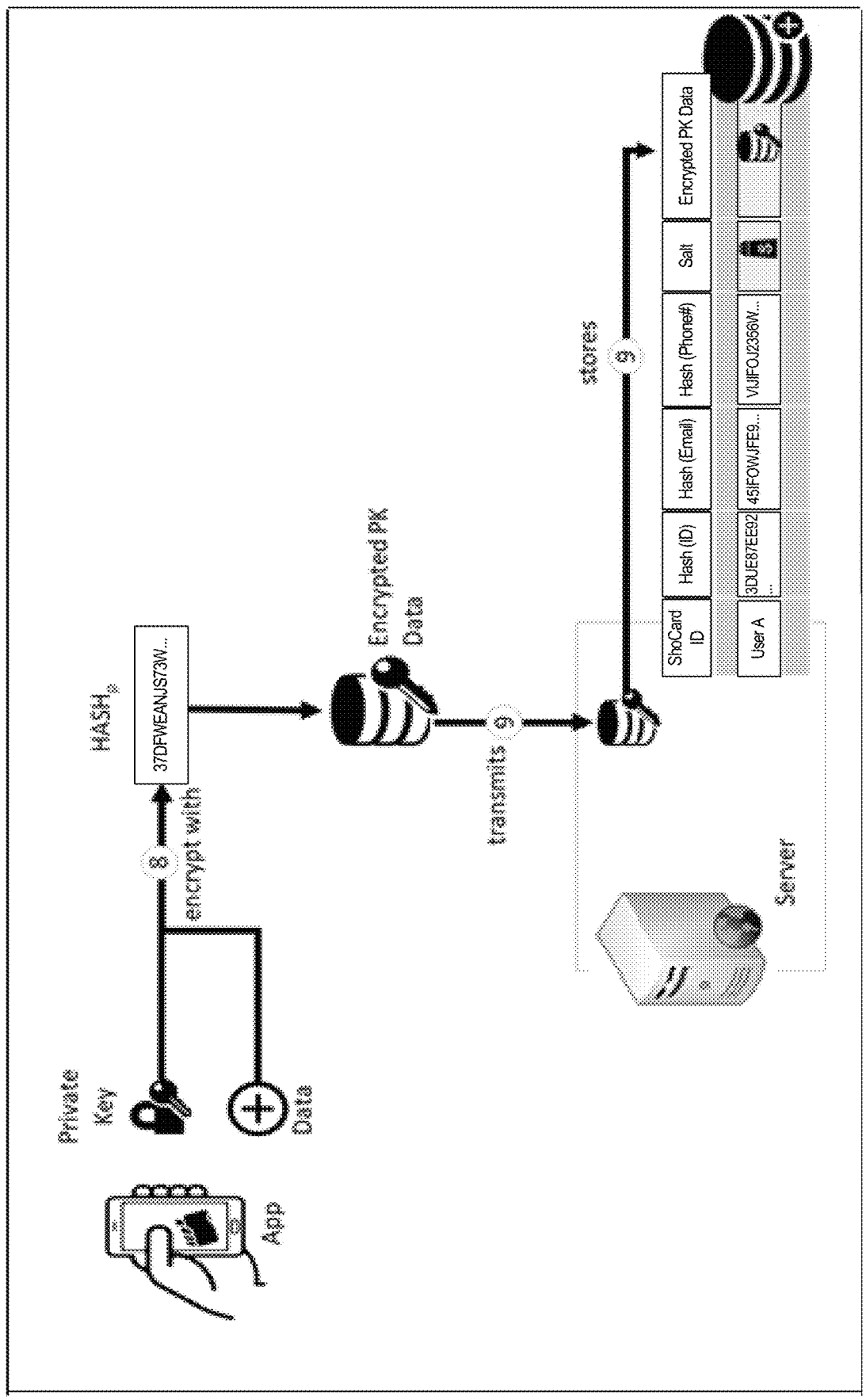
FIG. 5 shows a registration process using dynamic passwords, in accordance with one embodiment of the present disclosure.

If the data recovery service provider wants to protect against hackers who may break into its data warehouse, it is critical that the embodiment not store a clear text copy of the ID fields on disk. Therefore, one embodiment provides a means to obfuscate the ID fields before storing it to disk. In order to obfuscate the user's ID metadata, the App concatenates the key/value pairs into a single string and then hashes it—Hash (ID). Various hashing algorithms can be used such as SHA256. This hashing process is depicted in path 2 of FIG. 4A, illustrating the registration for dynamic passwords.

Embodiments provide means to collect a verified email address from the user and also for validating the email address. In particular, one method of validating an email address is for the user to send an email via his/her App, in accordance with one embodiment of the present disclosure. The App invokes the email App on the device and prefills the following email fields:

Subject line: identifies the request to register the user's email address
Body: includes Hash (ID) and user's registered ShoCardID.
Recipient "To" Email Address: service provider's listening email address The App will allow the user to select the email address from which he chooses to send the email. The server will listen for this email using the pre-filled recipient's email address. Then the system decrypts the email and verifies the ShoCardID. The collection and verification of the email address is depicted in path 3 of FIG. 4A.

Another method for validating an email address is for the user to manually type in her email address and send it to the service provider along with their ShoCardID and Hash (ID) in a Secure Envelope (described below). The data recovery service provider's server then sends an email to the user's email address. The email may include a specific code (e.g., a temporary PIN #), in which the user then copies or types into the App and/or it may include a QR code, in which the user may scan. Confirmation of the PIN or QR code confirms that the user has access to her email. This method for validating an email address is depicted in path 3 of FIG. 4A.

A secure envelope may be used for secure delivery of data, wherein the secure envelope is created, wherein the secure envelop sections may be decrypted and verified. In particular, embodiments of the present disclosure are described relating to methods and systems for Identity Management for enterprise using open standards such as SAML, management of enterprise data in encrypted manner by IT managers, delegation of authority and methods of compensation for sharing of identity information. In embodiments, methods and systems are described for creating and decrypting a secure envelope whose sender can be verified on a blockchain.

Traditional secure transmissions between systems require a trusted party to attest as to the ownership of public-key associated with a user's private key. This is typically provided via a Certificate Authority (CA) or a Public Key Infrastructure (PKI). Embodiments of the present disclosure provide the means to create and transmit a secure message between systems, where the receiving system can verify that the message was signed by the same private key that was used to sign the sender's self-certification on the blockchain. This method can provide ownership of a public key by a User without requiring a separate trusted CA or PKI system.

Embodiment provide the means to create a Secure Envelope for transmitting secure messages between systems, which could be Web servers, IdP servers, Apps, email, SMS text, or other system entities. The Secure Envelope may include any Data. This Data is then signed with the Sender's Private Key. This signature along with the Data can be referred to as the MSG. This MSG is then encrypted with the Receiver's Public Key, resulting in a Secure Envelope, which is then transmitted to the Destination System. The authorized entity that can view the Secure Envelope is one that has the Receiver's Private Key.

---

MSG {
    Signature.PRK.sender (Data)
}
Encrypt.PBK.receiver (MSG)➔Destination System

---

Embodiment provide means to decrypt and verify the signature of the Secure Envelope. When a system receives a Secure Envelope, it first verifies proper construction of the MSG by decrypting the Secure Envelope with the Receiver's Private Key and then verifying that the DATA was signed properly using the transmitted Public Key. To do this, the receiving system compares the Public Key used to sign the Secure Envelope to the Public Key used to sign the Sender's Self-Certification on the blockchain and makes sure they are the same. The self certification (aka. a Seal record) on the blockchain is described herein.

Embodiments provide means to collect and validate a verified phone number from the user. A phone number can be registered in numerous ways using the phone's native messenger (e.g., iMessenger on iOS).

One method of validating a phone number is for the user to send a text message via his/her App. The App invokes the phone's native messenger on the device (e.g., iMessenger on an iOS device) and prefills the following text fields:

Recipient "To" Phone Number or Email: service provider's listening phone # or email address. Text Message: identifies the request to register the user's phone number and includes the Hash (ID) and the user's registered ShoCardID.

The system will listen for this text message using the pre-filled recipient's phone number or email address. Then the system decrypts the text message and verifies the ShoCardID.

Another method of validating a phone number is for the user to manually type in the phone to be validated and send it to the service provider along with their ShoCardID and Hash (ID) in a Secure Envelope (see Creating the Secure Envelope and Decrypting and Verifying the Secure Envelope sections). The data recovery service provider server sends a text message to that phone number with a temporary PIN #, or some other multi-factor. In this case, the user may copy/paste or type the PIN, or other factor, into the App. This confirms that the user has access to her phone number. This method is depicted in path 4 of FIG. 4A.

Another method of validating a phone number is for the user to manually type in the phone to be validated and send it to the service provider along with their ShoCardID and Hash (ID) in a Secure Envelope (see Creating the Secure Envelope and Decrypting and Verifying the Secure Envelope sections). The service provider server sends a text message to that phone number with a notification to confirm. In this case, the user replies with a confirmation, and this confirms that the user has access to her phone number. This method is depicted in path 4 of FIG. 4A.

After the validation of the user's email or the validation of the users' phone number, the server holds the clear text values of the email address or phone number, respectively. If the service provider wants to protect against hackers who may break into its data warehouse, it's critical that the server not store a clear text copy of the value on disk. Therefore, for all methods used to collect and validate the user's email address and phone number, embodiments provide means to obfuscates the user's email and phone number before storing it to disk.

In particular, in order to obfuscate the data, the system hashes the data. Various hashing algorithms can be used such as SHA256. If this is a post-email validation, then {Hash (Email), Hash (ID)} is stored to disk with the record that has been indexed with the given ShoCardID. If this is a post-phone number validation, then {Hash (Phone #), Hash (ID)} is stored to disk with the record that has been indexed with the given ShoCardID. This process for hashing and storing identity factors is depicted in path 5 of FIG. 4A.

In addition, in the setup/backup and data recovery processes a method of creating and transmitting a Salt is described. Once all three data pieces—(ID metadata, Email, Phone #) have been collected, verified, hashed, and stored on disk with the record that has been indexed with the given ShoCardID, the embodiment provides the means to create a Salt, which is a long, unique random number (e.g., a GUID) and will be used to generate the dynamic password. The system places the Salt in the user record with the hashed ID metadata, hashed email address, and hashed phone number that have been indexed with the given ShoCardID. In one implementation, then the system transmits the Salt to the user's App. This process is depicted in path 6 of FIG. 4B.

In addition, in the setup/backup and data recovery processes a method of creating the dynamic password is included. Once all three data pieces—(ID metadata, Email, Phone #) have been collected, verified, hashed, and stored on disk with the record that has been indexed with the given ShoCardID, the embodiment provides the means to create a Salt, which is a long, unique random number (e.g., a GUID) and will be used to generate the dynamic password. The system places the Salt in the user record with the hashed ID metadata, hashed email address, and hashed phone number that have been indexed with the given ShoCardID. In one implementation, then the system transmits the Salt to the user's App.

Once the App receives the Salt from the server, it produces a unique ID using the three data pieces and the Salt to create a long, unique dynamic password, which will be referred to as $HASH_p$.

$HASH_p$=Hash (ID metadata+Email+Phone #+SALT)

Optionally, the App can be configured to prompt the user to enter a new password, during the creation of the dynamic password. This password would be a fifth factor used for recovery. However, if this option is used, when the password is NOT remembered by the user, there may be no means of recovering the data. This process is depicted in path 7 of FIG. 4B.

Further, in the setup/backup and data recovery processes a method is provided for encrypting the private key with the dynamic password. In particular, embodiments provide the means to encrypt the user's private key with the dynamic key, a symmetric key. Optionally, one embodiment will allow the encryption of any additional device data of any size to be included in the recovery process.

RecoveryData=(user.PRK,AdditionalData).

The App will use $HASH_p$ as the symmetric key to encrypt the user's private key and any other device data. This method is depicted in path 8 of FIG. 5.

EncryptedPRKData=($HASH_p$,RecoveryData)

Also, in the setup/backup and data recovery processes a method of transmitting the encrypted private key and storing it is described. In particular, the App then transmits the encrypted private key to the server via a Secure Envelope. It stores the encrypted private key with the user's record. Even though the server has a copy of the Salt, it has never received the actual data used to create the $HASH_p$ of the user's ID; therefore, it cannot recreate the symmetric key that the user has generated and the user's data is secure and kept private.

When all three factors are retrieved, the Salt has been created, and the encrypted private key sent back to the server, the server maintains a record that includes the user's information, as shown below. This method is depicted in path 9 of FIG. 5.
  a. ShoCardID
  b. Hash (ID)
  c. Hash (Email Address)
  d. Hash (Phone #)
  e. Salt
  f. Encrypted Private Key Data Also, in the setup/backup and data recovery processes a method of recovering data with dynamic passwords is disclosed. Embodiments provide the means for a user who has lost her mobile device and has no backup of their data to reclaim their identity and access to their blockchain records. To do this, the embodiment first provides the means for the user to creates her dynamic password $HASH_p$ and then use her private key to recover the data.

In order to do this, the user has access to the same data pieces used when the user registered the account:
  an identification card
  access to her email
  access to her phone number If she is using a new phone (assuming the old one was lost), she has it working with the same number as previously registered versus using a brand-new phone number, in one embodiment.

Also, in the setup/backup and data recovery processes a method of initiating the data recovery process is included. In particular, embodiments provide the means for the user to initiate a request for recovery. The user will follow a similar process for collecting and hashing her ID card as previously described under registration in the section describing the Collecting and Hashing the User's ID Card section. Then the user will validate her email and phone number by the methods previously described under registration in the Collecting and Validating the User's Email Address and Collecting and Validating the User's Phone Number sections, with one variation: each collection/validation Secure Envelope will include in its Data a tag denoting this is for recovery.

Further, in the setup/backup and data recovery processes a method of decrypting and verifying the secure envelope is included. In particular, embodiments provide means to decrypt and verify the signature of the Secure Envelope in the email and the Secure Envelope inside the text message. When the server receives a Secure Envelope, it decrypts and verifies the secure envelope, as previously described, where:
  d. The Sender=the User
  e. The Receiver=Service Provider
  f. The Receiving System=the server Further, in the setup/backup and data recovery processes a method of retrieving the Salt and encrypted private key and/or data is included. Embodiments provide the means to extract the email address and phone numbers from their Secure Envelopes and create a hash of each. It also extracts the hash of the ID embedded in the Email and/or the Text message.

At this point the server knows that the user had access to their original phone, their original email address, and at a minimum, all the information in their original ID card to create a hash of it. The server uses these three hashes as an index to locate in disk storage the ShoCardID associated with the hashes. Once located, it can retrieve the remaining fields in the record indexed by the ShoCardID. These fields, as described in the Creating and Transmitting a Salt and Transmitting the Encrypted Private Key and Storing sections, include the Salt and the Encrypted Private Key. If other optional data was also encrypted, that additional data is also returned.

Also, in the setup/backup and data recovery processes a method of recreating the dynamic password is included. Once the Salt and Encrypted Private Data are received, embodiments provide for the means to recreate the Dynamic Password by repeating the steps in the Creating the Dynamic Password section to generate $HASH_p$.

$HASH_p$=Hash (ID metadata+Email+Phone #+SALT)

If during registration a fifth factor password was also used, then the password would also be needed from the user to recreate $HASH_p$.

Further, in the setup/backup and data recovery processes a method of decrypting the private key with the dynamic password is included. Embodiments provide the means to decrypt the user's private key (and any additional data that was included in the encryption at registration) with the Dynamic Password $HASH_p$, a symmetric key.

RecoveryData=Decrypt (EncryptedPRKData,$HASH_p$)

Further, in the setup/backup and data recovery processes optional modifications may be included. The methods and systems for creating and recovering data using dynamic passwords described herein specifically asks for three factors: (1) ID information, (2) access to Email, and (3) access to phone for sending text messages, in one embodiment. As previously described, a fourth factor, a user password, can also be used to create the multi-factor password. However, it is entirely possible to do this process and remove or replace one or more of the previously described factors with another factor, in other embodiments. For example, the ID card can be eliminated as a factor or replaced with a completely random set of data that the user would have access to—examples include a random sentence or knowledge-based question (e.g., name of a favorite teacher or make of a first car). The other factors such as phone number and/or email can also be modified or completely removed.

Figure 6:
FIG. 6 illustrates a screen shot showing an example of data recovery using 4-factors, in accordance with one embodiment of the present disclosure.

FIG. 6 illustrates a screen shot showing an example of account recovery using four factors, in accordance with one embodiment of the present disclosure. As shown, one of the four factors is a PIN, which is a field known to and controlled by the user. The other identity factors include an email address, a phone number, and an ID (e.g., U.S. Driver's License).

Additional factors can also be added. For example, to perform the recovery, the user may be asked to access a second email address. This may be provided as an option for users who have more than one email address. Other options can be configured as well, but the split-key processing and recreation of the multi-factor password remains the same.

Also, in the setup/backup and data recovery processes facial recognition or any other biometric verification process may be included and used as a factor. In particular, in addition to the factors above, the recovery service can incorporate server side facial recognition as an additional factor before granting recovery data to the user. This can be accomplished without the server maintaining a copy of the user's image in raw form in its services. This helps maintain anonymity of the user and protection against a data breach so the user's data is not identified.

If an optional recovery field for facial recognition is selected in the Data Recovery form, the user will be asked during registration to ensure that a selfie is taken within the app. In this case, a special symmetric-key is created and the key is used to encrypt the selfie on the App. The symmetric-key is then encrypted with the dynamic password. Both objects are then stored with the recovery-server as a special pair of objects—the selfie-object.

During recovery, the user will create the dynamic password with the methods described above. However, before being able to retrieve the encrypted data stored which include the private-key, ID cards, certifications and other data, the App will check to see if a selfie-object exists. If it does, it retrieves the encrypted symmetric-key and asks the user to take a live-selfie. A live-selfie is enforced through the ShoCard SDK to ensure that the user doesn't hold a static picture of the user in front of the phone. It then decrypts the symmetric-key and responds to the server with that key along with the live-selfie it captured.

Once the request is received, the server uses the symmetric-key given to decrypt the saved selfie. If it is able to do so, it knows that the user had permission to use this selfie. It then performs a facial comparison between the stored selfie that was decrypted and the live-selfie it was given. If the two match, it knows the biometric check was satisfied for this user along with the prior factors described. It then flags the record so this user is able to retrieve the remaining encrypted data.

Verification and Certification Using a Block Chain

In one embodiment, a ShoCard Identity Platform is a technology layer that interacts with a blockchain. The ShoCard Identity Platform may be used in conjunction with any of the embodiments described herein. The blockchain can then securely hold data used for certifying identity transactions. For example, a blockchain technology forms the heart of the cryptocurrency, Bitcoin. In addition, the blockchain technology is used by several integrated systems provided by ShoCard, e.g., for systems other than currency transactions, in embodiments of the present disclosure.

In one use example, to register with ShoCard, a certification process is processed. In one embodiment, a user can scan using a mobile device a driver's license or passport, and a software application or device grabs the individual field within that, such as name, license number, passport number, date of birth (or other data). The data may also be gathered individually or manually. The data is then processed to produce a hash of the data. In this example, the private key that is on the mobile device can be used to create a digital signature of that hash, and that's the piece of data that is stored to the blockchain. In one configuration, the various fields are put together in one record to create an ID for that user.

If the user then provides the raw data with a public key and a pointer to that record on the blockchain, the data can be verified. This provides a correlation between the data that the user has on the mobile device and what's on the blockchain.

In still other embodiments, following the registration process, users can be certified by some other trusted party such as a bank or KYC checking company, which then issues a certification for the user. By way of example, these certifiers can use their own private key to write the records on the blockchain, pointing to that user's record entry that's also on the blockchain. This may be referred to as a ShoCard ID, or generally, the User ID. In this example, there are two steps: one is the registration where hash signatures of the individual fields are placed on the blockchain; and the second one is a certification.

Figure 7:
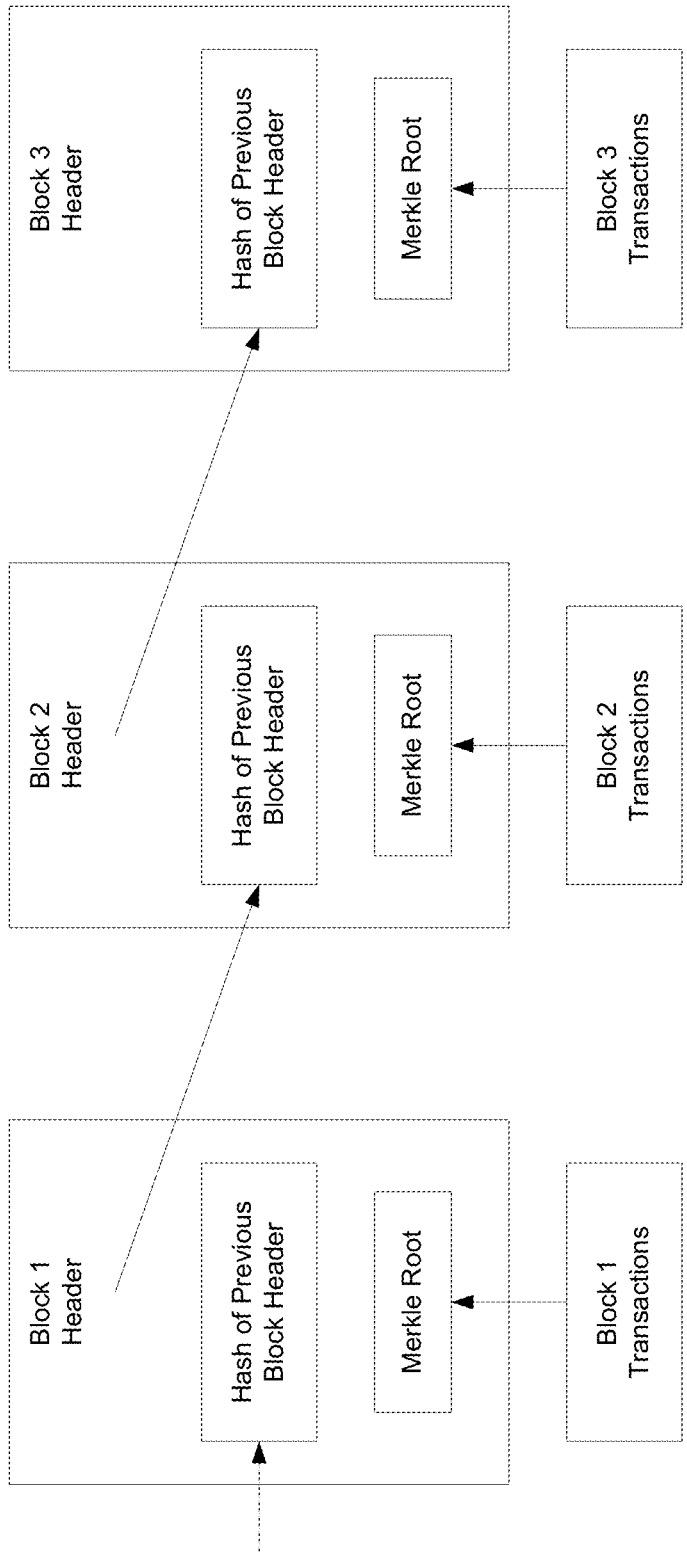
FIG. 7 illustrates the implementation of a blockchain to ensure the integrity of the data embedded within, in accordance with one embodiment of the present disclosure.

FIG. 7 shows a simplified version of a block chain. A block of one or more new transactions is collected into the transaction data part of a block. Copies of each transaction are hashed, and the hashes are then paired, hashed, paired again, and hashed again until a single hash remains, the merkle root of a merkle tree. The merkle root is stored in the block header. Each block also stores the hash of the previous block's header, chaining the blocks together. This ensures a transaction cannot be modified without modifying the block that records it and all following blocks.

Understanding the basics discussed above, the system and methods process operations referred to as "sealing" and "certifying." Sealing is the process of hashing and encrypting the user's ShoCard data and storing it in the blockchain. Once it is sealed in the blockchain, the data becomes a permanent record. The user may change his or her ShoCard ID, but the user will have to re-Seal it, and create a new blockchain record. No readable information is stored in the blockchain, only an indecipherable hash that can only be unlocked by a corresponding private key, which is always controlled by the user, in one embodiment.

"Certifying" the ShoCard ID is the process of another party acknowledging the accuracy of your ShoCard ID and marking it so they will recognize it as accurate again in the future without having to see any other evidence of identity beyond your ShoCard ID. To certify a ShoCard ID, you send your encrypted ShoCard ID to the certifier. The certifier will decrypt it and match the hash the user sent them to the hash stored in the blockchain. This proves that the user has the private keys that created both records. If the certifier is satisfied that the user is as identified, the certifier can create a new record with their own private keys that references the user's ShoCard ID. In the future, when the user presents his or her ShoCard ID, they will check their certification to make sure the user is presenting the same ShoCard ID, previously certified.

Figure 8:
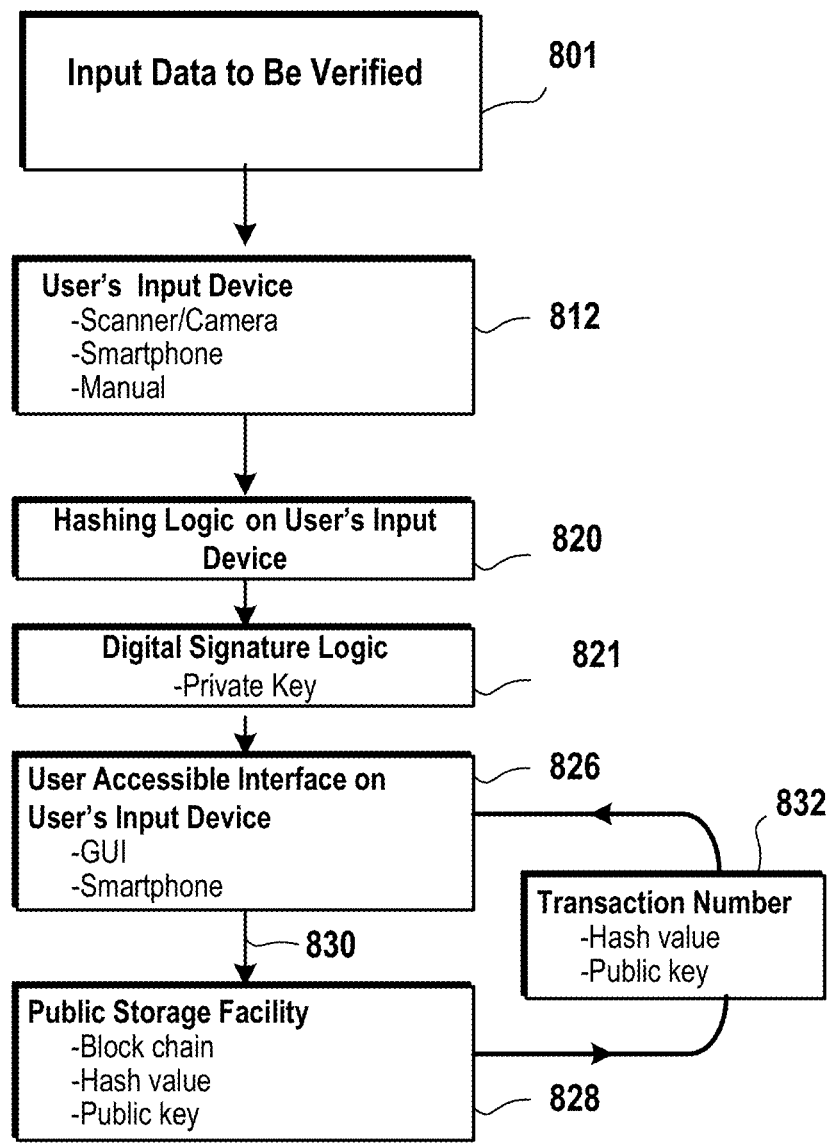
FIG. 8 shows a simplified block diagram of a system and method for sealing any input data in a public storage facility, in accordance with one embodiment of the present disclosure.

FIG. 8 shows a simplified block diagram of a system and method for sealing any input data in a public storage facility.

As noted above, the operations to be performed by the hashing logic 820 can proceed directly after receiving the user information from the input device 812. In this embodiment, the hashing logic 820 is used for hashing the input data (e.g., personal information collected) to provide or generate a hash value. The hash value is sometimes referred to as "hash data," that is generated by an algorithm. In an example embodiment, hashing logic 820 might be software, firmware, hardware, or any combination thereof, and consist of one or more hashing algorithms, e.g., a Secure Hash Algorithm (SHA) algorithm. Hashing logic 820 passes the hash value to digital-signature logic 821, which performs a digital signature on the hash value, using the private key on the input device 812. In an example embodiment, digital-signature logic 821 might be a component (or module) of encryption logic. In other embodiments, the digital-signature logic 821 may be defined by separate code, firmware, and/or hardware.

In one embodiment, the digital-signature logic 821 then passes the signed hash value and the public key to a user accessible interface 826 (e.g., a graphical user interface or GUI), which might be other software running on the input device 812. In an example embodiment, the user accessible interface 826 might be part of an application or app that includes encryption logic, hashing logic 820, and digital-signature logic 821, and/or other modules or code. The user accessible interface 826 might be used by the user to transmit the digitally signed hash value and the public key to a public storage facility 828 via a line 830, and receives back from the public storage facility 828 a transaction number 832 corresponding to the transmitted hash value and public key. In an alternative example embodiment, only the signed hash value might be transmitted to public storage facility 828 by the user and persons retrieving the signed hash value might obtain the public key from elsewhere (e.g., the user, a public database, an Internet repository, a website, etc.). As is well known, there is no need to keep public keys secure, and in fact, the algorithms using public/private key pairs are design to enable full sharing of public keys. The private key, on the other hand, is kept secure, as noted above.

In one embodiment, the public storage facility 828 can take the form of a block chain (e.g., in a bitcoin online payment system) or any other public or private distributed database. The public storage facility 828 is connected to a communication link via a line and can be adapted to communicate over a public computer network, the internet, an intranet, an extranet, or any private communication network. Broadly speaking, the public storage facility 828 is accessible by any device that has an Internet connection over a network.

As indicated above, in an example embodiment, the input data might be hashed and the resulting hash value might be signed with a digital signature, created using a private key paired with a public key, before transmission, optionally along with the public key, from the input device (e.g., a user's smartphone) 812 to the public storage facility 828 for storage. The user accessible interface 826 is thus adapted to "seal" the signed hash value and the public key in the public storage facility 828. In one embodiment, once the hash value, and, optionally, the public key of the user is written to the block chain in a transaction, a later verification may be made if another party is able to hash the same input data.

Figure 9:
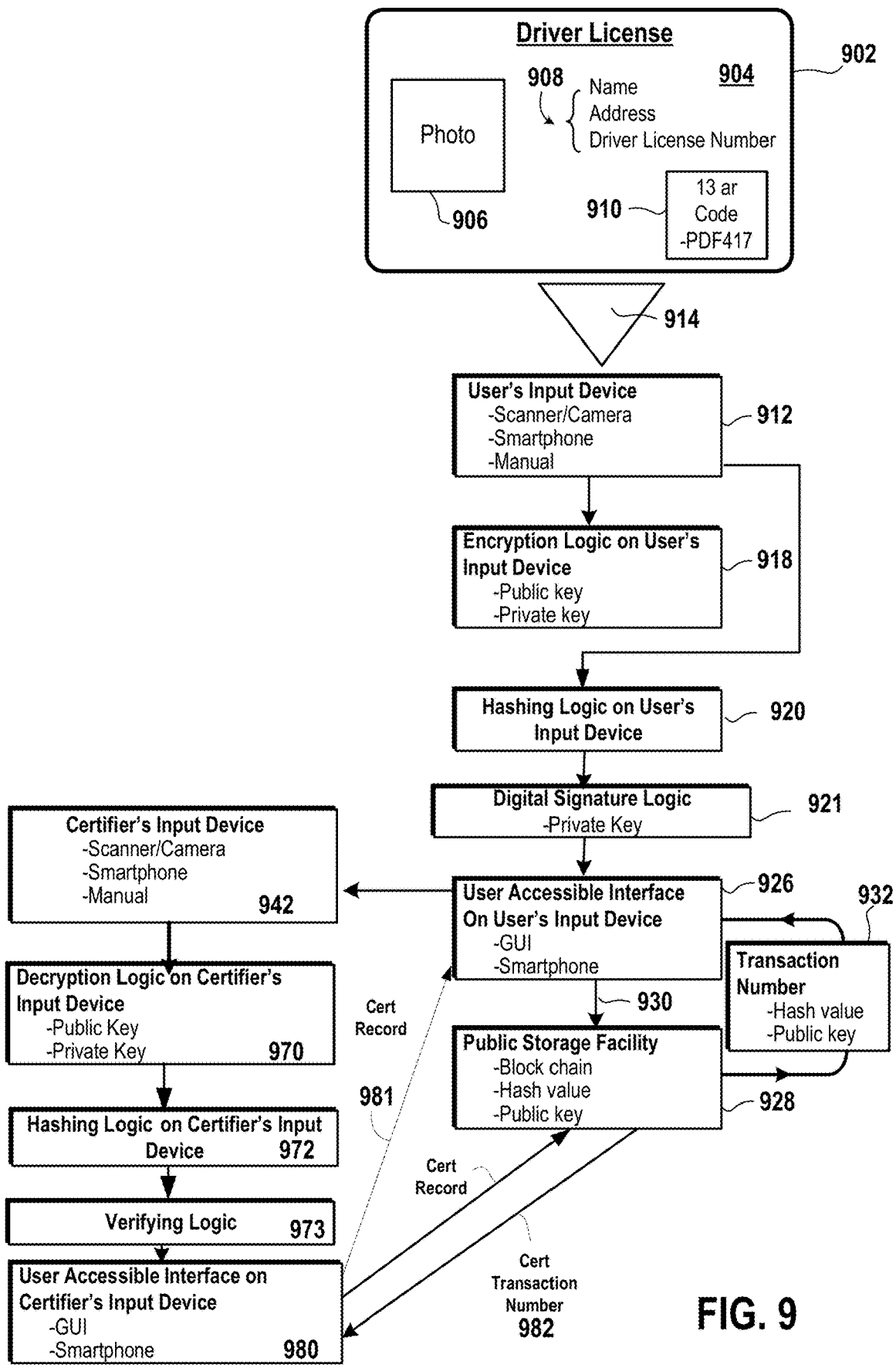
FIG. 9 shows a simplified block diagram of a system and method for certifying an identity of a person, in accordance with one embodiment of the disclosure.

FIG. 9 shows a simplified block diagram for a certification method for managing the identity of a user in a public storage facility 928. By way of example, an identification card 902 may be used. In other embodiments, other forms of identification, which may be digital or non-digital may be used. In the example of the identification card 902, personal data 904 is contained thereon, which identifies the user. The input data can include a photo 906 of the user; the user's name, address and driver license number 908, and/or a bar code 910 or similar computer code for storing, scanning and/or retrieving additional data. Such coding can include PDF417 codes, QR codes, and other such codes. However, it is not necessary to have such code and the identification card may have human-readable text strings, in one embodiment. As noted above, the identification card 902 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 902 can be a government issued form of identification such as a driver license, passport, employee badge, military identification, political documentation, or the like. The identification card 902 can also be a privately issued form of identification such as a student ID, library card, social club car, or any other form of identification issued by a third party.

In one embodiment, as indicated by triangle 914, an input device 912 may be used to input such personal data from the identification card 902 to provide input data. Input device 912 can take many forms. For example, input device 912 can be a digital scanner, digital camera, or smartphone (e.g., with the camera commonly found in smartphones) for reading data from the identification card 902, including any codes appearing on the card 902. The input device 912 can also be a device for manually inputting personal data such as a keyboard, touchscreen, voice recognition device, handwriting recognition device, or other manual input device.

As shown in FIG. 9, the input data can be optionally encrypted by encryption logic 918 and securely stored. In one implementation, the input data is transferred directly to hashing logic 920, without passing through encryption logic 918. For ease of understanding, the operations of the optional encryption logic 918 will be discussed first, and then the operations processed by the hashing logic 920. As such, the process may proceed directly from receiving the user information via 912 to the hashing logic 920.

The input data collected from the input device 912 (e.g., a user's smartphone) is passed to encryption logic 918 on input device 912. In an example embodiment, encryption logic 918 might include software, firmware, hardware, or any combination thereof, and consist of one or more encryption algorithms, e.g., an RSA encryption algorithm. Encryption logic 918 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. This encrypted data can then be stored locally on the input device 912 for added security. It can then be accessed with the private key of the user on the input device 912, which might be stored in a more secure part of input device 912, e.g., "the Keychain", if input device 912 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 912. It should be understood that the private key may be stored on another device, but similar or additional security should be processed to ensure that the private key is not compromised.

As noted above, the operations to be performed by the hashing logic 920 can proceed directly after receiving the input data from the input device 912. In this embodiment, the hashing logic 920 is used for hashing the input data (or selected fields of the input data or personal data) to provide or generate a hash value. The hash value is sometimes referred to as "hash data," that is generated by an algorithm. In an example embodiment, hashing logic 920 might be software, firmware, hardware, or any combination thereof, and consist of one or more hashing algorithms, e.g., a Secure Hash Algorithm (SHA) algorithm. Hashing logic 920 passes the hash value to digital-signature logic 921, which performs a digital signature on the hash value, using the private key on the input device 912. In an example embodiment, digital-signature logic 921 might be a component (or module) of encryption logic 918. In other embodiments, the digital-signature logic 921 may be defined by separate code, firmware, and/or hardware.

In one embodiment, the digital-signature logic 921 then passes the signed hash value and the public key to a user accessible interface 926 (e.g., a graphical user interface or GUI), which might be other software running on the input device 912. In an example embodiment, the user accessible interface 926 might be part of an application or app that includes encryption logic 918, hashing logic 920, and digital-signature logic 921, and/or other modules or code. The user accessible interface 926 might be used by the user to transmit the digitally signed hash value and, optionally, the public key to a public storage facility 928 via a line 930, and receive back from the public storage facility 928 a transaction number 932 corresponding to the transmitted hash value and public key.

In one embodiment, the public storage facility 928 can take the form of a block chain (e.g., in a bitcoin online payment system) or any other public or private distributed database. The public storage facility 928 is connected to a communication link via a line and can be adapted to communicate over a public computer network, the internet, an intranet, an extranet, or any private communication network. Broadly speaking, the public storage facility 928 is accessible by any device that has an Internet connection over a network.

As indicated above, in an example embodiment, the input data (or selected fields of the input data) might be hashed and the resulting hash value might be signed with a digital signature, created using a private key paired with a public key, before transmission, along with, optionally, the public key, from the input device (e.g., a user's smartphone) 912 to the public storage facility 928 for storage. The user accessible interface 926 is thus adapted to "seal" the signed hash value and the public key in the public storage facility 928. In one embodiment, once the hash value, and, optionally, the public key of the user is written to the block chain in a transaction, a later verification may be made if another party is able to hash the same input data.

The user accessible interface 926 (e.g., a GUI) can be controllable by the user of the input device 912 to encrypt and provide the transaction number 932, the input data (or selected fields of the input data), and, optionally, the public key to an input device 942 (e.g., a smartphone) of a certifier. In an example embodiment, the encryption might be performed by the encryption logic 918 using a public key of a certifier paired with a private key of the certifier. Then, coding logic on the input device 912 might code the encrypted transaction number 932, the input data (or selected fields of the input data), and, optionally, the public key into a barcode or QR code and the certifier might use input device 942 to scan the barcode or QR code and decode it to gain access to the encrypted items. Thereafter, the certifier might decrypt the encrypted items using the private key of the certifier and verify them, e.g., using a "verify" function call to an RSA algorithm as explained in further detail below.

Once the certifier's input device 942 receives the barcode or QR code, decoding logic on the certifier's input device 912 might decode the barcode or QR code and decryption logic 970 on the certifier's input device 942 might use the certifier's private key to decrypt the encrypted items. In an example embodiment, decryption logic 970 might be a component (or module) of more general encryption logic. In one embodiment, the decrypted input data (or selected fields of the input data) might be hashed into a hash value by hashing logic 972 on the certifier's input device 942, using the same hashing algorithm that was used to create the hash value that was digitally signed by the user. And the decrypted transaction number 932 might be used by a user accessible interface 980 (e.g., a GUI) to access the public storage facility 928 (e.g., the block chain) and retrieve the signed hash value and public key of the user. The retrieved signed hash value, the generated hash value, and the retrieved or obtained public key might then be input to verifying logic 973 for verification (e.g., through a "verify" function call to an RSA algorithm), which outputs a "true" value if the two hash values are the same and the public key is associated with the signature or a "false" value if the two hash values are not the same or the public key is not associated with the signature. In an example embodiment, verifying logic 973 might be a component (or module) of decryption logic 970. In another embodiment, the verifying logic 973 may be a separate module, software, firmware and/or hardware. As indicated above, in an example embodiment, the public key of the user might be obtained from some other source than the public storage facility 928 (e.g., from the user), in an example embodiment.

In one embodiment, a system for verifying the identity of a user is described, and includes the user's input device 912. The user's input device 912 is configured for receiving personal data identifying the user from an identification card, for example, that defines input data. The input device may be configured to execute an encrypting machine configured for encrypting the input data using a public key of the user, wherein the public key is paired with a private key of the user. The input device may be configured to execute a hashing machine configured for hashing the encrypted input data to provide a hash value. The input device may be configured for executing a user accessible interface for transmitting the hash value and the public key to a public storage facility (e.g., blockchain) and for receiving back from the public storage facility a transaction number corresponding to the hash value and the public key. The transaction number and the public key may be used for purposes of verifying the identity of the user without decrypting the encrypted input data. In particular, a receiver of the transmitted input data uses the transaction number and the public key of the user to perform an encryption of the input data, and determine whether the identity is verified. That is, the receiver performs the same processes as the user's input device 912 (e.g., encryption, hashing, etc.) to verify that the transmitted input data (as received by the receiver) is the same data used for storing the hash value in the public storage facility corresponding to the same transaction number. Specifically, the process of verifying an identity of a user by signing, using a public key of the user, a hash value of the personal identifying data of the user, and then sending that signed value and the public key to a public storage facility and receiving from the public storage facility a transaction number corresponding to the hash value and the public key, and then having a receiver (e.g., of a verifier) receive the personal identifying data of the user, and the transaction number and the public key of the user, then performing an encryption of the personal identifying data of the user, and determining whether the identity is verified, without decrypting the encrypted data (e.g., stored to the blockchain) (because the newly encrypted data should match that stored to the blockchain, or be verifiable to match that stored to the blockchain).

Methods and Systems for Blockchain-Based Identity Provider (IdP) for Enterprise

Traditional enterprise identity mechanisms centralize credentials and identity certifications within their own system and within federated Identity Provider (IdP) systems. This model is necessary because knowledge factors such as username/password, that authenticate a user by confirming a secret that only the user and a system knows, act as the primary credential within traditional systems. These factors are vulnerable to hackers and intrusive tech support personnel.

Records of those certifications may live on various service providers' databases. In such cases, when a user's access is revoked, it can take hours, days, sometimes weeks to propagate that "revoke" message throughout the various service providers' databases, inadvertently allowing the user to still access company resources for some time after deactivation—a risky gap in security.

Furthermore, traditional enterprise identity mechanisms usually offer Single Sign-On (SSO) for employees. Outsider accounts have to be managed through LDAP, which requires a different username/password combination to access each cloud service. Managing these separate accounts can impose significant overhead for the IT departments and often they are not managed correctly. For example, a sales-rep who works with a partner (e.g., a sales-channel) may have access to company's accounts managed through an LDAP. That sales-reps employment may be terminated with the partner without informing the company's IT department. Hence the account information for the sales-rep remains active with the company even though the employee has left the partner.

Embodiments of the present disclosure are more secure, private, and inclusive than methods and systems of traditional federated identity providers. Said embodiments leverage the blockchain, instead of a database, as an independent source of truth for identity certifications and because the blockchain is immutable, it cannot be modified or deleted. Since the user's information and unique private key is kept on his/her device, there is no central databases to be hacked. The unique private key is controlled by the user (e.g., visible to the user) and guarded by access control methods, such as TouchID or a PIN.

Embodiments never write user data onto the blockchain, but instead writes identity certifications that are used to independently verify a user. By leveraging hashes, Salts, and digital signatures, the embodiment ensures that identity certifications written onto the blockchain cannot be reverse engineered into their original data. Unlike traditional authentication solutions that depend on a knowledge factor such as username/password for a primary credential, this embodiment uses the user's unique device private key as a primary credential. The App secures the private key, where possible through a dedicated security chip or the TMP (Total Mobile Protection), on the mobile device and uses it to digitally sign transactions as a proof of its identity. Verifying services use the same public key to verify the transactions signed by the user as well as records that the user has previously signed and placed on the blockchain.

Embodiments enable users (including employees and outsiders) to authenticate seamlessly to enterprise resources, such as, but not limited to: email, CRMs, communication tools, IoT devices, secure doors, and mobile apps. Without username/passwords or one-time passwords to type, the user experience is simple and private, but also significantly more secure. Since there is no user data shared between service providers and each service provider depends on the blockchain to authenticate a user, when a user's access is revoked, the effect is immediate and ubiquitous.

Embodiments implement up to five factors for authentication that certify a user's identity: login management applications, access management applications, biometrics verification, secure data exchange applications, and blockchain verification.

Embodiments provide for authenticating with a blockchain IdP (or IdP Chaining)

Figure 10:
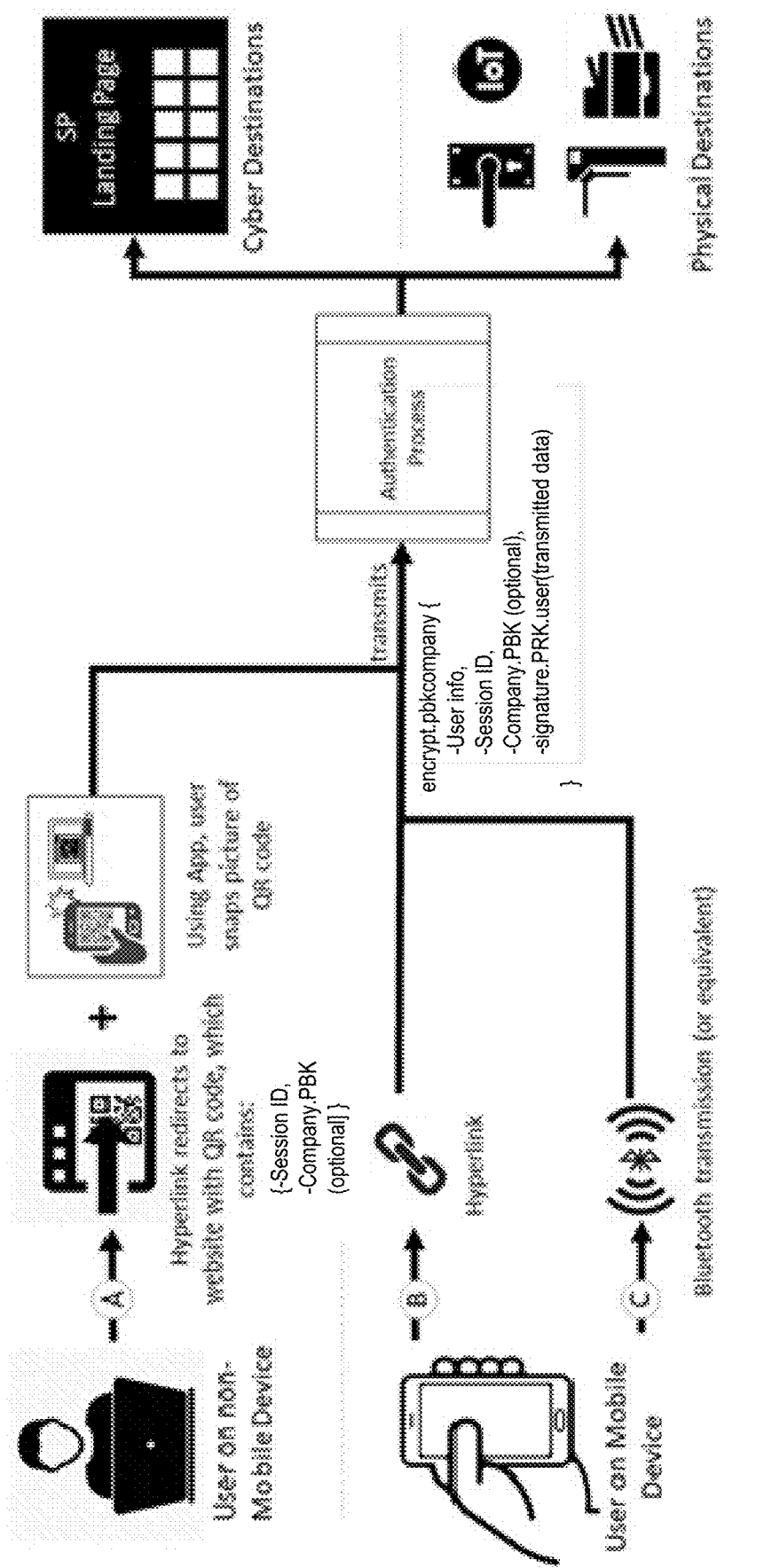
FIG. 10 shows an initial access process, in accordance with one embodiment of the present disclosure.

In an initial access, a session ID is obtained. In particular, embodiments provide the means for the user to access a Blockchain IdP session. One method of initial access to a federated IdP begins when the user navigates to the company's federated IdP web URL/server, and that server redirects said user to the company's Blockchain IdP web site/server. These URLs are configurable by the company's IT manager. The landing page displays a QR code with a Session ID, and optionally, a company public key, which the user scans via the App. This method of access is depicted in path A of FIG. 10, which shows an initial access process, in accordance with one embodiment of the present disclosure.

In addition, access may be verified using biometrics. In particular, embodiments provide a means for verifying the user's access, including biometrics. The App will take the user's Touch ID, or equivalent (e.g., face recognition, iris scan, etc.), before creating the Secure Envelope—these methods are access-control mechanisms at the user's mobile device level. In some cases, companies will require higher security access through biometric verification at the server level in addition to access control.

Further, a secure envelope may be created and transmitted to the Blockchain IdP server, in accordance with one embodiment of the present disclosure. In particular, embodiment provide a means to send a secure message with the user's information, pointers to said user's blockchain certificates, and Session ID to the Blockchain IdP. The App creates a Secure Envelope (see Creating the Secure Envelope . . . section) to send to the Blockchain IdP Server, where:

a) The Sender = the User
b) The Receiver = the Company
c) The Destination System = the Blockchain IdP server
d) Data {
    User Info, which can be but doesn't have to be: Name, Email, Employee ID, Facial Image, and many other fields, and any combination thereof
    Session ID,
    User's Blockchain Self-Certification, as described herein,
    User's Blockchain Company Certification (refer to "Registering an Identity Provider Account with a Company" section to see methods and systems for creating this certificate)
    • (optional) the User's Public Key
}

Figure 11:
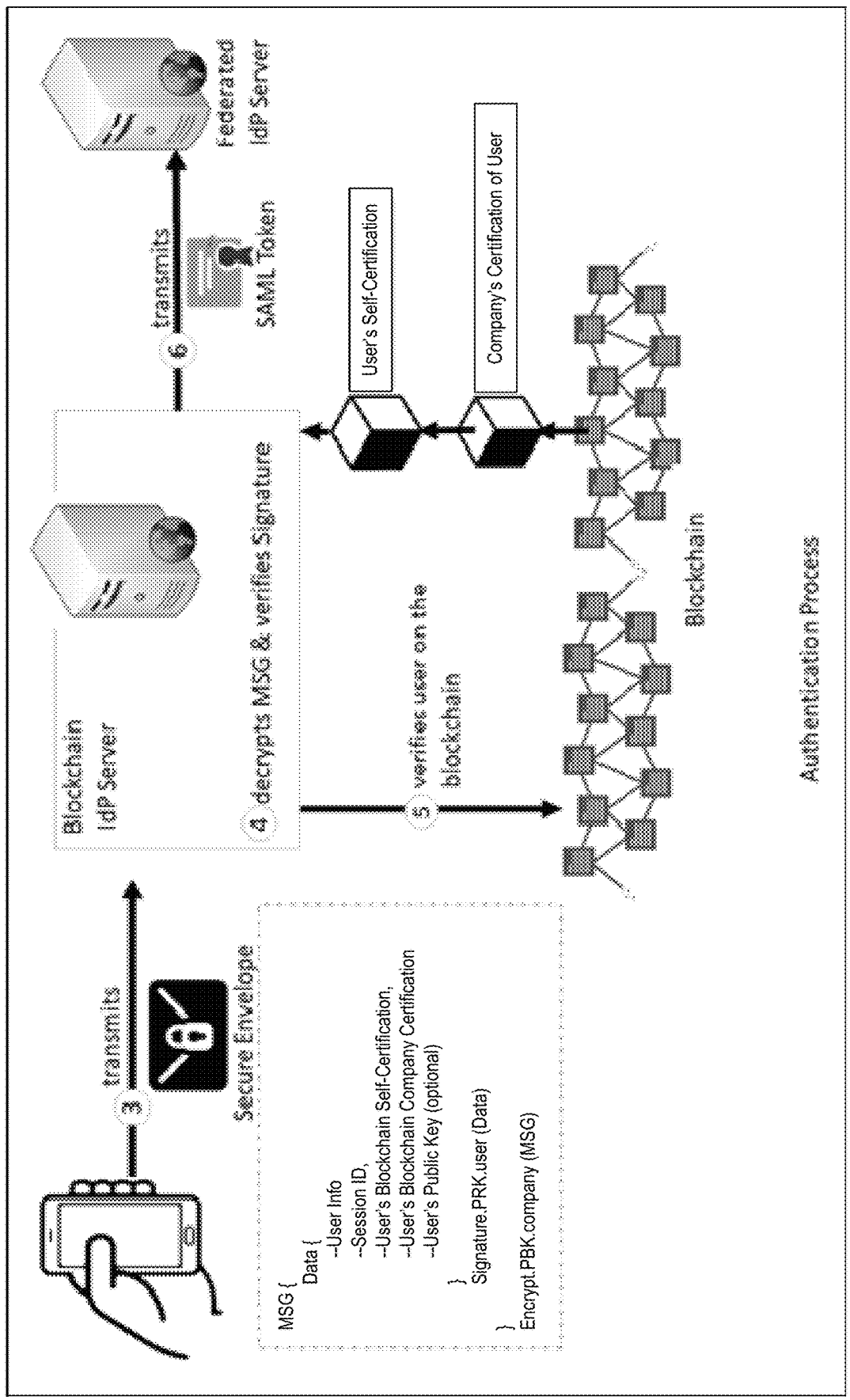
FIG. 11 shows an authentication process, in accordance with one embodiment of the present disclosure.

This method is depicted in path 3 of FIG. 11, which shows an authentication process, in accordance with one embodiment of the present disclosure.

Figure 12:
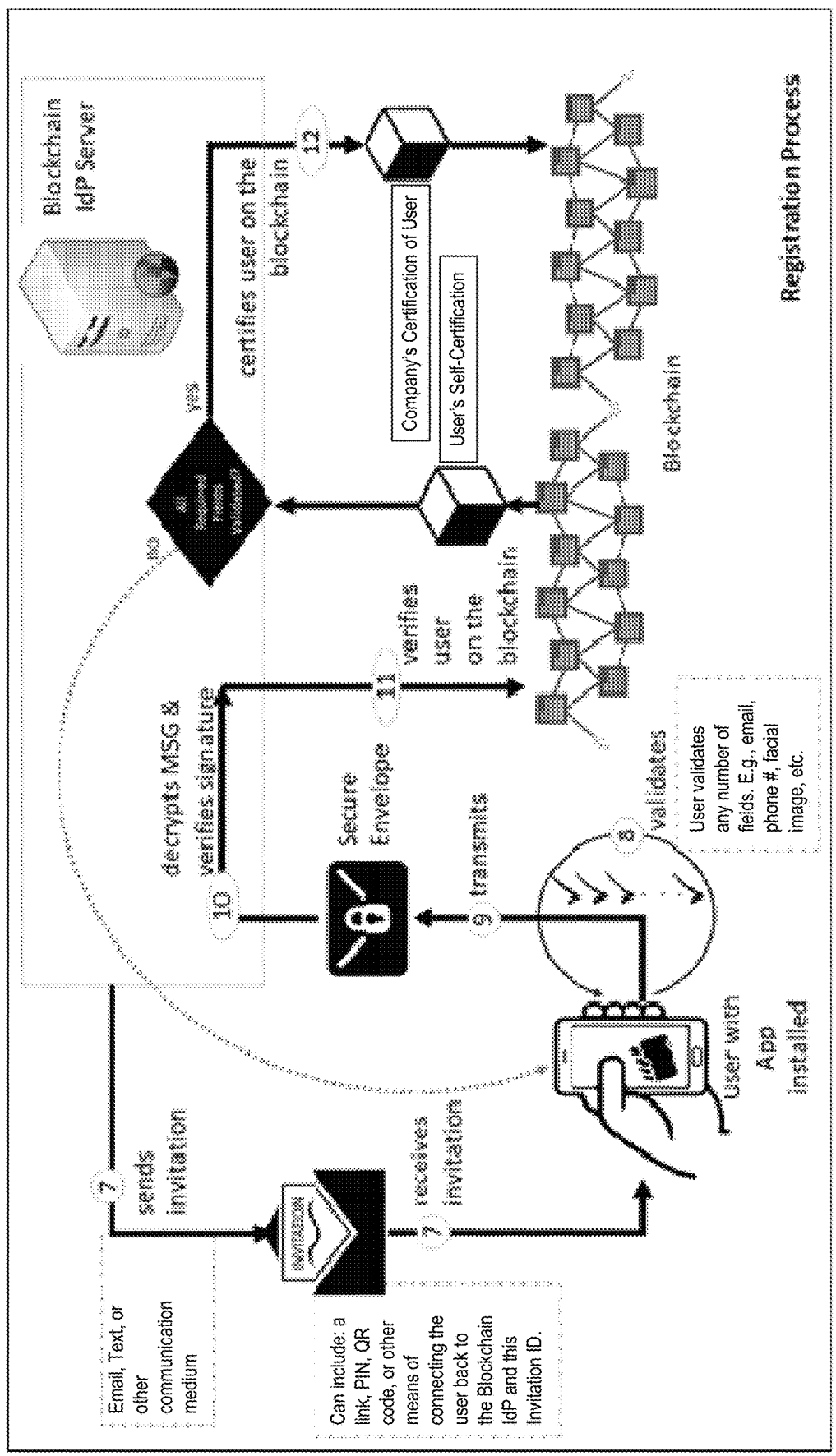
FIG. 12 shows a registration process, in accordance with one embodiment of the present disclosure.

Also, the secure envelope may be decrypted and verified, in accordance with one embodiment of the present disclosure. In particular, embodiments provide means to decrypt and verify the signature of the Secure Envelope. When the Blockchain IdP server receives a Secure Envelope, it follows the method previously described when decrypting and verifying a secure envelope, where:

e) The Sender=the User
f) The Receiver=Company
g) The Receiving System=the Blockchain IdP server This method is depicted in path 4 of FIG. 12, which shows a registration process, in accordance with one embodiment of the present disclosure.

Further, the user may be verified, in accordance with one embodiment of the present disclosure. In particular, after verification of the Secure Envelope via the blockchain, embodiments provide mean to verify the user has access to this company's resources. The Blockchain IdP server retrieves the User's Blockchain Self-Certification and Company Certification using the pointers found in the decrypted Secure Envelope.

The Self-Certification record contains name-value pairs where for each field, the value was first hashed and then signed with the User's Private Key. To ensure that the User owns this particular Self-Certification record, the Blockchain IdP uses the Public Key that was passed in the Secure Envelope to verify any one of the signatures in the name-value pairs.

It then verifies the Company Certification record in a similar way. It checks to see if it points to the same Self-Certification record, and it confirms that it can verify at least one name-value pair using the Company's Private Key. It also checks to make sure that this Company Certification Record has not been replaced or cancelled by a new Certification record written to the blockchain. This method is depicted in path 5 of FIG. 11.

Further, the user may be authorized to access company resources, in accordance with one embodiment of the present disclosure. In particular, embodiments provide for means to authorize the user to access company resources, both cyber and physical, without the use of username/password and user secrets. Using the methods described above, the User has been securely identified by the IdP. However, no usernames or passwords were used in doing so.

One method includes creating a SAML token for the user and transmitting it to the Federated IdP Server. This method is depicted in path 6 of FIG. 11.

The Federated IdP then proceeds to grant access to a plurality of cyber and physical destinations, including, but not limited to, a landing page with authorized Service Provider links, physical turnstiles, secure doors, IoT devices, or many other access destinations, or combinations thereof.

Also, a process for registering and deactivating an identity provider account with a company is disclosed, in accordance with one embodiment of the present disclosure. In particular, in order to provide for the authenticating of IdP users via Blockchain IdP, the user is first registered with the Blockchain IdP. In order to be registered, the user first installs the App on his/her device and create a Self-Certification, as described herein.

Embodiments provide means for registering a user with the Blockchain IdP. In addition, embodiments provide means for deactivating a User's account with a Blockchain IdP. The following describe those methods.

A process for receiving and accepting an invitation to Blockchain IdP and self-certification is disclosed, in accordance with one embodiment of the present disclosure. In particular, embodiments provide the means for inviting a user to register an account with the Blockchain IdP. One method for creating an IdP User Account begins when a company agent sends an invitation to the user candidate by means of email, text, or other communication medium. The invitation may include an access PIN, hyperlink, a QR code, or some other means of connecting the user to the Blockchain IdP, or any combination thereof.

A user may also initiate the process, by installing the App and entering his/her credentials—perhaps through a wizard that walks the User through the process. The App can then submit the information to the Blockchain IdP service. If the IdP service is able to identify the User information that is passed, it can proceed to the next steps as if it had sent out an invitation. This method is depicted in path 7 of FIG. 12.

Further, a process for validating required field is disclosed, in accordance with one embodiment of the present disclosure. In particular, after Self-Certification, the embodiment provides the means for the user to take steps to validate each user information field defined by the company. This could be, but is not limited to, confirming email through an email reply, confirming a phone # via a SMS text reply, confirming physical biometrics by taking a facial image, or many other field confirmations, or any combination thereof. The defined user data may vary by type of user, depending upon the company's defined business rules. In one embodiment, the user's verified data is packaged up and sent to the server in one single Secure envelope (e.g., Step #9), and then it gets put on the blockchain.

One method of validating an email address is for the user to send an email via his/her App, in accordance with one embodiment of the present disclosure. The App can invoke the email App on the device and prefill the following email fields:

Subject line: identifying the request to register the email address
Body: encrypted data that includes the identification of the user, including the user's registered ShoCardID.
Recipient "To" Email Address: Blockchain IdP server's listening email address The App will allow the user to select the email-address he/she chooses to send the email from. The Blockchain IdP server will listen for this email using the recipient email address. It will then decrypt the email and verify the ShoCardID that this request belongs to.

Another method for validating an email address is for the user to manually type in their email address and send it to the Blockchain IdP server along with their ShoCardID in a Secure Envelope, as previously described, in accordance with one embodiment of the present disclosure.

The Blockchain IdP server may send an email with a temporary PIN # to that address. In this case, the user may copy or type the PIN into the App. This confirms that the user has access to her email. And/or the Blockchain IdP server may send an email with a QR code to that address. In this case, the user may scan the QR code with the App to confirm the user has access to that email address.

One method of validating a phone number is for the user to send a text message via his/her App, in accordance with one embodiment of the present disclosure. The App invokes the phone's native messenger on the device (e.g., iMessenger on an iOS device) and prefills the following text fields:

Recipient "To" Phone Number or Email: Blockchain IdP server's listening phone # or email address Text Message: identifies the request to validate user's phone number and encrypted data that includes the identification of the user, including the user's registered ShoCardID.

The system will listen for this text message using the pre-filled recipient's phone number or email address. Then the system decrypts the text message and verifies the ShoCardID.

Another method of validating a phone number is for the user to manually type in the phone to be validated and send it to the service provider along with their ShoCardID in a Secure Envelope, previously described, in accordance with one embodiment of the present disclosure. The service provider server sends a text message to that phone number with a temporary PIN # or some other second/multi-factor. In this case, the user may copy/paste or type the PIN or second factor into the App. This confirms that the user has access to her phone number.

Another method of validating a phone number is for the user to manually type in the phone number to be validated and send it to the service provider along with their ShoCardID in a Secure Envelope, previously described, in accordance with one embodiment of the present disclosure. The service provider server sends a text message to that phone number with a notification to confirm. In this case, the user replies with a confirmation, and this confirms that the user has access to her phone number.

One method of confirming physical biometrics is to take a selfie, and optionally, to take it with any type of gesture to prove liveness, in accordance with one embodiment of the present disclosure.

One method of confirming physical biometrics is to record audio, in accordance with one embodiment of the present disclosure.

These methods are depicted in path 8 of FIG. 12.

Also, a method for creating and transmitting the secure envelope to the Blockchain IdP is disclosed, in accordance with one embodiment of the present disclosure. In particular, embodiments provide the means for the App to send the validated data in a Secure Envelope to the Blockchain IdP Server. The App creates a Secure Envelope, as previously described, to send to the Blockchain IdP Server, which is depicted in path 9 of FIG. 12, where:

--- a. The Sender = the User
b. The Receiver = the Company
c. The Destination System = the Blockchain IdP server
d. The Data is constructed using User Info, User's Blockchain Self-Certification, and the Invitation ID.
Data {
    User Info: which can be, but doesn't have to be:
      Name, Email, Employee ID, Phone #, Facial Image, and many other fields or any combination thereof
    User's Blockchain Self-Certification, as described herein,
    Invitation ID
}

---

Also, a method for decrypting and verifying the secure envelope is described. In particular, embodiments provide means to decrypt and verify the signature of the Secure Envelope. When the Blockchain IdP server receives a Secure Envelope, it follows the method for decrypting and verifying the secure envelope, previously described, as depicted in path 10 of FIG. 12, where:

a. The Sender=the User
b. The Receiver=Company
c. The Receiving System=the Blockchain IdP server Further, a method for verifying the user is disclosed, in accordance with one embodiment of the present disclosure. In particular, via the blockchain, embodiments provide the means to verify that the user is who he says he is. The Blockchain IdP server retrieves the user's blockchain Self-Certification using the pointer found in the decrypted Secure Envelope.

The Self-Certification record contains name-value pairs where for each field, the value was first hashed and then signed with the User's Private Key. To ensure that the User owns this particular Self-Certification record, the Blockchain IdP uses the Public Key that was passed in the Secure Envelope to verify any one of the signatures in the name-value pairs. This method is depicted in path 11 of FIG. 12.

Also, a method for hashing, signing, and certifying a user on the blockchain is disclosed, in accordance with one embodiment of the present disclosure. In particular, after all validation fields have been verified against the user's Self-Certification, embodiments provide the means to certify the user's ID on the blockchain. The Blockchain IdP Server creates a Company Certification for the user's ID using user information defined by the company, such as email, phone #, facial image, or many other fields, or any combination thereof. This certification is performed by hashing the data along with a Salt, signed with the Company's Private-Key, and placed on the blockchain, so that the certification is stored on the blockchain, but the user's data is not placed on the blockchain.

By leveraging hashes, Salts, and digital signatures, the embodiment ensures that identity certifications written onto the blockchain cannot be reverse engineered into their original data. This method is depicted in path 12 of FIG. 12.

Further, a method for company deactivation of an identity provider account is disclosed, in accordance with one embodiment of the present disclosure. In particular, when a Blockchain IdP user's access is revoked, the user's Company Certification should be canceled. Embodiments provide the means for canceling a user's Company certification.

Since blockchain records are immutable, the embodiment creates a Canceling Certification blockchain record that points to the original certification and tags it canceled. This works because during verification of a user for authentication, the embodiment retrieves all related certifications written for that user and verifies the latest updated state of the certification.

Whereas, there is no user data shared between service providers and each service provider depends on the blockchain to authenticate a user, when the embodiment revokes a user's access, the effect is immediate and ubiquitous.

Methods and Systems for Delegating Authority and Data from One Device to Another and from One App to Another A comprehensive digital Identity Management system is one that can represent the actions and processes that we take on in the real world. For example, in the real world, an individual may grant another individual the authority to act on their behalf—legally, this is often done through a power-of-attorney. In other cases, for example when an individual acts as an operator of a device, the actions of the device take on his/her authority. An example is when an individual drives a vehicle. The vehicle is under their authority, they are responsible for the vehicle's operations. This applies to other human/device interactions such as when an individual uses a computer, an application, a mobile device, or even a property such as a house or a hotel room. In all of these cases, there is a delegation of authority where the individual may interact through another person or device.

There are many use cases for delegation of authority. An Identity Management system first prescribes methods for designating that authority and to provide flexible means for it to be enacted on for different use cases.

The general form of authority delegation in this embodiment uses the blockchain Certification methods described herein. The process involves describing the delegation parameters, digitally signed by the user delegating his/her authority. For illustration, User A wishes to delegate authority to User B. User B can be another individual, another device, or even another App that may belong to the same User A. User A first gets the ID of User B—this ID is referred to as the ShoCardID, also described herein. There are a number of ways a user can obtain this ID as described in prior patents, but for the purposes of this patent, it is assumed that User A has obtained User B ShoCardID.

Additional parameters need to be specified to determine the delegation attributes. The list that follows is a sample set of parameters, but some parameters may be eliminated or others added in. This set is illustrated as an example. Each parameter can be specified as a name=value pair that is consistent with the format of certifications described herein. However, other format that convey the data can also be used. The following is a sample list:

```
Delegation Certification Data {
    CertifyingUser=<ShoCardID of UserA>
    UserBeingDeligated=<ShoCardID of UserB>
    Cmd=<GrantDelegation> or <UpdateDelegation> or
    <CancelDelegation>
    StartTime=<date&time when delegation begins>
    EndTime=<date&time when delegation expires>
    Array of Delegations {
        DelegationRight=<delegation right #1>
        DelegationRight=<delegation right #2>
        ...
        DelegationRight=<delegation right #N>
    }
}
```

In the above example, the Cmd code can specify one of different delegation forms such as a new delegation, update of an existing delegation or a cancelled delegation. The StartTime refers to when the delegation authority begins. This can be a time in the future or if the parameter is absent, it is immediately granted. The EndTime refers to when the delegation of authority is terminated. This can be a predetermined time or if absent, it can mean that the delegation of authority is valid until specifically terminated by User A.

The DelegationRight fields can identify system specific delegations of authority. In some systems, there may be one form of delegation and hence no specific DelegationRights may be necessary. In other systems, there may be various rights that a User A can grant to User B. For example, User A may grant User B with the right to access a specific bank account; or access to certain accounts; or allowed to sign documents pertaining to a business. These are not predefined delegation rights and as stated, each system may have its own specific parameters that can be specified.

In this process, User A may Delegate 3 different rights to User B. At a later point, User A may revoke one of those rights and leave the rest valid by creating a new Delegation Certificate where the Cmd used is a CancelDelegation with the DelegationRight that User A wishes to remove A method for storage of delegation information is disclosed, in accordance with one embodiment of the present disclosure. In particular, the Delegation Certification fields as described above can be sent to User B in a Secure Envelope such that User B can be made aware of delegation rights it has received. Additionally, User A will create a new record with all the name=value fields to be placed on the blockchain. Each name=value field will be modified similar to certification signatures described herein. The following illustrates this:

Name=DigitalSignature.prk.UserA(Hash(value+Salt))

The value field of each name=value pair is Hashed along with a Salt value. The Salt value is ultimately a unique random number that helps obfuscate the hashed data. The resulting hash is then digitally signed by User A's private key on his/her device. This process is repeated for all name=value pairs. The final result is then written to the blockchain. After User A has obtained the Salt values for each pair and has the pointers in the blockchain where the certification is written, it can pass that information along with the raw value of each name=value pair to User B via a SecureEnvelope or other forms of secure transmission.

A method for using the delegation information is disclosed, in accordance with one embodiment of the present disclosure. In particular, user B is now able to share the Delegation information it has received with other parties to perform with the authorities granted to it by User A. It simply shares the related authority fields it deems necessary with a third party and provides that third party with the necessary Salt parameters for the name=value pairs and pointers to the blockchain entry. The third party uses this information to validate the claims User B has made about delegation of authority granted to it by User A. The third party can also retrieve additional transactions that User A may have written to the blockchain, including updates or cancelations to determine if the delegation authority it has received form User B is stale or not. The third party cannot determine the value of the other fields without User B providing the information, but it can tell if the delegation certifications have been updated or cancelled in which case, it means the data received is stale. This validation process is described herein.

Methods and Systems for Encrypting and Decrypting Data within a Blockchain IdP

Traditional IdPs store Users' Personal Identification Information (PII) in databases (i.e. on disks) which can be accessed by hackers and stolen. Whereas traditional IdPs' data is vulnerable to hackers, embodiments of the present disclosure provide the means to encrypt a User's Personal Identification Information (PII) to be stored on a disk, such that hackers can't access it. When the data is needed by the Blockchain IdP, one embodiment provides a means to decrypt the data stored on disk and hold it in memory.

One embodiment provides a means to encrypt a User's PII data within a Blockchain IdP before it is stored to disk, in accordance with one embodiment of the present disclosure. This keeps it protected from hacker's who may try to access it. The embodiment encrypts the PII data with the Company password and stores it on disk encrypted.

```
Encrypted_PII = Encrypt (PII data, CompanyPassword)
Encrypted_PII → storage disk
```

A method for authorizing administrators to access user PII data within a Blockchain IdP is disclosed, in accordance with one embodiment of the present disclosure. In particular, one embodiment provides a means to give the Company's Administrators access to the User's PII data. These may be the client administrators, the Blockchain IdP's employees, or others.

For each Administrator created for the Company, his/her Public Key passcode is encrypted with the Company's passcode.

EncryptedCompPW=Encrypt (CompanyPassword, passcode.PBK)

A method for decrypting PII data within a blockchain IdP is disclosed, in accordance with one embodiment of the present disclosure. When the Blockchain IdP server comes up or an Administrator logs in to view data, one embodiment provides the means to decrypt the PII data retrieved from disk and store it into memory.

The embodiment gives the encrypted Company password to the Administrator. Using the Administrator's Private Key, the embodiment can decrypt the Company password.

CompanyPassword=Decrypt (EncryptedCompPW, passcode.PRK)

Then the Administrators App creates a Secure Envelope, as previously described, to send to the Blockchain IdP Server, where:
 a) The Sender=the Admin
 b) The Receiver=the Company
 c) The Destination System=the Blockchain IdP server
 d) The Data=decrypted Company Password A method for decrypting and verifying the secure envelope is disclosed, in accordance with one embodiment of the present disclosure. In particular, one embodiment provides a mean to decrypt and verify the signature of the Secure Envelope. When the server receives a Secure Envelope, it follows the method previously described when decrypting and verifying the secure envelope, where:
 g. The Sender=the Admin
 h. The Receiver=the Company
 i. The Receiving System=the Blockchain IdP server A method for decrypting the PII and moving it to memory is disclosed, in accordance with one embodiment of the present disclosure. In particular, one embodiment provides a means to decrypt the PII data and move it into memory. With the Company password now decrypted, the embodiment can retrieve the encrypted PII data from storage disk and decrypt it.

Storage disk → Encrypted_PII
PII = Decrypt (Encrypted_PII, CompanyPassword)

Methods and Systems for Using Blockchain Tokens for Compensation of ID Certification A method for tokenization of identity using a blockchain is disclosed, in accordance with one embodiment of the present disclosure. In particular, a cryptocurrency exchange is disclosed, and may be referred to in the Specification as "ShoExchange," wherein the cryptocurrency exchange is configured to provide financial incentives to users and clients in order to retain customers and expand the market. The ShoExchange is fully integrated into the ShoCard IM Platform. Users are more likely to perform platform operations, such as creating user identities, certifying users, and sharing certifications, when doing so generates financial incentives.

One or more example components are described. When the Blockchain IdP server comes up or an Administrator logs in to view data, one embodiment provides the means to decrypt the PII data retrieved from disk and store it into memory. The following terms are provided by way of example, and can be limited or expanded depending on the implementation.

ShoExchange—a private currency exchange that is supported within the ShoCard IM Platform. It provides the facility to exchange a ShoCoin for its equivalent number of ShoTokens and vice versa.

ShoCoin—a unit of cryptocurrency for peer-to-peer exchange of value within the ShoCard IM Platform. A ShoCoin can be purchased or sold on publicly-traded cryptocurrency exchanges. Buyers can purchase ShoCoins for an exchange with existing cryptocurrencies, such as ETH or Bitcoin.

ShoToken—A ShoToken is worth one-thousandth of a ShoCoin. It is an internal unit of currency used within and controlled by the ShoCard IM Platform, and it represents the value of transactional units. This then allows for smaller units of compensation.

1 ShoCoin=1,000 ShoTokens

The relationship between a ShoCoin and a ShoToken is like that of a Bitcoin and a Satoshi. Individuals purchase a Bitcoin, which is typically exchanged with fiat currency. However, in actual bitcoin transactions, they spend Satoshis, which are one-millionth of a Bitcoin.

ShoTokens are managed in a separate instance of Ethereum. ShoToken ownership is directly tied to a ShoCardID. Each trader receives a unique ShoCardID.

Public Cryptocurrency Exchange—a public exchange that allows individuals or entities to exchange fiat currency for Bitcoin or ETH and Bitcoin/ETH for other cryptocurrencies. These other cryptocurrencies are often initially offered via an Initial Coin Offering (ICO). ShoCoins will be traded on these exchanges and initially offered via an ICO. ShoCoins follow the Ethereum ERC20 token standard.

There are five main "constituents" engaged in the token exchange who receive or pay tokens: Identity Owner, IMS, ShoCard-IP, Certifier, and the Verifier.

The Identity Owner is usually the end user whose identity is in consideration. This identity is not limited to people and can include entities (e.g., a company, animals, IoT devices, governments. However, ShoCard's current capabilities scope an Identity Owner as either a person or a company.

IMS is the Identity Management Service. In the current environment, that is the ShoCard Service module. However, once the interface is opened as a standard, other IMS services may provide similar services.

ShoCard-IP, specifically ShoCard as the intellectual property (IP) holder, with its patented solution in providing a blockchain-based authentication of identity.

A Certifier is a person or entity who certifies an Identity Owner. This can be certification of the user's identity or an attribute, such a credit rating.

A Verifier is a person or entity who is in receipt of an Identity Owner's information along with certifications and validates those certifications against their records on the blockchain.

There are a number of ways that tokens can be exchanged and/or traded. Some exchanges are mandatory and established by the exchange system and some are established by the service providers. In most cases, the service provider gives a token to incentivize the users to remain engaged in the eco-system and profit from the value they create. Ultimately, the ShoCard IM creates efficiencies and saves costs for both the user and the service providers; therefore, both parties should receive compensation accordingly. FIG. 13 shows some examples of token exchanges in table form, in accordance with one embodiment of the present disclosure.

In FIG. 13, when a Certifier certifies an Identity Owner's credentials, the Identity Owner is considered to be an active client of that Certifier; hence, the Certifier will pay a nominal fee as a subscription for that Identity Owner during Time T (e.g., a month). An Identity Owner may be verified many times during that time period T. For example, the Identity Owner may be verified numerous times for logging in to a service during a month, but the Certifier is charged a fixed amount for that month. This is intended to enable frequent verifications.

In a token exchange or token exchanges, ShoCoins represent larger units of currency, and their price can increase over time with demand for ShoCard services. The smaller denomination, ShoTokens, are more granular so they can be used for actual IM platform transactions. Price fluctuations in the cryptocurrency requires the IM platform to provide conversions of fiat values into ShoToken values.

For example, the cost of purchasing a digital credit report may be $20, as is shown in FIG. 14, which shows costs of digital credit reports, in accordance with one embodiment of the present disclosure. In the exchange, a credit reporting agency (a Certifier) may certify an Identity Owner's credit report and require a $20 compensation for that. If the price of ShoCoins (and ShoTokens) increases over the course of a month, the credit reporting agency still wants to charge $20 compensation. Hence, the system provides for such conversions such that the number of ShoTokens are calculated based on their fiat equivalent pricing.

In an escrow process, as the ShoExchange facilitates the trading ShoCoins for ShoTokens and vice versa, it ensures there are always enough ShoTokens and ShoCoins available in the exchange. It will do so by holding the currencies in escrow. For example, if someone exchanges 10,000 ShoCoins for equivalent ShoTokens, the exchange holds those ShoCoins in escrow so that if someone attempts to redeem the same number of ShoTokens, there are sufficient ShoCoins available to the exchange. There can never be more ShoTokens created than their ratio to existing ShoCoins.

There are natural fluctuations in the ShoCoin/ShoToken pool. In particular, the number of ShoCoins available for the system can naturally decrease as certain coins will simply be left out of circulation or even lost. If an entity purchases a large set of coins and never utilizes them, those coins are by default taken out of the market. This reduces the available number of coins needed for transactions. Certain coins may be lost in the case of a user's death. This is true with real-life assets, as well. However, such decreases can impact the system.

As production use of the coins and tokens increases in IM platform transactions, the demand for the coins increases, and they become scarcer. The counter balance, however, is that as the value of the ShoToken increases, the number of tokens needed per transaction to give the same fiat value decreases (as shown in Table 1). However, as more individuals and service providers utilize the IM platform, the demand will inevitably increase to a point where ShoCard will need to increase the supply of the coins.

When the ratio of ShoTokens to ShoCoins in circulation goes beyond 75%, while at least 50% of all issued ShoCoins are in circulation, additional ShoCoins will be created to reduce the ratio to 65%. ShoTokens are in circulation if they have been exchanged for equivalent ShoCoins. A ShoToken that has been redeemed for a ShoCoin is no longer considered to be in circulation.

In terms of architectural evolution, the current token architecture was designed and implemented in the IMS platform with consideration for scale and cost management. It is anticipated that as the market expands, the use of ShoCoins and ShoTokens will dramatically increase. If these transactions are performed purely on the public Ethereum network, performance and scale can be significantly hindered with large quantity of transactions. The tokenization architecture described above deals with these issues. As part of the development plan, this architecture will continue to evolve and may change over time to better serve market needs and use cases and create improved efficiencies and simplicity. This can significantly change the described architecture while maintaining the integrity of the coins.

Identity Management Service Using a Block Chain

Figure 15:
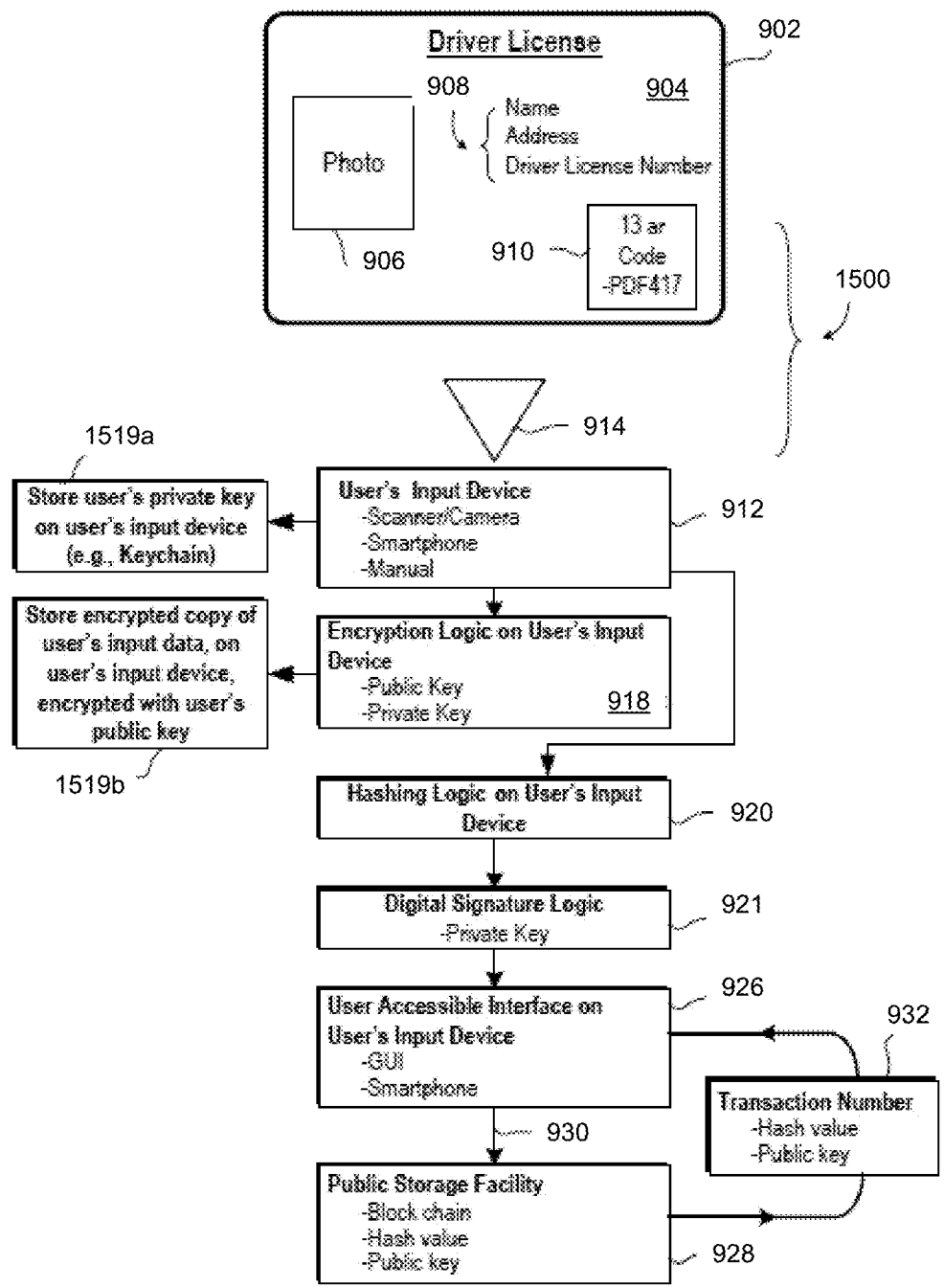
FIG. 15 shows a simplified block diagram of a system and method for sealing an identity of a person in a public storage facility, in accordance with one embodiment of the present disclosure.

FIG. 15 shows a simplified block diagram of a system and method for sealing an identity of a person in a public storage facility, in accordance with one embodiment of the present disclosure. FIG. 15 shows a simplified block diagram for a system 1500 and method for managing the identity of a user by way of making verifiable transactions with a public storage facility 928. By way of example, an identification card 902 may be used. In other embodiments, other forms of identification, which may be digital or non-digital may be used. In the example of the identification card 902, personal data 904 is contained thereon, which identifies the user. The personal data can include a photo 906 of the user; the user's name, address and driver license number 908, and/or a bar code 910 or similar computer code for storing, scanning and/or retrieving additional data. Such coding can include PDF417 codes, QR codes, and other such codes. However, it is not necessary to have such code and the identification card may have human-readable text strings. As noted above, the identification card 902 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 902 can be a government issued form of identification such as a driver license, passport, employee badge, military identification, political documentation, or the like. The identification card 902 can also be a privately issued form of identification such as a student ID, library card, social club card, or any other form of identification issued by a third party In one embodiment, as indicated by triangle 914, an input device 912 may be used to input such personal data from the identification card 902 to provide input data. Input device 912 can take many forms. For example, input device 912 can be a digital scanner, digital camera, or smartphone (e.g., with the camera commonly found in smartphones) for reading data from the identification card 902, including any codes appearing on the card 902. The input device 912 can also be a device for manually inputting personal data such as a keyboard, touchscreen, voice recognition device, handwriting recognition device, or other manual input device.

As shown in FIG. 15, the input data can be optionally encrypted by encryption logic 918 and securely stored in operation 1519b. In one implementation, the input data is transferred directly to hashing logic 920, without passing through encryption logic 918. For ease of understanding, the operations of the optional encryption logic 918 will be discussed first, and then the operations processed by the hashing logic 920. As such, the process may proceed directly from receiving the user information via 912 to the hashing logic 920.

The input data collected from the input device 912 (e.g., a user's smartphone) is passed to encryption logic 918 on input device 912. In an example embodiment, encryption logic 918 might include software, firmware, hardware, or any combination thereof, and consist of one or more encryption algorithms, e.g., an RSA encryption algorithm. Encryption logic 918 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. As shown in operation 1519b, this encrypted data can then be stored locally on the input device 912 for added security. It can then be accessed with the private key of the user on the input device 912, which might be stored in a more secure part of input device 912, e.g., "the Keychain", in operation 1519a, if input device 912 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 912. It should be understood that the private key may be stored on another device, but similar or additional security should be processed to ensure that the private key is not compromised.

As noted above, the operations to be performed by the hashing logic 920 can proceed directly after receiving the input data from the input device 192. In this embodiment, the hashing logic 120 is used for hashing the input data (e.g., personal information collected) to provide or generate a hash value. The hash value is sometimes referred to as "hash data," that is generated by an algorithm. In an example embodiment, hashing logic 920 might be software, firmware, hardware, or any combination thereof, and consist of one or more hashing algorithms, e.g., a Secure Hash Algorithm (SHA) algorithm. Hashing logic 920 passes the hash value to digital-signature logic 921, which performs a digital signature on the hash value, using the private key on the input device 912. In an example embodiment, digital-signature logic 921 might be a component (or module) of encryption logic 918. In other embodiments, the digital-signature logic 921 may be defined by separate code, firmware, and/or hardware.

In one embodiment, the digital-signature logic 921 then passes the signed hash value and the public key to a user accessible interface 926 (e.g., a graphical user interface or GUI), which might be other software running on the input device 912. In an example embodiment, the user accessible interface 926 might be part of an application or app that includes encryption logic 918, hashing logic 920, and digital-signature logic 921, and/or other modules or code. The user accessible interface 926 might be used by the user to transmit the digitally signed hash value and the public key to a public storage facility 928 via a line 930, and receive back from the public storage facility 928 a transaction number 932 corresponding to the transmitted hash value and public key. As used in this disclosure, a "line" might be part of a wired and/or wireless connection or network, including a bus, an intranet, an internet, an extranet, a public computer network, a private computer network, etc., in an example embodiment. In an alternative example embodiment, the signed hash value might be transmitted to public storage facility 928 by the user and persons retrieving the signed hash value might obtain the public key from elsewhere (e.g., the user, a public database, an Internet repository, a website, etc.). As is well known, there is no need to keep public keys secure, and in fact, the algorithms using public/private key pairs are design to enable full sharing of public keys. The private key, on the other hand, is kept secure, as noted above.

In one embodiment, the public storage facility 928 can take the form of a block chain (e.g., in a bitcoin online payment system) or any other public or private distributed database. The public storage facility 928 is connected to a communication link via a line and can be adapted to communicate over a public computer network, the internet, an intranet, an extranet, or any private communication network. Broadly speaking, the public storage facility 928 is accessible by any device that has an Internet connection over a network. A block chain, as is known in the art, is a system that enables users' access to securely store data in a public place. The data is deemed secure, as each time data is written, the written data is dependent on previously written data, which includes performing cryptographic hash operations. A benefit of using a block chain is that once data is written to the block chain and a block chain transaction is created, that transaction remains intact, and can be verified in the future. The reason for this, is that data is continually written to the block chain, e.g., after a particular transaction is made, and that later data is dependent on an earlier particular transaction. Consequently, by writing data to a public storage facility that implements a public block chain, later verification of that data is practically ensured to be correct.

As indicated above, in an example embodiment, the input data might be hashed and the resulting hash value might be signed with a digital signature, created using a private key paired with a public key, before transmission, optionally along with the public key, from the input device (e.g., a user's smartphone) 912 to the public storage facility 928 for storage. The user accessible interface 926 is thus adapted to "seal" the signed hash value and the public key in the public storage facility 928. In one embodiment, once the hash value, and optionally the public key of the user is written to the block chain in a transaction, a later verification may be made if another party is able to hash the same input data.

Figure 16:
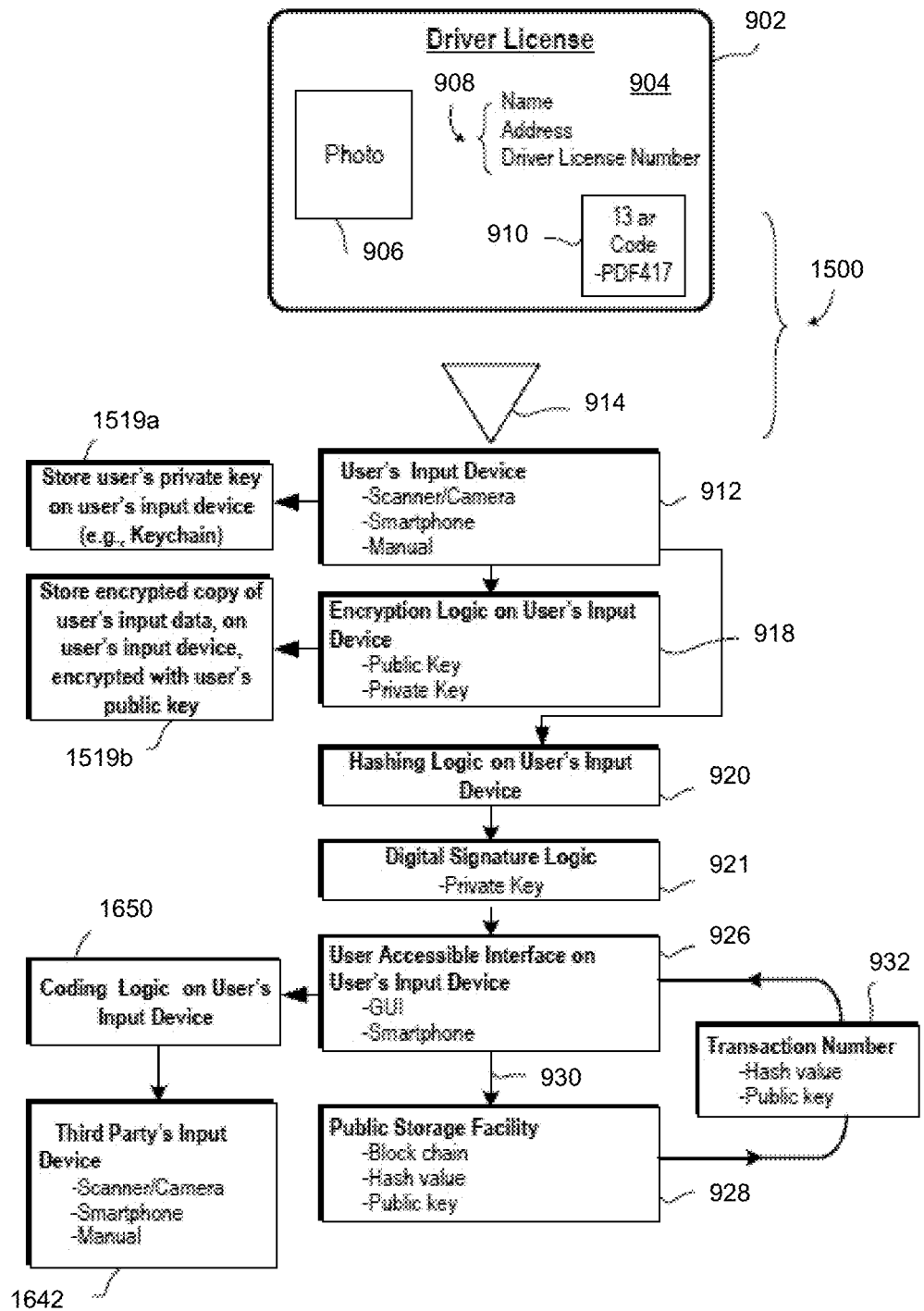
FIG. 16 also shows a simplified block diagram of a system and method for sealing an identity of a person in a public storage facility, in accordance with one embodiment of the present disclosure.

FIG. 16 also shows a simplified block diagram of a system and method for sealing an identity of a person in a public storage facility, in accordance with one embodiment of the present disclosure. As depicted in FIG. 16, user accessible interface 926 (e.g., a GUI) can be controllable by the user of the input device 912 to encrypt and provide the transaction number 932, the input data, and, optionally, the public key of the user, to an input device 942 (e.g., a smartphone) of a third party (e.g., a financial institution or other entity engaging in a commercial, private transaction, or other transaction with the user) to, for example, establish the identity of the user. In one embodiment, the third party will access the block chain using the transaction number 932 to retrieve the digitally signed hash value, and optionally, the public key if the public key has not been previously obtained by the third party from another source/location, and enable comparison with a hash value that is generated by the third party using the input data and the same hashing algorithm. In one embodiment, a distributed public database is a block chain, which receives data for storage from a plurality of entities. The entities need not be related, and the type of data need not be the same. In general, entities storing the block chain are unrelated, and the type of data can vary to almost any type of digital data, e.g., not limited to identity data, commercial data, bitcoin data, etc. Thus, the data received for storage is configured to be processed to generate a transaction record that is dependent on previous data stored to the block chain. The transaction record being dependent on previous data stored to the block chain ensures that data stored to the block chain is not modifiable, as each later data stored to the block chain continues to be dependent on previous data stored to the block chain.

In an example embodiment, the encryption of the transaction number 932, the input data, and, optionally, the public key of the user might be performed by the encryption logic 918 using a public key of a third party paired with a private key of the third party. Then, coding logic 1650 on the input device 912 might code the encrypted items into a barcode or QR code and the third party might use input device 1642 to scan the barcode or QR code and decode it to gain access to the encrypted items. Thereafter, the third party might decrypt the encrypted items using the private key of the third party to perform a verification operation. In one embodiment, the verification may use an RSA algorithm as explained in further detail below. Other verification algorithms may also be used, depending on the configured implementation.

Figure 17A:
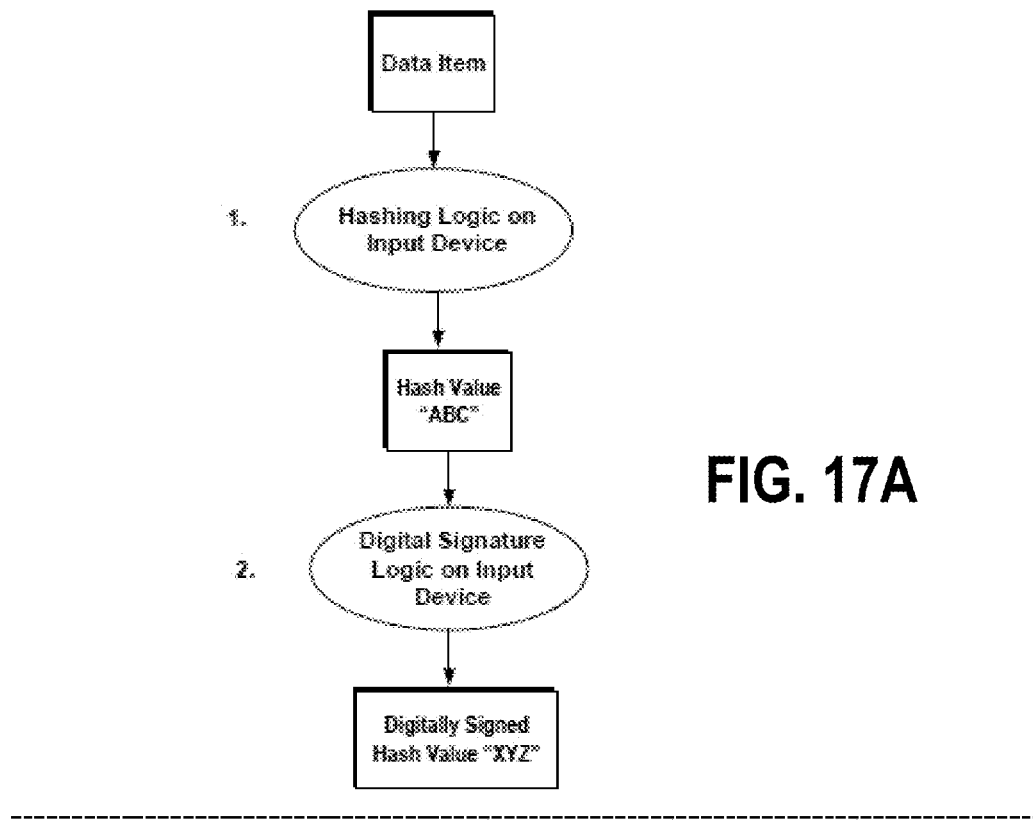
FIGS. 17A-17B show a process for verifying hashed input data and a digital signature, in accordance with one embodiment of the present disclosure.
Figure 17B:
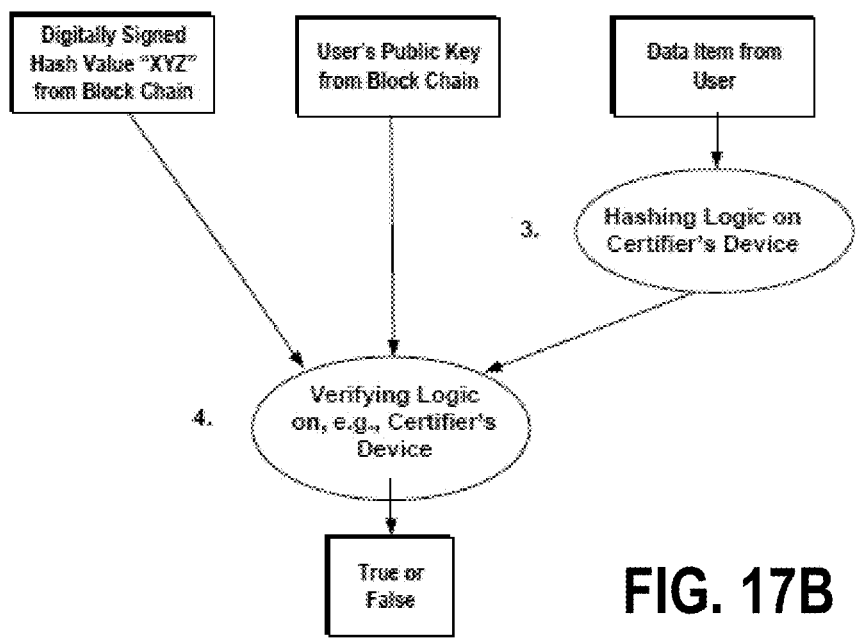

FIGS. 17A-17B show a process for verifying hashed input data and a digital signature, in accordance with one embodiment of the present disclosure. This verification process is depicted in FIGS. 17A-17B. FIG. 17A shows how a digitally signed hash value is created from input data. The input data (or selected fields of the input data) is hashed into a hash value "ABC" by hashing logic 220 on the user's input device 112, in operation 1. Then the hash value "ABC" is digitally signed with the user's private key using digital-signature logic 121 to create digitally signed hash value "XYZ", in operation 2.

FIG. 17B shows how a digitally signed hash value is verified after being retrieved along with the public key of the user from the public storage facility 928. The input data (or selected fields of the input data) is received from the user's input device 912 at the certifier's input device 942 and is hashed into a generated hash value "ABC" using hashing logic 972, in operation 3. Then the signed hash value "XYZ", the generated hash value "ABC", and the user's public key are input to verification logic 973 in operation 4. The verification logic 973 might include a RSA verification algorithm, in an example embodiment. If the hash value in the digitally signed hash value "XYZ" is the same as the generated hash value "ABC" and the digital signature was signed with a private key that is associated with the user's public key, the verification logic 973 returns a value of "true". Otherwise the verification logic 973 returns a value of "false". It should be understood that the verification logic 973 may be executed on any device (e.g., a user's device, a certifier's device, a verifier's device, a third party's device, a commercial entity's device, a private entity's device, etc.), that needs to perform a verification operation.

Upon receipt of a "true" value from encryption logic 970, the certifier might create a certification record that refers to the verification. In an example embodiment, the certification record might include the transaction number 932, the input data (or selected fields of the input data), received from the user, and, optionally, a timestamp, and the certification record might be hashed and digitally signed by the certifier using a private key of the certifier associated with a public key. Then the certifier might use user accessible interface 980 (e.g., a GUI) to transmit the signed certification record to the public storage facility 928 for storage and receive in return transaction number 982 from the public storage facility 928. In an example embodiment, the certifier might encrypt the certification record with the certifier's public key before transmission to the public storage facility 928, in order to keep the certification record private.

It will be appreciated that the verification process shown in FIGS. 17A-7B might be used to verify the digital signature on items of data other than the input data (or selected fields of the input data) received by input device 912. In an example embodiment, the item of data that is digitally signed might not be hashed before being digitally signed. In an example embodiment, the verification process shown in FIGS. 17A-7B might be used to verify a digitally-signed hash of a document other than an identification card, e.g., a digitally-signed certification as described above or a digitally-signed acknowledgement as described below. Or, the same verification process might be used to verify a digitally-signed token (e.g., random number) that is sent by a sender using a secure-envelope process. A secure-envelope process, as described below, might be used instead of, or in addition to, public-key encryption when transmitting data from a user to a certifier, verifier, third party, etc., and vice versa.

In an example embodiment, when using a secure envelope process, a sender might hash a real-time token (e.g., a random number generated by the user's remote device) and digitally sign the hashed token using the sender's private key. In an example embodiment, a timestamp might be optionally included with the token. Then the sender might transmit the signed hashed token and, optionally, the public key associated with the sender's private key to a distributed public database for storage, receiving a transaction number in return from the distributed public database. Thereafter, the sender might transmit the transaction number and the token to a receiver, e.g., a certifier, a verifier, a third party, etc., optionally, after encrypting the transaction number and the token with the receiver's public key. In an example embodiment, the receiver might receive the transaction number and token (optionally including the timestamp), decrypt them using the receiver's private key, if necessary, and then use the transaction number to retrieve the digitally signed hashed and, optionally, the sender's public key from the distributed public database. The receiver might generate a hash of the token using the same hashing algorithm the sender used. Then the receiver might verify, e.g., using an RSA verify call as described above, that the token in the generated hash is the same as the token in the digitally signed hash token and verify that the digital signature was created with the sender's private key. An RSA verify call may be, for example, processed by verifying logic 973, e.g., to execute a verify operation. In an example embodiment, the token (optionally including the timestamp) might not be hashed before being signed.

Figure 18:
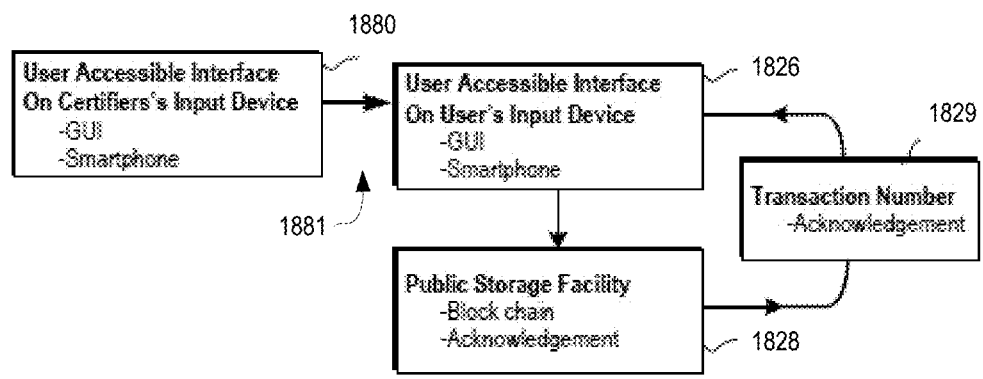
FIG. 18 shows a simplified block diagram for recording an acknowledgement, in accordance with one embodiment of the present disclosure.

FIG. 18 shows a simplified block diagram for recording an acknowledgement, in accordance with one embodiment of the present disclosure. In one configuration, as depicted in FIG. 18, the certifier might encrypt the certification record and transaction number 1882 (e.g., the transaction number the certifier received from the public storage facility 928) with the user's public key and transmit in 1881 the encrypted certification record to the user, using user accessible interface 980 (e.g., a GUI). Upon receiving the encrypted certification record, the user might decrypt it using the user's private key and then create an acknowledgement record that refers to or includes the certification record, and optionally includes a timestamp, in order to link the two records in the public storage facility 928 to facilitate convenient lookup by a third party, if the certification record is verified. Here again, to verify the certification record, the user might hash the certification record using the same hashing algorithm that the certifier used prior to digital signature by the certifier. The user might use transaction number 982 to retrieve the signed certification record and the certifier's public key from the public storage facility 928. Then the user might verify that the certification record in the generated hash is the same as the certification record in the digitally signed certification record and verify that the digital signature was created with the certifier's private key, e.g., using an RSA verify call as described above.

In an example embodiment, the acknowledgement record might include the certification record, the transaction number 982, and optionally, a timestamp, and the user might digitally sign the acknowledgement record with the user's private key. Then the user might use user accessible interface 1826 (e.g., a GUI) to transmit the signed acknowledgement record and the user's public key to the public storage facility 1828 for storage and receive a transaction number 1829 in response from the public storage facility 928. In an example embodiment, the user might encrypt the signed acknowledgement record with the user's public key before transmission to the public storage facility 1828 in order to keep the acknowledgement record private.

Figure 19:
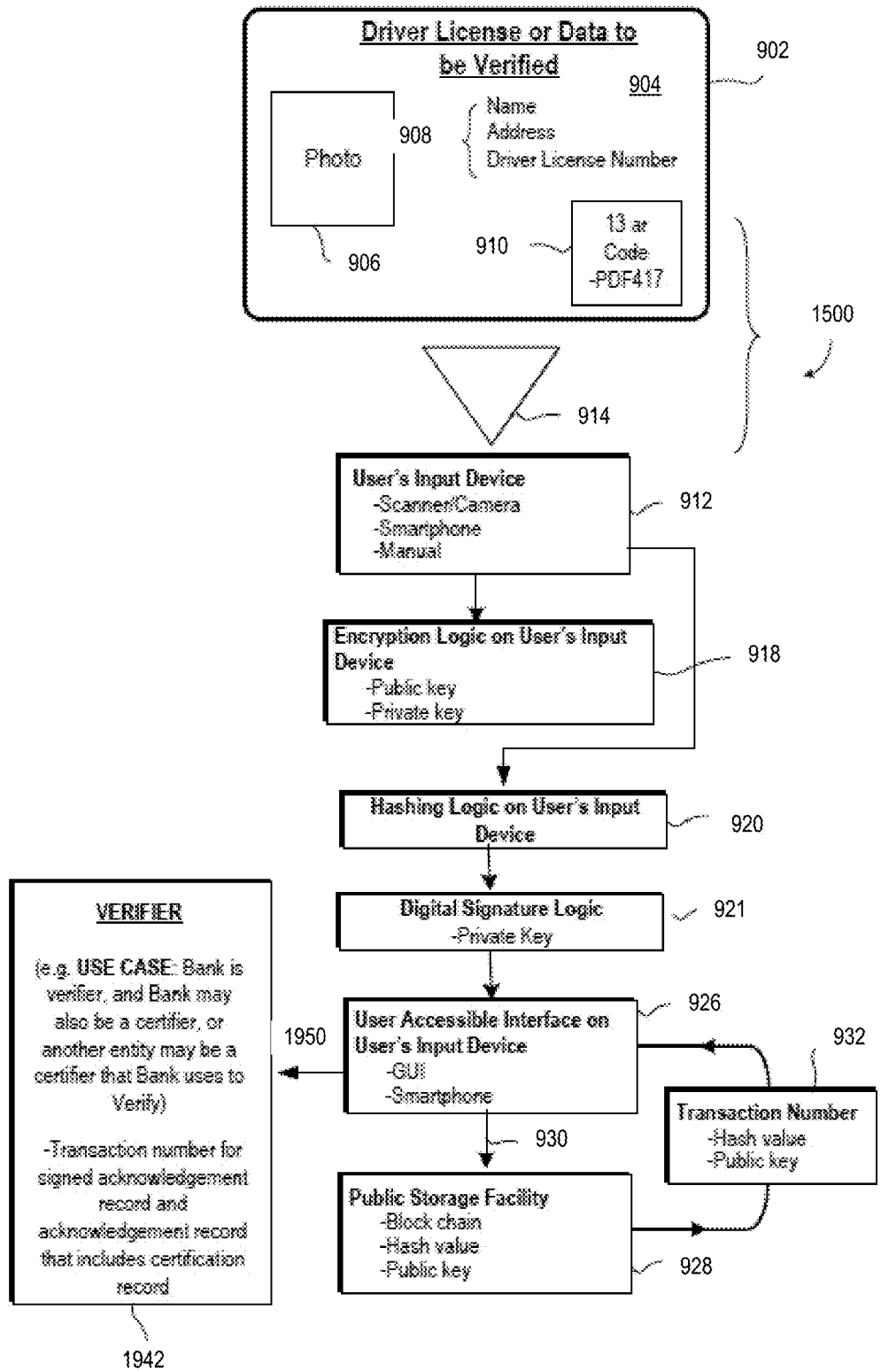
FIG. 19 shows a simplified block diagram of a system and method for verifying an acknowledgement record, in accordance with one embodiment of the present disclosure.

FIG. 19 shows a simplified block diagram of a system and method for verifying an acknowledgement record, in accordance with one embodiment of the present disclosure. In particular, FIG. 19 shows a simplified block diagram for a system and method for certifying a pending transaction. By way of example, an identification card 902 may be used. In other embodiments, other forms of identification, which may be digital or non-digital may be used. In the example of the identification card 902, personal data 904 is contained thereon, which identifies the user. The personal data can include a photo 906 of the user; the user's name, address and driver license number 908, and/or a bar code 910 or similar computer code for storing, scanning and/or retrieving additional data. Such coding can include PDF417 codes, QR codes, and other such codes. However, it is not necessary to have such code and the identification card may have human-readable text strings. As noted above, the identification card 902 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 902 can be a government issued form of identification such as a driver license, passport, employee badge, military identification, political documentation, or the like. The identification card 902 can also be a privately issued form of identification such as a student ID, library card, social club card, or any other form of identification issued by a third party.

In one embodiment, as indicated by triangle 914, an input device 912 may be used to input such personal data from the identification card 902 to provide input data. Input device 912 can take many forms. For example, input device 912 can be a digital scanner, digital camera, or smartphone (e.g., with the camera commonly found in smartphones) for reading data from the identification card 902, including any codes appearing on the card 902. The input device 912 can also be a device for manually inputting personal data such as a keyboard, touchscreen, voice recognition device, handwriting recognition device, or other manual input device.

As shown in FIG. 19, the input data can be optionally encrypted by encryption logic 918 and securely stored. In one implementation, the input data is transferred directly to hashing logic 920, without passing through encryption logic 918. For ease of understanding, the operations of the optional encryption logic 918 will be discussed first, and then the operations processed by the hashing logic 920. As such, the process may proceed directly from receiving the user information via 912 to the hashing logic 920.

The input data collected from the input device 912 (e.g., a user's smartphone) is passed to encryption logic 918 on input device 912. In an example embodiment, encryption logic 918 might include software, firmware, hardware, or any combination thereof, and consist of one or more encryption algorithms, e.g., an RSA encryption algorithm. Encryption logic 918 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. This encrypted data can then be stored locally on the input device 912 for added security. It can then be accessed with the private key of the user on the input device 912, which might be stored in a more secure part of input device 912, e.g., "the Keychain", if input device 912 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 912. It should be understood that the private key may be stored on another device, but similar or additional security should be processed to ensure that the private key is not compromised.

As noted above, the operations to be performed by the hashing logic 920 can proceed directly after receiving the user information from the input device 912. In this embodiment, the hashing logic 920 is used for hashing the input data (or selected fields of the input data or personal data) to provide or generate a hash value. The hash value is sometimes referred to as "hash data," that is generated by an algorithm. In an example embodiment, hashing logic 920 might be software, firmware, hardware, or any combination thereof, and consist of one or more hashing algorithms, e.g., a Secure Hash Algorithm (SHA) algorithm. Hashing logic 920 passes the hash value to digital-signature logic 921, which performs a digital signature on the hash value, using the private key on the input device 912. In an example embodiment, digital-signature logic 921 might be a component (or module) of encryption logic 918. In other embodiments, the digital-signature logic 921 may be defined by separate code, firmware, and/or hardware.

In one embodiment, the digital-signature logic 921 then passes the signed hash value and, optionally, the public key to a user accessible interface 926 (e.g., a graphical user interface or GUI), which might be other software running on the input device 912. In an example embodiment, the user accessible interface 926 might be part of an application or app that includes encryption logic 918, hashing logic 920, and digital-signature logic 921, and/or other modules or code. The user accessible interface 926 might be used by the user to transmit the digitally signed hash value and, optionally, the public key to a public storage facility 928 via a line 930, and receive back from the public storage facility 928 a transaction number 932 corresponding to the transmitted hash value and public key.

In one embodiment, the public storage facility 928 can take the form of a block chain (e.g., in a bitcoin online payment system) or any other public or private distributed database. The public storage facility 928 is connected to a communication link via a line and can be adapted to communicate over a public computer network, the internet, an intranet, an extranet, or any private communication network. Broadly speaking, the public storage facility 928 is accessible by any device that has an Internet connection over a network.

As indicated above, in an example embodiment, the input data might be hashed and the resulting hash value might be signed with a digital signature, created using a private key paired with a public key, before transmission, optionally along with the public key, from the input device (e.g., a user's smartphone) 912 to the public storage facility 928 for storage. The user accessible interface 926 is thus adapted to "seal" the signed hash value and the public key in the public storage facility 928. In one embodiment, once the hash value, and, optionally, the public key of the user is written to the block chain in a transaction, a later verification may be made if another party is able to hash the same input data.

The user accessible interface 926 (e.g., a GUI) can be controllable by the user of the input device 912 to transmit, in 1950, an acknowledgement record, a transaction number for a signed acknowledgement record, and optionally the user's public key to a verifier 1942. In an example embodiment, transaction number 932 for the signed input data and the input data might also be transmitted to verifier 1942, for verification using the verification process used by the certifier, as described above. As used herein, to provide broad understanding of the functions or operation of verifier 1942, an example use case of a bank, being the verifier is provided. It should be understood that the verifier can be any entity that needs to verify identity, data, or transaction(s). Additionally, the certifier may be any entity that has certified identity, data, or transaction(s). Thus, in this use case example, the bank is not necessarily the same entity as the certifier, but in other circumstances, the bank may also be the certifier. By way of example, the bank may verify a certification made by another entity, e.g., a credit card company, a car company, a government agency, a private entity, etc. Acknowledgement records and transaction numbers for signed acknowledgement records were discussed in detail above with respect to FIG. 18. As noted indicated above, the user might use encryption with the verifier's public key and/or a secure-envelope process for transmission 1950.

Figure 20:
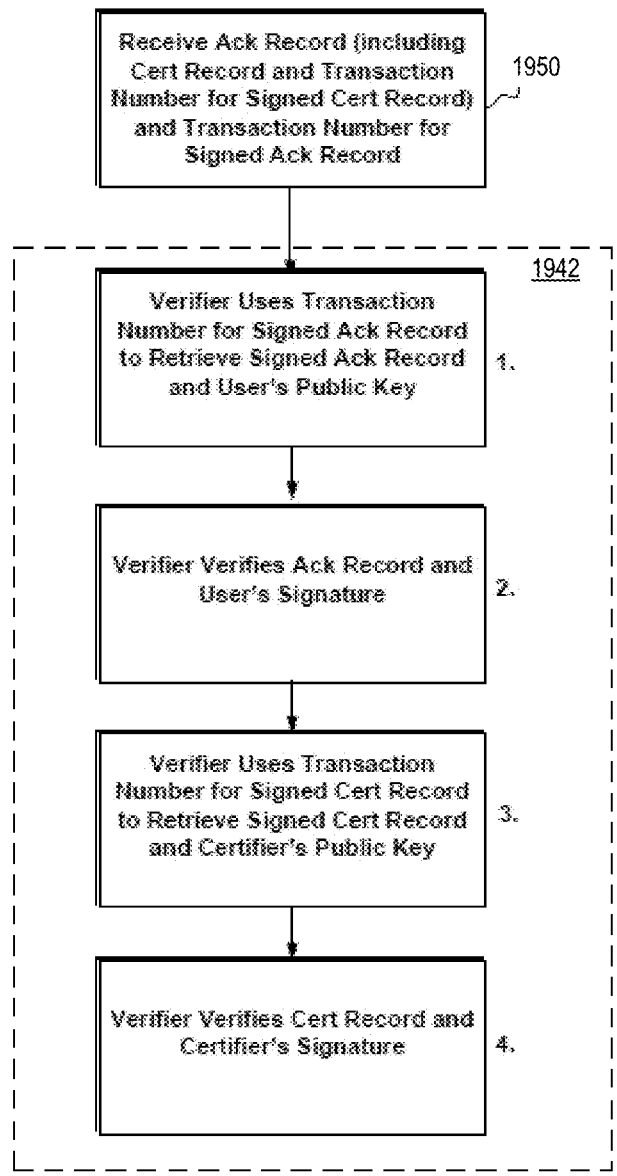
FIG. 20 shows a flowchart diagram for a method for verifying an acknowledgement record and its underlying certification record, in accordance with one embodiment of the present disclosure.

FIG. 20 shows a flowchart diagram for a method for verifying an acknowledgement record and its underlying certification record, in accordance with one embodiment of the present disclosure.

Once the verifier receives the acknowledgement record and the transaction number for the signed acknowledgement record, the verifier might use the process shown in FIG. 20 to verify the acknowledgement record and its underlying certification record. In operation 1, the verifier uses the transaction number to retrieve the signed acknowledgement record and, optionally, the user's public key from public storage facility 928. Then, in operation 2, the verifier hashes the acknowledgement record with the same hashing algorithm that was used by the user and verifies the acknowledgement record and the user's signature, using a verification algorithm as discussed in detail above. If the verification is successful, the verifier uses the transaction number for the signed certification record to retrieve the signed certification record and the certifier's public key from public storage facility 928, in operation 3. Then, in operation 4, the verifier hashes the certification record with the same hashing algorithm that was used by the certifier and verifies the certification record and the certifier's signature, using a verification algorithm as discussed in detail above. If this verification is also successful, the verifier might create another certification record as discussed above and transmit it to public storage facility 928, receiving, in response, another transaction number, which might be transmitted along with the verifier's certification record to the user for another acknowledgement record.

In the event the certification record and/or the acknowledgement record are optionally encrypted before transmission to the block chain, the user transmits an unencrypted acknowledgment record to the verifier and the verifier performs its verifications using the data in the unencrypted acknowledgement record. In an example embodiment, these verifications include checking that an acknowledgment record in fact exists in the block chain with the transaction number for the signed acknowledgement record. Also, in an example embodiment, the unencrypted acknowledgment record includes the transaction number of the signed certification record along with other unencrypted data from the certification record. Using the transaction number for the signed certification and the unencrypted data from the certification record, the verifier can confirm that the certification record in fact exists on the block chain and can process the unencrypted data in the certification record to verify the certifier's signature, even if the certification record was also encrypted before transmission to the block chain.

In both FIGS. 16 and 17, systems and methods for verifying the identity of a user are described, and include the user's input device 912, in accordance with embodiments of the present disclosure. The user's input device 912 is configured for receiving personal data identifying the user from an identification card, for example, that defines input data. The input device may be configured to execute an encrypting machine configured for encrypting the input data using a public key of the user, wherein the public key is paired with a private key of the user. The input device may be configured to execute a hashing machine configured for hashing the encrypted input data to provide a hash value. The input device may be configured for executing a user accessible interface for transmitting the hash value and the public key to a public storage facility (e.g., blockchain) and for receiving back from the public storage facility a transaction number corresponding to the hash value and the public key. The transaction number and the public key may be used for purposes of verifying the identity of the user without decrypting the encrypted input data. In particular, a receiver of the transmitted input data uses the transaction number and the public key of the user to perform an encryption of the input data, and determine whether the identity is verified. That is, the receiver performs the same processes as the user's input device 912 (e.g., encryption, hashing, etc.) to verify that the transmitted input data (as received by the receiver) is the same data used for storing the hash value in the public storage facility corresponding to the same transaction number. Specifically, the process of verifying an identity of a user by signing, using a public key of the user, a hash value of the personal identifying data of the user, and then sending that signed value and the public key to a public storage facility and receiving from the public storage facility a transaction number corresponding to the hash value and the public key, and then having a receiver (e.g., of a verifier) receive the personal identifying data of the user, and the transaction number and the public key of the user, then performing an encryption of the personal identifying data of the user, and determining whether the identity is verified, without decrypting the encrypted data (e.g., stored to the blockchain) (because the newly encrypted data should match that stored to the blockchain, or be verifiable to match that stored to the blockchain).

Figure 21:
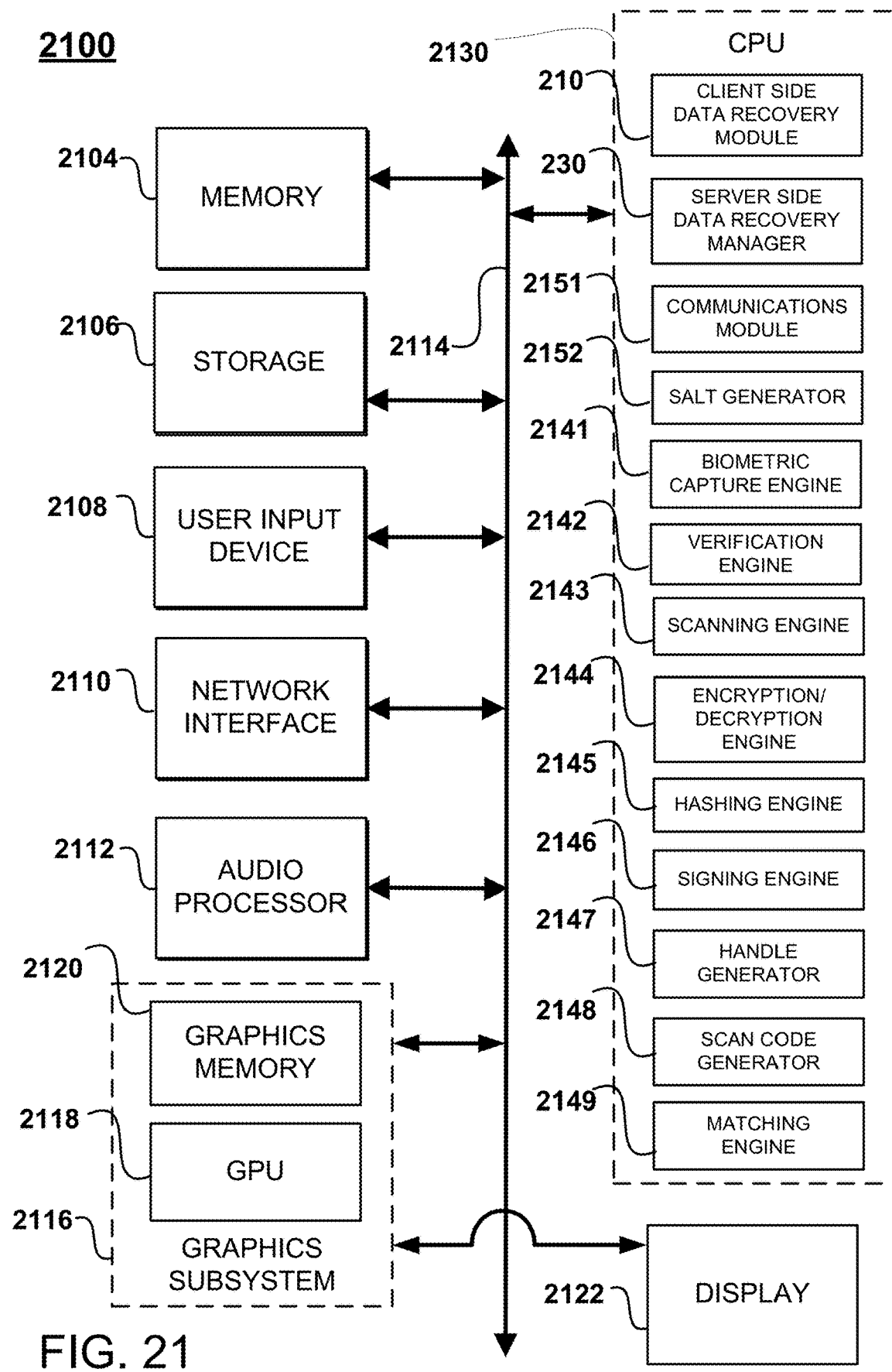
FIG. 21 illustrates components of an example device that can be used to perform aspects of the various embodiments of the present disclosure.

FIG. 21 illustrates components of an example device that can be used to perform aspects of the various embodiments of the present disclosure. For example, FIG. 21 illustrates an exemplary hardware system suitable for implementing a device in accordance with one embodiment. This block diagram illustrates a computer system 2100, such as a personal computer, video game console, personal digital assistant, or other digital device, suitable for practicing an embodiment of the invention. Computer system 2100 includes a central processing unit (CPU) 2102 for running software applications and optionally an operating system. CPU 2102 may be comprised of one or more homogeneous or heterogeneous processing cores.

In accordance with various embodiments, CPU 2102 is one or more general-purpose microprocessors having one or more processing cores. Further embodiments can be implemented using one or more CPUs with microprocessor architectures specifically adapted for highly parallel and computationally intensive applications. For example, CPU 2102 may be configured to include a client side data recovery module configured for setup/backup of data using a split key and/or other handles/keys and for recovery of that data after recovery of the split key and/or other handles/keys, a server side data recovery manager for securely storing data and/or the handles/keys used for recovering the data, biometric capture engine 2141 configured for capturing biometric data, a verification engine 2142 for performing verification logic (e.g., verifying assets, verifying data that is signed, registered, and/or certified), a scanning engine 2143 configured for scanning codes (e.g., QR code, scan code, PDF417 code, etc.), an encryption/decryption engine 2144 configured for encrypting and decrypting data (e.g., using a public/private key pair or symmetric key), a hashing engine 2145 configured for hashing data using any one of a number of well known hashing algorithms (e.g., SHA256, etc.), a signing engine 2146 configured for creating a digital signature using a private key, a handle generator 2147 configured for generating a session ID or envelope ID or various other handles/keys, a scan code generator 2148 for generating a scannable code (e.g., QR code, scan code, PDF417 code, etc.), a comparator or matching engine 2149 configured for comparing newly captured biometric data and original biometric data, a communications module 2151 for enabling communication between devices over a network (e.g., texting, phoning, messaging, etc.), and a Salt generator configured for generating a Salt value (e.g., random number). The components listed in the CPU 2102 may be implemented within any of the components of the previously described FIGS. 1-20, such as components within the client side data recovery module 210, components within the server side data recovery manager, etc.

Memory 2104 stores applications and data for use by the CPU 2102. Storage 2106 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 2108 communicate user inputs from one or more users to the computer system 2100, examples of which may include keyboards, mice, joysticks, touch pads, touch screens, still or video cameras, and/or microphones. Network interface 2110 allows computer system 2100 to communicate with other computer systems via an electronic communications network, and may include wired or wireless communication over local area networks and wide area networks such as the Internet. An audio processor 2112 is adapted to generate analog or digital audio output from instructions and/or data provided by the CPU 2102, memory 2104, and/or storage 2106. The components of computer system 2100, including CPU 2102, memory 2104, data storage 2106, user input devices 2108, network interface 2110, and audio processor 2112 are connected via one or more data buses 2122

A graphics subsystem 2114 is further connected with data bus 2122 and the components of the computer system 2100. The graphics subsystem 2114 includes a graphics processing unit (GPU) 2116 and graphics memory 2118. Graphics memory 2118 includes a display memory (e.g., a frame buffer) used for storing pixel data for each pixel of an output image. Graphics memory 2118 can be integrated in the same device as GPU 2116, connected as a separate device with GPU 2116, and/or implemented within memory 2104. Pixel data can be provided to graphics memory 2118 directly from the CPU 2102. Alternatively, CPU 2102 provides the GPU 2116 with data and/or instructions defining the desired output images, from which the GPU 2116 generates the pixel data of one or more output images. The data and/or instructions defining the desired output images can be stored in memory 2104 and/or graphics memory 2118. In an embodiment, the GPU 2116 includes 3D rendering capabilities for generating pixel data for output images from instructions and data defining the geometry, lighting, shading, texturing, motion, and/or camera parameters for a scene. The GPU 2116 can further include one or more programmable execution units capable of executing shader programs.

The graphics subsystem 2114 periodically outputs pixel data for an image from graphics memory 2118 to be displayed on display device 2122. Display device 2122 can be any device capable of displaying visual information in response to a signal from the computer system 2100, including CRT, LCD, plasma, and OLED displays. Computer system 2100 can provide the display device 2122 with an analog or digital signal.

Accordingly, embodiments of the present disclosure disclosing authenticated login, registration, call center validation, and biometric authentication of a user have been described. While specific embodiments have been provided to demonstrate the use of registration, validation, and certification of data, these are described by way of example and not by way of limitation. Those skilled in the art having read the present disclosure will realize additional embodiments falling within the spirit and scope of the present disclosure.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein.

What is claimed is:

1. A method for recovering data, comprising:
    collecting one or more identity factors at a user device, wherein hashes of the one or more identity factors are configured to be stored at a server;
    generating at the user device a dynamic password based on the one or more identity factors and a Salt configured to be generated by the server and configured to be delivered to the user device, the generating the dynamic password including:
        generating a string including at least one of the one or more identity factors and one or more hashes of at least one of the one or more identity factors; and
        hashing the string using a hash algorithm;
    generating at the user device a data key and encrypting the data key using the dynamic password to generate an encrypted data key, wherein the encrypted data key is configured to be stored at the server; and
    encrypting at the user device one or more data items using the data key to generate one or more encrypted data items, wherein the one or more encrypted data items are configured to be stored at the server,
    wherein the one or more data items are recoverable by presenting the one or more identity factors to the server.

2. The method of claim 1, further comprising:
    collecting one or more regenerated identity factors at the user device and sending one or more hashes of the one or more regenerated identity factors to the server for comparison against the hashes of the one or more identity factors, wherein the Salt is configured to be delivered to the user device when the one or more hashes of the one or more regenerated identity factors closely match the hashes of the one or more identity factors;
    generating at the user device a recovered dynamic password based on the one or more regenerated identity factors and the Salt received from the server;
    decrypting at the user device using the recovered dynamic password the encrypted data key received from the server; and
    decrypting at the user device the one or more encrypted data items using the data key, the one or more encrypted data items being received from the server.

3. The method of claim 1, wherein the user device is a first user device, the method further comprising:
    collecting one or more regenerated identity factors at a second user device and sending one or more hashes of the one or more regenerated identity factors to the server for comparison against the hashes of the one or more identity factors, wherein the Salt is configured to be delivered to the second user device when the one or more hashes of the one or more regenerated identity factors closely match the hashes of the one or more identity factors;
    generating at the second user device a recovered dynamic password based on the one or more regenerated identity factors and the Salt received from the server;
    decrypting at the second user device using the recovered dynamic password the encrypted data key received from the server; and
    decrypting at the second user device the one or more encrypted data items using the data key, the one or more encrypted data items being received from the server.

4. The method of claim 1, wherein one of the one or more identity factors comprises a verifiable identity factor associated with an asset whose ownership is verifiable by the server, the method further comprising:
    sending from the user device to the server access information for accessing the asset, wherein the server delivers an authentication code to the asset; and
    sending from the user device the authentication code to the server for verification of ownership of the asset.

5. The method of claim 1, wherein one of the one or more identity factors comprises a verifiable identity factor associated with an asset whose ownership is verifiable by the server, the method further comprising:
    sending a message from the asset to the server, wherein the message includes asset identifying information of the asset.

6. The method of claim 1, wherein each of the data key and the Salt is a randomly generated number.

7. The method of claim 3, further comprising:
capturing at the first user device an original image of a user;
generating a facial recognition key at the first user device, wherein the facial recognition key comprises a random number;
generating at the first user device an encrypted facial recognition key using the dynamic password, wherein the encrypted facial recognition key is configured to be stored at the server; and
encrypting at the first user device the original image using the facial recognition key to generate an encrypted original image, wherein the encrypted original image is configured to be stored at the server,
wherein the user is authenticated for purposes of data recovery using a facial recognition process.

8. The method of claim 7, wherein the facial recognition process includes:
generating at the second user device the facial recognition key by decrypting using the recovered dynamic password the encrypted facial recognition key received from the server;
capturing at the second user device a new image of the user;
delivering from the second user device the facial recognition key and the new image to the server, wherein the server compares the new image to the original image that is accessed by decrypting the encrypted original image with the facial recognition key; and
receiving at the second user device from the server the one or more encrypted data items when the new image closely matches the original image.

9. The method of claim 8, further comprising:
performing a liveliness test at the first user device when capturing the original image; and
performing another liveliness test at the second user device when capturing the new image.

10. The method of claim 1, further comprising:
collecting a new set of one or more identity factors at the user device, wherein the new set of one or more identity factors replaces the one or more identity factors;
generating at the user device a new dynamic password based on the new set of one or more identity factors and the Salt; and
encrypting at the user device the data key using the new dynamic password to generate a new encrypted data key, wherein the new encrypted data key replaces the encrypted data key and is configured to be stored at the server,
wherein the one or more data items are recoverable by presenting the new set of one or more identity factors to the server.

11. A non-transitory computer-readable medium storing a computer program for recovering data, the computer-readable medium comprising:
program instructions for collecting one or more identity factors at a user device, wherein hashes of the one or more identity factors are configured to be stored at a server;
program instructions for generating at the user device a dynamic password based on the one or more identity factors and a Salt configured to be generated by the server and configured to be delivered to the user device, the program instructions for generating the dynamic password including:
program instructions for generating a string including at least one of the one or more identity factors and one or more hashes of at least one of the one or more identity factors; and
program instructions for hashing the string using a hash algorithm;
program instructions for generating at the user device a data key and encrypting the data key using the dynamic password to generate an encrypted data key, wherein the encrypted data key is configured to be stored at the server; and
program instructions for encrypting at the user device one or more data items using the data key to generate one or more encrypted data items, wherein the one or more encrypted data items are configured to be stored at the server,
wherein the one or more data items are recoverable by presenting the one or more identity factors to the server.

12. The non-transitory computer-readable medium of claim 11, further comprising:
program instructions for collecting one or more regenerated identity factors at the user device and sending one or more hashes of the one or more regenerated identity factors to the server for comparison against the hashes of the one or more identity factors, wherein the Salt is configured to be delivered to the user device when the one or more hashes of the one or more regenerated identity factors closely match the hashes of the one or more identity factors;
program instructions for generating at the user device a recovered dynamic password based on the one or more regenerated identity factors and the Salt received from the server;
program instructions for decrypting at the user device using the recovered dynamic password the encrypted data key received from the server; and
program instructions for decrypting at the user device the one or more encrypted data items using the data key, the one or more encrypted data items being received from the server.

13. The non-transitory computer-readable medium of claim 11, wherein the user device is a first user device, the non-transitory computer-readable medium further comprising:
program instructions for collecting one or more regenerated identity factors at a second user device and sending one or more hashes of the one or more regenerated identity factors to the server for comparison against the hashes of the one or more identity factors, wherein the Salt is configured to be delivered to the second user device when the one or more hashes of the one or more regenerated identity factors closely match the hashes of the one or more identity factors;
program instructions for generating at the second user device a recovered dynamic password based on the one or more regenerated identity factors and the Salt received from the server;
program instructions for decrypting at the second user device using the recovered dynamic password the encrypted data key received from the server; and
program instructions for decrypting at the second user device the one or more encrypted data items using the data key, the one or more encrypted data items being received from the server.

14. The non-transitory computer-readable medium of claim 11, further comprising:

wherein one of the one or more identity factors comprises a verifiable identity factor associated with an asset whose ownership is verifiable by the server,
program instructions for sending from the user device to the server access information for accessing the asset, wherein the server delivers an authentication code to the asset; and
program instructions for sending from the user device the authentication code to the server for verification of ownership of the asset.

15. The non-transitory computer-readable medium of claim 11, further comprising:
program instructions for collecting a new set of one or more identity factors at the user device, wherein the new set of one or more identity factors replaces the one or more identity factors;
program instructions for generating at the user device a new dynamic password based on the new set of one or more identity factors and the Salt; and
program instructions for encrypting at the user device the data key using the new dynamic password to generate a new encrypted data key, wherein the new encrypted data key replaces the encrypted data key and is configured to be stored at the server,
wherein the one or more data items are recoverable by presenting the new set of one or more identity factors to the server.

16. A computer system comprising:
a processor; and
memory coupled to the processor and having stored therein instructions that, if executed by the processor, cause the processor to execute a method for recovering data comprising:
collecting one or more identity factors at a user device, wherein hashes of the one or more identity factors are configured to be stored at a server;
generating at the user device a dynamic password based on the one or more identity factors and a Salt configured to be generated by the server and configured to be delivered to the user device, the generating the dynamic password including:
generating a string including at least one of the one or more identity factors and one or more hashes of at least one of the one or more identity factors; and
hashing the string using a hash algorithm;
generating at the user device a data key and encrypting the data key using the dynamic password to generate an encrypted data key, wherein the encrypted data key is configured to be stored at the server; and
encrypting at the user device one or more data items using the data key to generate one or more encrypted data items, wherein the one or more encrypted data items are configured to be stored at the server,
wherein the one or more data items are recoverable by presenting the one or more identity factors to the server.

17. The computer system of claim 16, the method further comprising:
collecting one or more regenerated identity factors at the user device and sending one or more hashes of the one or more regenerated identity factors to the server for comparison against the hashes of the one or more identity factors, wherein the Salt is configured to be delivered to the user device when the one or more hashes of the one or more regenerated identity factors closely match the hashes of the one or more identity factors;
generating at the user device a recovered dynamic password based on the one or more regenerated identity factors and the Salt received from the server;
decrypting at the user device using the recovered dynamic password the encrypted data key received from the server; and
decrypting at the user device the one or more encrypted data items using the data key, the one or more encrypted data items being received from the server.

18. The computer system of claim 16, wherein the user device is a first user device, the method further comprising:
collecting one or more regenerated identity factors at a second user device and sending one or more hashes of the one or more regenerated identity factors to the server for comparison against the hashes of the one or more identity factors, wherein the Salt is configured to be delivered to the second user device when the one or more hashes of the one or more regenerated identity factors closely match the hashes of the one or more identity factors;
generating at the second user device a recovered dynamic password based on the one or more regenerated identity factors and the Salt received from the server;
decrypting at the second user device using the recovered dynamic password the encrypted data key received from the server; and
decrypting at the second user device the one or more encrypted data items using the data key, the one or more encrypted data items being received from the server.

19. The computer system of claim 16, wherein one of the one or more identity factors comprises a verifiable identity factor associated with an asset whose ownership is verifiable by the server, the method further comprising:
sending from the user device to the server access information for accessing the asset, wherein the server delivers an authentication code to the asset; and
sending from the user device the authentication code to the server for verification of ownership of the asset.

20. The computer system of claim 16, the method further comprising:
collecting a new set of one or more identity factors at the user device, wherein the new set of one or more identity factors replaces the one or more identity factors;
generating at the user device a new dynamic password based on the new set of one or more identity factors and the Salt; and
encrypting at the user device the data key using the new dynamic password to generate a new encrypted data key, wherein the new encrypted data key replaces the encrypted data key and is configured to be stored at the server,
wherein the one or more data items are recoverable by presenting the new set of one or more identity factors to the server.

21. The method of claim 1, wherein:
the generating the string includes generating the string based on a predefined order of the at least one of the one or more identity factors and the one or more hashes of at least one of the one or more identity factors.

22. The method of claim 1, wherein:
the dynamic password is not sent to the server.

23. A method, comprising:
collecting one or more identity factors at a user device, wherein hashes of the one or more identity factors are configured to be stored at a server;

generating at the user device a dynamic password based on the one or more identity factors and a Salt configured to be generated by the server and configured to be delivered to the user device;

generating at the user device a data key and encrypting the data key using the dynamic password to generate an encrypted data key, wherein the encrypted data key is configured to be stored at the server;

encrypting at the user device one or more data items using the data key to generate one or more encrypted data items, wherein the one or more encrypted data items are configured to be stored at the server, wherein the one or more data items are recoverable by presenting the one or more identity factors to the server;

capturing at the user device an original image of a user;

generating a facial recognition key at the user device, wherein the facial recognition key comprises a random number;

generating at the user device an encrypted facial recognition key using the dynamic password, wherein the encrypted facial recognition key is configured to be stored at the server; and encrypting at the user device the original image using the facial recognition key to generate an encrypted original image, wherein the encrypted original image is configured to be stored at the server, wherein the user is authenticated for purposes of data recovery using a facial recognition process.

* * * * *